US012658560B2

(12) United States Patent
Wei et al.

(10) Patent No.: US 12,658,560 B2
(45) Date of Patent: Jun. 16, 2026

(54) RESONANT CAVITY ANTENNA AND ELECTRONIC DEVICE

(71) Applicant: Honor Device Co., Ltd., Shenzhen (CN)

(72) Inventors: Kunpeng Wei, Shenzhen (CN); Qiao Guan, Shenzhen (CN); Yiwu Hu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 467 days.

(21) Appl. No.: 18/038,073

(22) PCT Filed: Sep. 9, 2022

(86) PCT No.: PCT/CN2022/118237
§ 371 (c)(1),
(2) Date: May 22, 2023

(87) PCT Pub. No.: WO2023/061128
PCT Pub. Date: Apr. 20, 2023

(65) Prior Publication Data

US 2024/0006741 A1 Jan. 4, 2024

(30) Foreign Application Priority Data

Oct. 15, 2021 (CN) ......................... 202111204302.7

(51) Int. Cl.
*H01Q 1/22* (2006.01)
*H01Q 1/52* (2006.01)
*H01Q 13/18* (2006.01)

(52) U.S. Cl.
CPC ............ *H01Q 1/2266* (2013.01); *H01Q 1/52* (2013.01); *H01Q 13/18* (2013.01)

(58) Field of Classification Search
CPC ........ H01Q 1/2266; H01Q 1/52; H01Q 13/18; H01Q 13/22
See application file for complete search history.

(56) References Cited

U.S. PATENT DOCUMENTS 8,599,089 B2 12/2013 Bevelacqua et al.
8,854,266 B2 10/2014 Zhu et al.
(Continued)

FOREIGN PATENT DOCUMENTS

CN 1474619 A 2/2004
CN 102394378 A 3/2012
(Continued)

OTHER PUBLICATIONS

Zhao Yang et al., "Technique Research on Metallic Non-SlottIng Cavity Antenna", Chinese Institute of Electronics, Proceedings of the 2011 National Microwave and Millimeter Wave Conference (vol. II), State Key Laboratory of Microwave and Digital Communication, Department of Electronic Engineering, Tsinghua University, Foxconn Technology Group, Jun. 1, 2011, pp. 850-852.
(Continued)

*Primary Examiner* — Dieu Hien T Duong
(74) *Attorney, Agent, or Firm* — Slater Matsil, LLP

(57) ABSTRACT

This application provides a resonant cavity antenna and an electronic device, and relates to the communications field. The resonant cavity antenna includes an antenna cavity, a first gap, and a feeding part. At least one edge of a first surface of the antenna cavity is parallel to a long edge of a display of an electronic device, at least one edge of a second surface of the antenna cavity is parallel to the long edge of the display, a plane on which the first surface is located intersects a plane on which the second surface is located. The first gap is disposed on the first surface and/or the second surface, and at least a part of the first gap extends in a direction of the long edge of the display. The feeding part
(Continued)

is located inside the antenna cavity, and in contact with none of surfaces of the antenna cavity.

20 Claims, 36 Drawing Sheets

(56) References Cited

U.S. PATENT DOCUMENTS

| | | | |
|---|---|---|---|
| 10,498,041 | B1 | 12/2019 | Lin et al. |
| 11,522,296 | B2 | 12/2022 | Chen et al. |
| 2005/0017914 | A1 | 1/2005 | Huang |
| 2005/0146475 | A1 | 7/2005 | Bettner et al. |
| 2008/0231522 | A1 | 9/2008 | Montgomery et al. |
| 2015/0061953 | A1 | 3/2015 | Li et al. |
| 2018/0090817 | A1 | 3/2018 | Rajagopalan et al. |
| 2018/0294576 | A1* | 10/2018 | Niakan ................ H01Q 1/2258 |
| 2019/0312347 | A1 | 10/2019 | Edwards et al. |
| 2021/0367345 | A1* | 11/2021 | Seong .................... H01Q 1/243 |

FOREIGN PATENT DOCUMENTS

| | | | |
|---|---|---|---|
| CN | 102870276 | A | 1/2013 |
| CN | 102956973 | A | 3/2013 |
| CN | 103414028 | A | 11/2013 |
| CN | 103515710 | A | 1/2014 |
| CN | 203466286 | U | 3/2014 |
| CN | 104767031 | A | 7/2015 |
| CN | 105244626 | A | 1/2016 |
| CN | 106450781 | A | 2/2017 |
| CN | 106602243 | A | 4/2017 |
| CN | 106876896 | A | 6/2017 |
| CN | 107134652 | A | 9/2017 |
| CN | 206650172 | U | 11/2017 |
| CN | 108258401 | A | 7/2018 |
| CN | 108550981 | A | 9/2018 |
| CN | 109390689 | A | 2/2019 |
| CN | 109830807 | A | 5/2019 |
| CN | 109841944 | A | 6/2019 |
| CN | 110233337 | A | 9/2019 |
| CN | 111670546 | A | 9/2020 |
| CN | 112534641 | A | 3/2021 |
| CN | 112993579 | A | 6/2021 |
| CN | 113161752 | A | 7/2021 |
| CN | 113922092 | A | 1/2022 |
| WO | 2020073643 | A1 | 4/2020 |
| WO | 2021139540 | A1 | 7/2021 |

OTHER PUBLICATIONS

Mu Xin, "Low Profile Slot Antenna Backed by Substrate Integrated Waveguide Cavity", Modern Navigation, 2018, 9 (04), pp. 291-294, Aug. 15, 2018, 4 pages.

Li Yixuan, et al., "Wideband substrate integrated waveguide cavity-backed slot antenna in W-band", Chinese journal of adio science, 2018, vol. 33, No. 4, Jul. 24, 2018.

Bilal Hammu, et al., "SIW Cavity-Backed Antenna Array Based on Double Slots for mmWave Communications", Appl. Sci., May 202111(11):4824, May 24, 2021, 7 pages.

L. Sun, P. Liu, Y. Li, L. Chang, K. Wei and Z. Zhang, "Metal Strip Endfire Antenna Based on TE1 Leaky-Wave Mode," in IEEE Transactions on Antennas and Propagation, vol. 68, No. 8, pp. 5916-5923, Aug. 2020, doi: 10.1109/TAP.2020.2986707.

* cited by examiner

Theta/Degree vs. dBi

RESONANT CAVITY ANTENNA AND ELECTRONIC DEVICE

CROSS-REFERENCE TO RELATED APPLICATIONS

This application is a national stage of International Application No. PCT/CN2022/118237, filed on Sep. 9, 2022, which claims priority to Chinese Patent Application No. 202111204302.7, filed on Oct. 15, 2021. The disclosures of both of the aforementioned applications are hereby incorporated by reference in their entireties.

TECHNICAL FIELD

This application relates to the wireless communications field, and in particular, to a resonant cavity antenna and an electronic device.

BACKGROUND

With popularization of handheld terminals, antenna technologies are increasingly applied to the handheld terminals. Due to a development trend of miniaturization, lightening, and thinning of mobile terminals, effective space of an antenna area becomes smaller.

Currently, an antenna in a mobile terminal is usually a metal-frame design antenna (Metal-Frame Design Antenna) or a flexible printed circuit (Flexible Printed Circuit, FPC) antenna that surrounds a ground plate. However, an electric field direction of the MDA or FPC antenna that surrounds the ground plate is on a same plane as the ground plate, that is, a polarization direction of the antenna in the mobile terminal is a horizontal polarization direction parallel to the ground plate, and consequently, the polarization direction of the antenna in the mobile terminal is single.

SUMMARY

To resolve the foregoing technical problem, this application provides a resonant cavity antenna and an electronic device. A polarization direction of the resonant cavity antenna is a vertical polarization direction, so that an orthogonal polarization direction can be formed with an antenna in a horizontal polarization direction in an electronic device, to improve a signal receiving or sending capability of the electronic device.

According to a first aspect, this application provides a resonant cavity antenna, including an antenna cavity, a first gap, and a feeding part.

The antenna cavity is a hexahedron that includes at least five conductive walls, the antenna cavity is filled with an insulating medium, and a length axis of the resonant cavity antenna is parallel to an axis with a largest value in an electronic device. The first gap is disposed on any surface that includes the length axis, and the first gap extends in an extension direction of the length axis. The feeding part is located inside the antenna cavity, the feeding part is connected to a radio frequency link of the electronic device, and a distance between the feeding part and the first gap is greater than zero For example, the antenna cavity may be a completely closed metal hexahedron, or may be a metal hexahedron with an opening at one end. The antenna cavity is filled with the insulating medium, so that when the feeding part is connected to the radio frequency link, excitation is implemented on each surface. The first gap is disposed on any surface that includes the length axis, and the first gap extends in the extension direction of the length axis, so that when the feeding part generates excitation, an electric field around the length axis may be generated. Because the length axis is parallel to the axis with the largest value in the electronic device (for example, if a mobile phone is the electronic device, the axis with the largest value is a length of a display in the mobile phone, and an axis with a largest value in a tablet computer is a length of a display in the tablet computer), the resonant cavity antenna may form an electric field surrounding the axis with the largest value in the electronic device, and the electric field may cover a surface on which a display of the electronic device is located and cover a surface opposite the display, that is, a polarization direction of the resonant cavity antenna is a vertical polarization direction (that is, a direction perpendicular to the display of the electronic device). The polarization direction of the resonant cavity antenna is the vertical polarization direction, and forms an orthogonal polarization direction with an antenna in a horizontal polarization direction in the electronic device, to improve a signal receiving or sending capability of the electronic device.

According to the first aspect, the resonant cavity antenna is deployed in a cavity surrounded by a metal rear housing, a metal middle frame, and a display of the electronic device, a height axis of the resonant cavity antenna is less than or equal to a thickness of the electronic device, and the height axis is perpendicular to the length axis and a width axis of the resonant cavity antenna; the length axis and the width axis form a front surface, and the front surface is close to the display of the electronic device; the length axis and the height axis form a side surface; and the width axis and the height axis form a cross section.

In this way, because the resonant cavity antenna is deployed in the cavity surrounded by the metal rear housing, the metal middle frame, and the display of the electronic device, an appearance of the electronic device is not affected. Because the height axis is perpendicular to the width axis and the length axis, a direction of an electric field generated in the antenna cavity can be further ensured, and a polarization direction of the antenna is ensured to be stable.

According to the first aspect, if the resonant cavity antenna works in a $TE_{0.5,0,1}$ mode, a value range of the length axis of the antenna cavity is [0.5λ−0.5λ*20%, 0.5λ+0.5λ*20%], a range of the width axis is [0.25λ−0.25λ*10%, 0.25λ+0.25λ*10%], and the height axis is less than 0.25λ, where λ is used to indicate a wavelength at which the resonant cavity antenna works.

In this way, the resonant cavity antenna works in the $TE_{0.5,0,1}$ mode, and λ is used to indicate the wavelength at which the resonant cavity antenna works, so that the resonant cavity antenna generates an electromagnetic wave with ½ half-wavelength, to form a half-mode waveguide resonant cavity antenna.

According to the first aspect, if the resonant cavity antenna works in a $TE_{0.5,0,0.5}$ mode, a value range of the length axis of the antenna cavity is [0.25λ−0.25λ*20%, 0.25λ+0.25λ*20%], a range of the width axis is [0.25λ−0.25λ*10%, 0.25λ+0.25λ*10%], and the height axis is less than 0.25λ, where λ is used to indicate a wavelength at which the resonant cavity antenna works.

In this way, the resonant cavity antenna works in the $TE_{0.5,0,0.5}$ mode, and λ is used to indicate the wavelength at which the resonant cavity antenna works, so that the resonant cavity antenna generates an electromagnetic wave with ½ half-wavelength, and a volume of the resonant cavity antenna working in the $TE_{0.5,0,0.5}$ mode is less than a volume of the resonant cavity antenna working in the $TE_{0.5,0,0.5}$ mode. The volume of the resonant cavity antenna decreases, so that deployment of the resonant cavity antenna is more flexible.

According to the first aspect, the first gap is located on the front surface, and the first gap is adjacent to the side surface.

In this way, the first gap is located on the front surface and is adjacent to the side surface. That is, the first gap may be located between the display and the metal middle frame, to improve energy of receiving or transmitting a signal on the front surface of the electronic device. In addition, a position of the first gap is concealed, thereby reducing damage to an appearance of the electronic device.

According to the first aspect, a gap is disposed on both the front surface and the side surface adjacent to the front surface, to form the first gap between the front surface and the side surface.

In this way, the first gap is disposed on an edge of the antenna cavity, field strength on the front side of the antenna decreases, and field strength on the rear side increases, thereby improving flexibility of deploying the resonant cavity antenna.

According to the first aspect, a height range of the first gap on the side surface is greater than ½ of the height axis and less than the height axis.

In this way, a height of the side surface may be gradually reduced, and rear field strength is gradually increased, thereby further improving flexibility of deploying the resonant cavity antenna.

According to the first aspect, the first gap is located in a middle position on the side surface.

This is equivalent to that a magnetic current in an axial direction has an omni-directional graph perpendicular to the height axis direction, and has a characteristic of low profile vertical polarization, and front field strength is symmetrical to rear field strength.

According to the first aspect, from bottom to top, the antenna cavity successively includes a metal plate of the electronic device, three foams for conducting electricity, and a liquid crystal display LCD metal layer covering the three foams, and the LCD metal layer is covered by the display; a first foam and a second foam are located on the metal plate; and a battery rib retaining wall of the electronic device is located on the metal plate, a third foam is located on the battery rib retaining wall, the third foam is close to a position of the feeding part, and a connection line between the first foam and the second foam is parallel to the battery rib retaining wall.

In this way, the metal plate is parallel to the battery rib retaining wall, the first foam and the second foam are located on the metal plate, the length axis in the antenna cavity can be formed, the third foam is located on the battery rib retaining wall, and the third foam is close to the position of the feeding part. The third foam may be used to eliminate a clutter generated by the feeding part, to reduce clutter interference. The LCD metal layer, the metal plate, the third foam, and the first foam or the second foam may form two closed conductive walls in the antenna cavity. The first foam, the second foam, the third foam, and the LCD metal layer may form a front surface (that is, a conductive wall) close to the display. The antenna cavity is constructed by using the foams, and no additional material is required. This reduces occupation of space in the cavity of the electronic device, and reduces costs of constructing the resonant cavity antenna.

According to the first aspect, the antenna cavity further includes a fourth foam, and the fourth foam is located on the battery rib retaining wall and aligned with the second foam or the first foam.

In this way, the first foam is aligned with the fourth foam, so that the LCD metal layer, the metal plate, the first foam, and the fourth foam can form a closed cross section in the antenna cavity. Alternatively, if the second foam is aligned with the fourth foam, the LCD metal layer, the metal plate, the second foam, and the fourth foam may form a closed cross section in the antenna cavity, and the cross section is perpendicular to the LCD metal layer and the metal plate, so that the cross section (that is, a conductive wall) is a strict boundary condition, and clutter generation is reduced.

According to the first aspect, the antenna cavity further includes a fifth foam; the fifth foam is located on the battery rib retaining wall; and if the fourth foam is aligned with the second foam, the fifth foam is aligned with the first foam; or if the fourth foam is aligned with the first foam, the fifth foam is aligned with the second foam.

In this way, if the fourth foam is aligned with the second foam, the fifth foam is aligned with the first foam, or if the fourth foam is aligned with the first foam, the fifth foam is aligned with the second foam. Two formed cross sections are both strict boundary conditions, so that a metal cavity with a rectangular structure can be constructed, a clutter amplitude is minimum, and performance of the resonant cavity antenna is optimal.

According to the first aspect, if a resonance frequency of the resonant cavity is 2.45 GHz, and a working mode is $TE_{0.5,0,1}$, two cross sections of the resonant cavity antenna are closed conductive walls, a value of the length axis of the resonant cavity antenna is 80 mm, a value of the width axis of the resonant cavity antenna is 15.5 mm, and a value of the height axis of the resonant cavity antenna is 6.5 mm.

In this way, if the resonance frequency of the resonant cavity is 2.45 GHz, and the working mode is $TE_{0.5,0,1}$, the two cross sections of the resonant cavity antenna are disposed as closed conductive walls. An electromagnetic wave has a standing wave characteristic inside the structure and a radiation characteristic outside the structure, and radiation performance of the resonant cavity antenna is optimal.

According to the first aspect, from bottom to top, the antenna cavity successively includes a metal plate of the electronic device, at least two foams for conducting electricity, and a liquid crystal display LCD metal layer covering the two foams, and the LCD metal layer is covered by the display; a first foam is located on the metal plate; and a battery rib retaining wall of the electronic device is located on the metal plate, a second foam is located on the battery rib retaining wall, the second foam is close to a position of the feeding part, and an included angle between the battery rib retaining wall and a connection line between the first foam and the second foam is greater than 0 degrees and less than or equal to 45 degrees.

In this way, the metal plate is parallel to the battery rib retaining wall, the first foam is located on the metal plate, and the first foam may form the length axis in the antenna cavity. The second foam is located on the battery rib retaining wall and is close to the feeding part. The second foam may be used to eliminate a clutter generated by the feeding part, to reduce clutter interference. It should be noted that the metal plate of the electronic device is a metal plate in the metal rear housing. The LCD metal layer, the metal plate, and the second foam may form a closed conductive wall in the antenna cavity. However, only one closed conductive wall can be formed, so that a cross section at one end of the constructed antenna cavity is open. This reduces a volume of the antenna cavity, reduces a material for constructing the resonant cavity antenna, reduces occupation of space in the cavity of the electronic device, and reduces costs of constructing the resonant cavity antenna.

According to the first aspect, the antenna cavity further includes a third foam, the third foam is located on the battery rib retaining wall, and the third foam is close to and aligned with the first foam.

In this way, the third foam, the LCD metal layer, the second foam, and the metal plate may form a closed conductive wall. If the third foam is not aligned with the first foam, the third foam and the first foam form a non-strict conductive wall, and clutter waves are reduced. If the third foam is aligned with the first foam, a strict boundary condition is formed, and generation of a clutter wave may be further reduced.

According to the first aspect, the antenna cavity further includes a fourth foam, and the fourth foam is located on the battery rib retaining wall; and if the third foam is aligned with the first foam, the fourth foam is located between the second foam and the third foam; or if the third foam is located between the first foam and the second foam, the fourth foam is aligned with the first foam.

In this way, the second foam, the third foam, the fourth foam, the LCD metal layer, and the metal plate may form a side surface of the antenna cavity, and the first foam is aligned with the third foam, or the first foam is aligned with the fourth foam, to form a strict boundary condition, thereby effectively reducing a generated clutter wave. In addition, adding one foam can further reduce an amplitude of the clutter wave, and improve performance of the resonant cavity antenna.

According to the first aspect, if a resonance frequency of the resonant cavity is 2.45 GHz, and a working mode is $TE_{0.5,0,0.5}$, the resonant cavity antenna includes an open cross section, a value of the length axis of the resonant cavity antenna is 45 mm, a value of the width axis of the resonant cavity antenna is 15.5 mm, and a value of the height axis of the resonant cavity antenna is 6.5 mm.

In this way, if the resonance frequency of the resonant cavity is 2.45 GHz, and the working mode is $TE_{0.5,0,1}$, the resonant cavity antenna is disposed with a cross section including an opening, and the length axis is 45 mm, so that radiation efficiency is optimal when the resonance frequency is 2.45 GHz and the working mode is $TE_{0.5,0,1}$.

According to the first aspect, a gap used to put black glue between the display and the metal middle frame is used as the first gap.

In this way, the gap used to put the black glue between the display and the metal middle frame in the electronic device is used as the first gap, and a gap does not need to be disposed on the metal middle frame or the LCD metal layer. This avoids a problem of changing another structure in the electronic device.

According to the first aspect, if the first gap is disposed on the side surface, a gap disposed on the metal middle frame is used as the first gap.

In this way, a metal plate in the metal middle frame is used as the side surface of the antenna cavity, and the first gap is disposed in the metal middle frame, to facilitate signal radiation of the antenna.

According to the first aspect, if a mode of the resonant cavity antenna is $TE_{0.5,0,1}$, the feeding part is located at a maximum point of an electric field in the extension direction of the length axis and is at a position close to the first gap in an extension direction of the width axis.

In this way, the feeding part is disposed at the maximum point of the electric field in the extension direction of the length axis, so that the feeding part is more sufficiently excited by a capacitive feed. In addition, the feeding part is at the position close to the first gap in the extension direction of the width axis. This can improve radiation efficiency of the resonant cavity antenna.

According to the first aspect, if a mode of the resonant cavity antenna is $TE_{0.5,0,0.5}$, the feeding part is located at a maximum point of an electric field in the extension direction of the length axis and is at a position close to an open cross section, and a value of the feeding part in an extension direction of the width axis is at a position close to the first gap.

In this way, a feed is close to an open cross section, that is, close to an open circuit boundary, and the maximum point of the electric field is excited more fully by a capacitive feed, so that bandwidth and radiation efficiency of the resonant cavity antenna are improved.

According to a second aspect, this application provides an electronic device, including: at least one frame antenna and the resonant cavity antenna according to any one of claims 1 to 20. The frame antenna is located in a first corner or a second corner of the electronic device, and the first corner is adjacent to the second corner; and the resonant cavity antenna is located in a middle position between a third corner and a fourth corner, and a connection line between the third corner and the fourth corner is parallel to a connection line between the first corner and the second corner.

In this way, the electronic device further includes the frame antenna, the frame antenna is disposed in the first corner or the second corner, and the resonant cavity antenna is disposed between the third corner and the fourth corner, so that the frame antenna is far away from the resonant cavity antenna in this application, isolation is high, and the frame antenna and the resonant cavity antenna do not interfere with each other. In addition, the frame antenna is an antenna that surrounds a ground plate, generates a horizontal polarization direction, and cooperates with the resonant cavity antenna, to enhance energy of receiving or transmitting a signal by the electronic device. For example, the frame antenna is a Wi-Fi antenna, and works at 2.45 GHz. In this application, the resonant cavity antenna works at 2.45 GHz, and the two antennas are used together, so that a Wi-Fi signal of the electronic device is strong.

According to the second aspect, if the resonant cavity antenna works in a $TE_{0.5,0,0.5}$ mode, the resonant cavity antenna is located in the third corner or the fourth corner.

In this way, because the resonant cavity antenna works in the $TE_{0.5,0,0.5}$ mode, and has an open cross section, the resonant cavity antenna is disposed in the third corner or the fourth corner and is far away from the frame antenna. This helps the resonant cavity antenna radiate a signal.

BRIEF DESCRIPTION OF THE DRAWINGS

To describe the technical solutions in embodiments of this application more clearly, the following briefly describes the accompanying drawings for describing embodiments of this application. It is clear that, the accompanying drawings in the following description show merely some embodiments of this application, and a person of ordinary skill in the art may still derive other drawings from these accompanying drawings without creative efforts.

FIG. 21(2) is a schematic diagram of electric field distribution in a resonant cavity antenna;

FIG. 23(2) is a schematic diagram of a cross section in an antenna cavity when a height of a side surface close to a first gap is reduced by d2;

FIG. 23(3) is a schematic diagram of a cross section in an antenna cavity when a height of a side surface close to a first gap is reduced by d3;

FIG. 23(4) is a schematic diagram in which a first gap is disposed in the middle of a B1 surface;

FIG. 24(2) is a schematic diagram of a coverage area in a three-dimensional direction diagram of a resonant cavity antenna when bi is reduced by 1 mm;

FIG. 24(3) is a schematic diagram of a coverage area in a three-dimensional direction diagram of a resonant cavity antenna when bi is reduced by 2 mm;

FIG. 24(4) is a schematic diagram of a coverage area in a three-dimensional direction diagram of a resonant cavity antenna when a first gap is disposed in the middle of a B1 surface;

FIG. 29(2) is a three-dimensional direction diagram of a resonant cavity antenna when a feeding part is in a position of a reference sign ②;

FIG. 29(3) is a three-dimensional direction diagram of a resonant cavity antenna when a feeding part is in a position of a reference sign ③;

FIG. 32E is a schematic diagram of an S parameter and efficiency of a resonant cavity antenna without a foam 3046 and a foam 3048;

REFERENCE SIGNS

Figure 1:
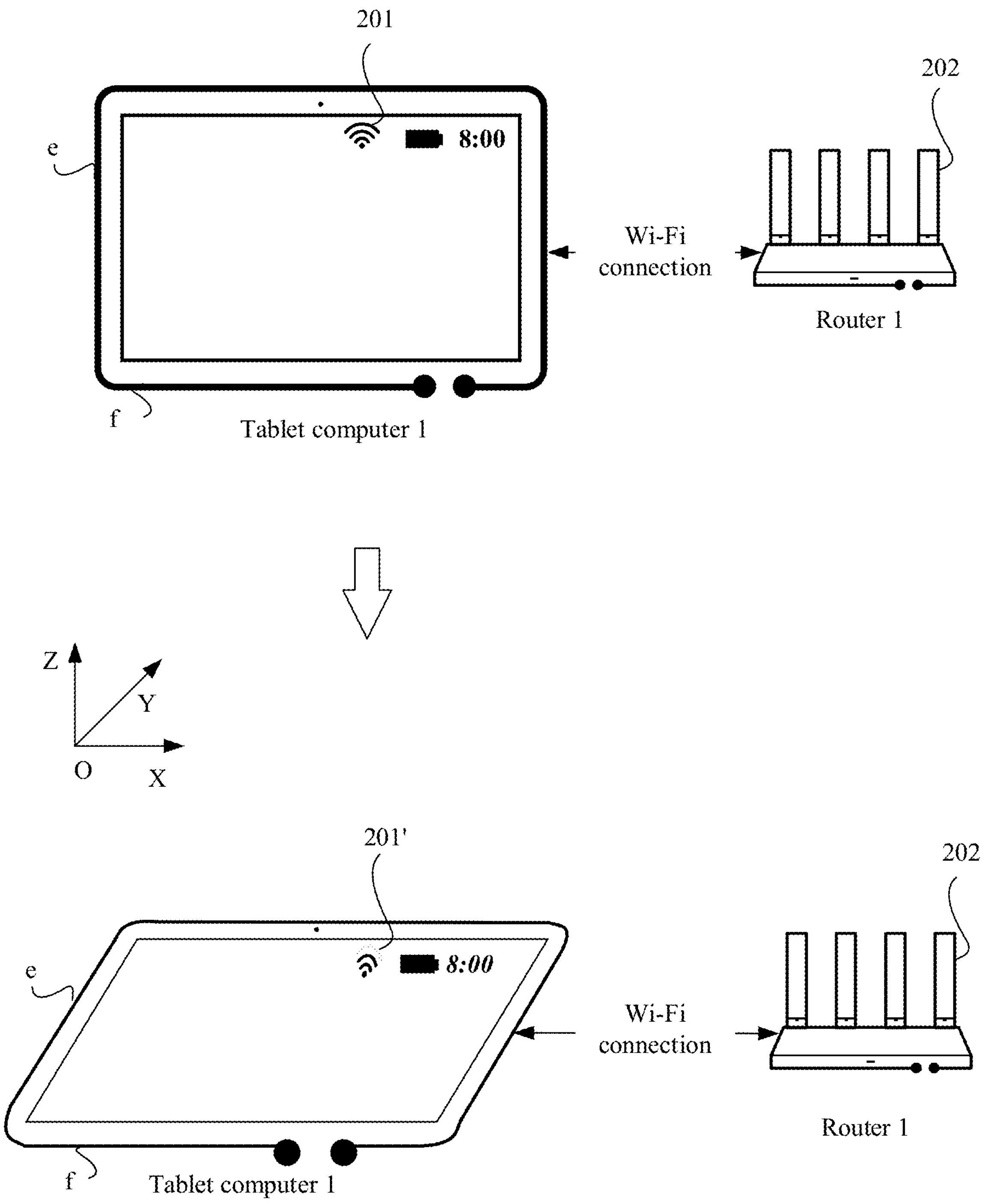
FIG. 1 is a schematic diagram of an application scenario of a tablet computer.

10—tablet computer; 101—metal middle frame; 102—FPC cable; 103—antenna gap; 201—signal strength identifier; 202—antenna; 201'—signal strength identifier; 20—metal plate in a tablet computer; 40—battery in a tablet computer; 50—battery rib retaining wall in a tablet computer; 60—LCD metal layer; 80—free space; 90—main board in a tablet computer; 30—resonant cavity antenna; 301—antenna cavity; 302—first gap; 303—feeding pall; 3041-3049—foam; 3031—feeding structure; 3032—PCB board; 3033—feeding point.

DETAILED DESCRIPTION OF ILLUSTRATIVE EMBODIMENTS

The following clearly and completely describes the technical solutions in embodiments of this application with reference to the accompanying drawings in embodiments of this application. It is clear that the described embodiments are some rather than all of embodiments of this application. Based on embodiments of this application, all other embodiments obtained by a person of ordinary skill in the art without creative efforts fall within the protection scope of this application.

The term "and/or" in this specification is merely an association relationship of associated objects, and indicates that three relationships may exist. For example, A and/or B may indicate the following three cases: Only A exists, both A and B exist, and only B exists.

The terms "first" and "second" in the specification and claims of embodiments of this application are used to distinguish between different objects, but are not used to describe a specific sequence of objects. For example, a first target object and a second target object are used to distinguish between different target objects, but are not used to describe a specific sequence of the target objects.

In embodiments of this application, words such as "example" or "for example" are used to represent giving examples, illustrations, or descriptions. Any embodiment or design solution described as "example" or "for example" in embodiments of this application should not be construed as being more preferred or advantageous than other embodiments or design solutions. Specifically, the words such as "example" or "for example" are used to present related concepts in a specific manner.

In the descriptions of embodiments of this application, unless otherwise stated, "a plurality of" means two or more. For example, a plurality of processing units refer to two or more processing units, and a plurality of systems refer to two or more systems.

An embodiment of this application provides an electronic device. The electronic device includes a main board, a display, a battery, a mobile communications module, a wireless communications module, an antenna, and the like. The main board may be integrated with a processor, an internal memory, a charging circuit, or the like. Certainly, the electronic device may further include another component, and another circuit structure may be integrated into the main board. This is not limited in this embodiment of this application.

The processor may include one or more processing units. For example, the processor may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The GPU is a microprocessor for image processing, and is connected to the display and the application processor. The GPU is configured to perform mathematical and geometric calculation and render graphics. The mobile phone implements a display function by using the GPU, the display, the application processor, and the like.

The charging circuit of the electronic device includes a power management circuit and a charging management circuit. The power management circuit is connected to a battery, the charging management circuit, and the processor. The charging management circuit may receive a charging input from a charger to charge the battery. While charging the battery, the charging management circuit may further supply power to the mobile phone by using the power management circuit. The power management circuit receives an input of the battery and/or the charging management module, and supplies power to the processor, the internal memory, the display, the camera, the antenna, the mobile communications module, the wireless communications module, and the like.

A wireless communication function of the electronic device may be implemented by using the antenna, the mobile communications module, the wireless communications module, the modem processor, the baseband processor, and the like.

The antenna is configured to transmit and receive electromagnetic wave signals. Each antenna in the electronic device may be configured to cover one or more communication bands. Different antennas may be multiplexed to improve antenna utilization. For example, an antenna may be multiplexed into a diversity antenna of a wireless local area network. In some other embodiments, the antenna may be used in combination with a tuning switch.

The mobile communications module may provide a solution for wireless communication, including 2G/3G/4G/5G and the like, that is applied to the electronic device. The mobile communications module may include at least one filter, a switch, a power amplifier, a low noise amplifier (low noise amplifier, LNA), and the like. The mobile communications module may receive an electromagnetic wave by using the antenna, perform processing such as filtering and amplification on the received electromagnetic wave, and send a processed electromagnetic wave to the modem processor for demodulation. The mobile communications module may further amplify a signal modulated by the modem processor, and convert the signal into an electromagnetic wave for radiation through the antenna. In some embodiments, at least some function modules of the mobile communications module may be disposed in the processor. In some embodiments, at least some function modules of the mobile communications module may be disposed in a same component as at least some modules of the processor.

The modem processor may include a modulator and a demodulator. The modulator is configured to adjust a to-be-sent low-frequency baseband signal to a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (such as the speaker or the receiver), or displays an image or a video by using the display. In some embodiments, the modem processor may be an independent device. In some other embodiments, the modem processor may be independent of the processor and disposed in a same device as the mobile communications module or another function modules.

The wireless communications module may provide a solution for wireless communication that is applied to the electronic device and that includes a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module may be one or more components that integrate at least one communications processing module. The wireless communications module receives an electromagnetic wave through the antenna, performs frequency modulation and filtering on an electromagnetic wave signal, and sends a processed signal to the processor. The wireless communications module may further receive a to-be-sent signal from the processor, perform frequency modulation and amplification on the to-be-sent signal, and convert the to-be-sent signal into an electromagnetic wave for radiation through the antenna.

In some embodiments, in the electronic device, an antenna is coupled to the mobile communications module, and another antenna is coupled to the wireless communications module, so that the electronic device can communicate with a network and another device according to a wireless communications technology.

In embodiments of this application, a tablet computer is used as an example of the electronic device. FIG. 1 is a schematic diagram of an application scenario of a tablet computer. As shown in FIG. 1, a horizontal plane may be an XOY plane in FIG. 1. A user places the tablet computer 1 on a table surface vertically, and the table surface is parallel to the horizontal plane. A short axis e of the tablet computer 1 is parallel to a Z-axis in a coordinate system shown in FIG. 1, and a long axis f is parallel to an X-axis in the coordinate system shown in FIG. 1. A plane on which a display of the tablet computer 1 is located is a plane including the long axis f and the short axis e of the tablet computer 1. When the tablet computer 1 is perpendicular to the table surface, the display of the tablet computer 1 is also perpendicular to the horizontal plane. It may be understood that an included angle between the display in the tablet computer 1 and the horizontal plane is not limited to 90 degrees, and a range of the included angle may be 30~150 degrees. In this example, a degree of the included angle is not limited. An antenna in the tablet computer 1 is usually an MDA or FPC antenna that surrounds a ground plate in the tablet computer 1. Optionally, the ground plate in the tablet computer may include a main board in the tablet computer 1. In another example, the ground plate in the tablet computer may further include an aluminum alloy plate on which the main board is deployed. This is not listed one by one in this example. Because the ground plate of the tablet computer 1 is parallel to the display, the FPC antenna in the tablet computer 1 generates an electric field perpendicular to the horizontal plane (such as the XOY plane in FIG. 1), that is, a polarization direction of the FPC antenna of the tablet computer 1 is perpendicular to the XOY plane.

The user places a router 1 on the ground that is parallel to the horizontal plane, and an antenna 202 in the router 1 is perpendicular to the horizontal ground (that is, as shown in FIG. 1, the antenna 202 in the router 1 is parallel to the Z-axis in FIG. 1). The antenna 202 of the router 1 generates an electric field perpendicular to the horizontal plane (such as the XOY plane in FIG. 1), that is, a polarization direction of the antenna 202 of the router 1 is perpendicular to the XOY plane. It can be learned that when the tablet computer 1 is placed on the horizontal plane vertically, the polarization direction of the antenna in the tablet computer 1 is the same as the polarization direction of the antenna 202 in the router 1, that is, the polarization direction of the antenna in the tablet computer 1 matches the polarization direction of the antenna 202 in the router 1, and a signal receiving capability of the tablet computer 1 is strong. In this example, a signal strength identifier 201 is displayed in an interface of the tablet computer 1. The signal strength identifier 201 is used to indicate strength of a signal received by the tablet computer 1. For example, if a quantity of signal bars of the signal strength identifier 201 is full (that is, 3), it indicates that received signal strength of the tablet computer 1 is high, and a network delay of the tablet computer 1 is low, for example, a delay of a game is less than 50 ms.

As shown by an arrow in FIG. 1, the user places the tablet computer 1 horizontally on the table surface (that is, the display of the tablet computer 1 is parallel to the horizontal plane). A direction of an electric field generated by the antenna in the tablet computer 1 is parallel to the XOY plane, that is, the polarization direction of the antenna in the tablet computer 1 is parallel to the XOY plane. The user does not change a direction of the antenna in the router 1, and the polarization direction of the antenna in the router 1 is still perpendicular to the XOY plane. The polarization direction of the antenna in the tablet computer 1 is inconsistent with the polarization direction of the antenna in the router 1, that is, the polarization direction of the antenna in the tablet computer 1 does not match the polarization direction of the antenna in the router 1. Therefore, a signal receiving capability of the tablet computer 1 decreases. As shown in FIG. 1, a signal strength identifier 201' in the interface of the tablet computer 1 indicates two bars. For example, a delay of a game is 100 ms. A signal receiving capability of the tablet computer 1 perpendicular to the table surface is stronger than a signal receiving capability of the tablet computer 1 parallel to the table surface. It can be learned that a change in a posture of the tablet computer 1 causes a change in a signal receiving capability of the tablet computer 1, for example, the signal receiving capability of the tablet computer 1 decreases.

Figure 2:
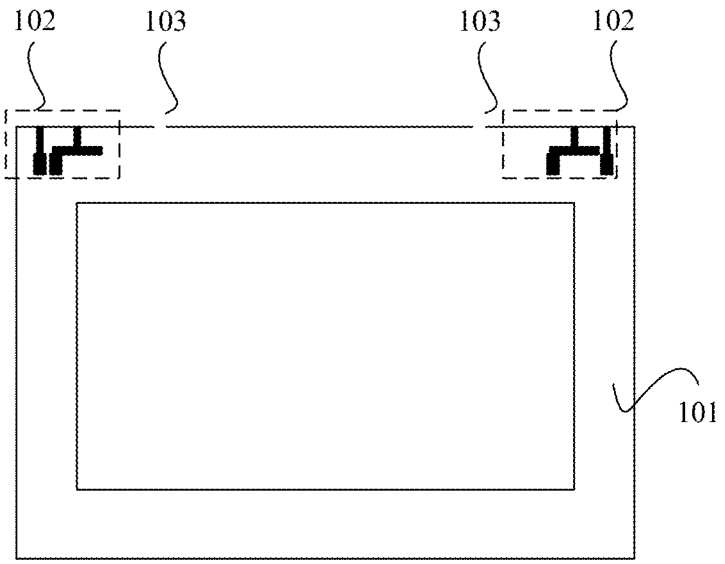
FIG. 2 is a schematic diagram of an expanded plane of a metal middle frame in a tablet computer.

A structure of the tablet computer 1 includes the display, a metal rear housing that is parallel to and separated from the display, and a metal middle frame disposed between the metal rear housing and the display. An antenna of an electronic device is usually an MDA or FPC antenna, and the MDA or FPC antenna is deployed in a metal middle frame. In this example, an FPC antenna surrounding a ground plate is used as an example for description. FIG. 2 is a schematic diagram of an expanded plane of a metal middle frame in a tablet computer 1.

As shown in FIG. 2, an FPC antenna 102 is disposed on a metal middle frame 101, and an opening is disposed on the metal middle frame 101 to form an antenna gap 103 of the FPC antenna. The FPC antenna 102 includes a radiating element coupled to the metal frame 101, and a feeding pin connected to the radiating element and a radio frequency output end of the tablet computer 1. The metal frame 101 is electrically connected to the reference ground of the tablet computer 1. A wireless communications module or a mobile communications module transmits a signal to the FPC antenna 102, and the FPC antenna 102 radiates an electromagnetic wave signal by using the antenna gap 103.

In this example, the FPC antenna in the tablet computer 1 surrounds the ground plate, a polarization direction of the FPC antenna 102 is parallel to the display, and the polarization direction is single. When a posture of the tablet computer 1 changes, a signal receiving capability of the antenna of the tablet computer 1 changes. As shown in FIG. 1, the tablet computer 1 changes to be placed parallel to the horizontal plane, resulting in mismatching with a polarization direction of the antenna 202 in the router 1. The signal receiving capability of the tablet computer decreases, affecting user's network access experience. Optionally, the network may be a Wi-Fi network, a Bluetooth network, a 4G/5G network, or the like. In addition, currently, an electronic device (such as a mobile phone or a tablet computer) uses an all-metal-rear-housing industrial design (industrial design, ID), and an antenna surrounding a ground plate cannot radiate a signal to the outside by using the rear housing.

Figure 3:
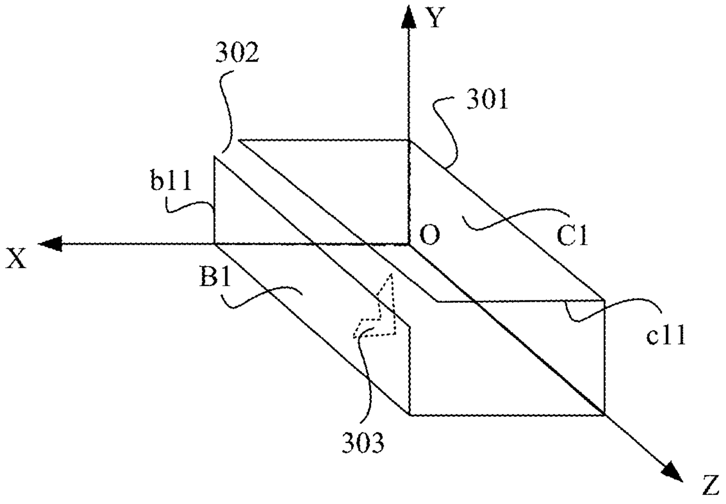
FIG. 3 is a schematic diagram of a structure of a resonant cavity antenna according to an embodiment of this application.

Based on this, this application provides a resonant cavity antenna. FIG. 3 is a schematic diagram of a structure of a resonant cavity antenna. The structure of the resonant cavity antenna is shown in FIG. 3, including an antenna cavity 301 of the resonant cavity antenna, a first gap 302, and a feeding part 303 located in the antenna cavity 301.

An electromagnetic wave has a standing wave characteristic inside the resonant cavity antenna, has a radiation characteristic outside the resonant cavity antenna, and has an antenna characteristic. In this example, the antenna cavity 301 may use a rectangular waveguide. The rectangular waveguide is usually a regular metal waveguide made of metal. The rectangular waveguide has a rectangular cross section, and the rectangular waveguide is filled with an insulating medium.

The resonant cavity antenna includes six metal surfaces, to form the antenna cavity 301 shown in FIG. 3. A cross section of the antenna cavity 301 is a plane parallel to XOY in a coordinate system shown in FIG. 3. As shown in FIG. 3, the first gap 302 may be disposed on a C1 surface. The C1 surface is parallel to the XOZ plane in the coordinate system shown in FIG. 3. The first gap 302 may alternatively be disposed on a B1 surface, and the B1 surface is parallel to a YOZ plane in the coordinate system shown in FIG. 3. The first gap 302 may alternatively be located in an intersection area between the B1 surface and the C1 surface. For example, a short axis c11 that is in the C1 surface and that is close to the B1 surface is reduced, and the short axis c11 extends in an X direction in the coordinate system shown in FIG. 3. In addition, a short axis b11 that is in the B1 surface and that is close to the C1 surface is reduced, and b11 extends in a Y direction in the coordinate system shown in FIG. 3. A width of the first gap may be set according to actual application.

The feeding part 303 is located in the antenna cavity 301, the feeding part 303 does not touch the first gap 302, and the feeding part is connected to a radio frequency link of a main board by using an external radio frequency coaxial transmission line (that is, a cable line).

A radio frequency signal on the radio frequency link of the main board is fed into the feeding part 303 by using the cable line. The feeding part 303 excites a half-mode waveguide resonance mode of the resonant cavity antenna, to transmit an electromagnetic wave at a radiation aperture (that is, the first gap 302). Alternatively, an electromagnetic wave may be received by using the radiation aperture.

In a possible embodiment, in this application, that the first gap is disposed on the C1 surface is used as an example to specifically describe the resonant cavity antenna.

Figure 4:
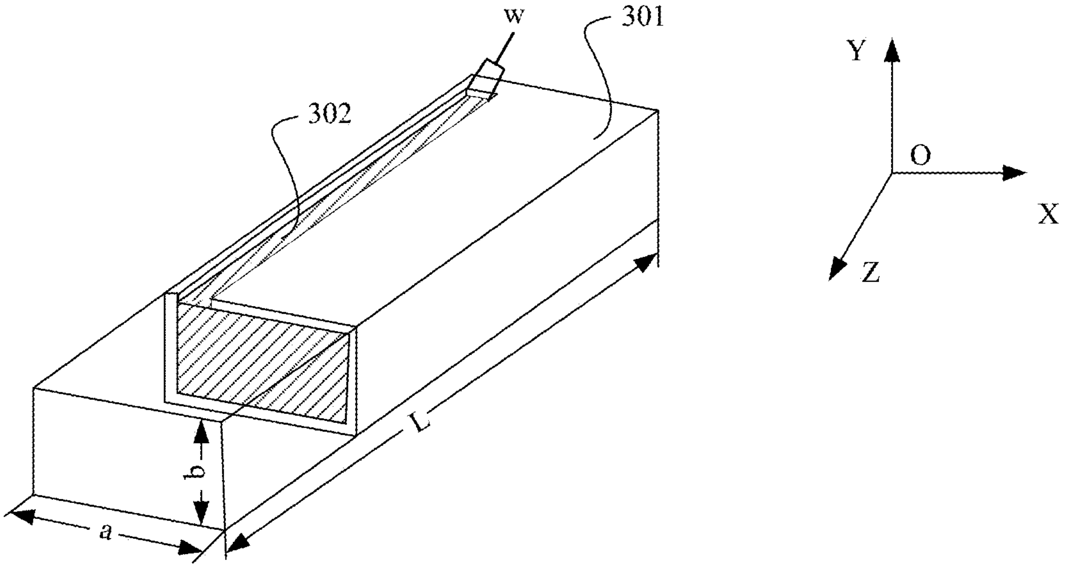
FIG. 4 is a three-dimensional schematic diagram of a resonant cavity antenna according to an embodiment of this application.

FIG. 4 is a three-dimensional schematic diagram of a resonant cavity antenna 30. As shown in FIG. 4, an axis extending in the Z direction in the resonant cavity antenna is used as a length axis, denoted as L. An axis extending in the X direction in FIG. 4 in the resonant cavity antenna is used as a width axis, denoted as a. An axis extending in the Y direction in FIG. 4 in the resonant cavity antenna is used as a height axis, denoted as b. The first gap is disposed on the C1 surface, and a width of the first gap 302 is denoted as w. Slashes in FIG. 4 indicate an insulating medium in the resonant cavity antenna. Two cross sections including a and b of the resonant cavity antenna 30 are both metal surfaces.

A TE mode and a TM mode exist in the antenna cavity 301 (also referred to as a resonant cavity), and a unique vertical direction (that is, a propagation direction) does not exist in the antenna cavity 301. Therefore, names of the TE mode and the TM mode are not unique. For example, the Z-axis is used as a reference "propagation direction". Because there are conductive walls at z=0 and z=L, and an electromagnetic wave is reflected to form a standing wave, there is no wave propagation in the antenna cavity 301. For a $TE_{m,n,p}$ mode, m and n can be zero (m and n cannot be zero at the same time), and p cannot be zero. Based on a size of the electronic device, the height axis b is a minimum dimension that restricts the antenna cavity. Due to limitation of the size of the cross section, there is no half wavelength in height in sub-6G, and there is a power line in the cross section. Therefore, in a $TE_{m,o,p}$ mode, m and p are integers.

In this example, because the first gap is disposed in the resonant cavity antenna, a wavelength of the resonant cavity changes to ¼ wavelength, and the TE mode may be a $TE_{0.5,0,1}$ mode.

For the $T_{m,n,p}$ mode and the $TE_{m,n,p}$ mode, an expression of a resonance frequency of the resonant cavity is:

$$f_{mnp} = \frac{w_{mnp}}{2\pi} = \frac{k_{mnp}}{2\pi\sqrt{\mu\varepsilon}} = \frac{1}{\sqrt{\mu\varepsilon}}\sqrt{\left(\frac{m}{2a}\right)^2 + \left(\frac{n}{2b}\right)^2 + \left(\frac{p}{2l}\right)^2} \quad \text{Formula 1}$$

Herein, m indicates a quantity of half standing waves distributed in the X direction, n indicates a quantity of half standing waves distributed in the Y direction, and p indicates a quantity of half standing waves distributed in the Z direction. μ and ε are constants. $w_{mnp}$ is used to indicate the speed of light. $k_{mnp}$ is used to indicate a constant. a indicates a value of the width axis of the resonant cavity, b indicates a value of the height axis of the resonant cavity, and l indicates a value of the length axis of the resonant cavity. It may be learned from formula (1) that a, b, and l in the resonant cavity are related to each other. For example, when media in the resonant cavity antenna are the same, and the resonant cavity antenna works in $TE_{0.5,0,1}$, a value range of a in the resonant cavity antenna may be [0.25λ−0.25λ*10%, 0.25λ+0.25λ*10%], a value of b is less than 0.25λ, and a value range of l may be [0.5λ−0.5λ*20%, 0.5λ+0.5λ*20%], where λ is used to indicate a wavelength at which the resonant cavity antenna works. In another example, when media in the resonant cavity antenna are the same, and the resonant cavity antenna works in $TE_{0.5,0,0.5}$, a value range of a in the resonant cavity antenna may be [0.25λ−0.25λ*10%, 0.25λ+0.25λ*10%], a value of b is less than 0.25λ, and a value range of l may be [0.25λ−0.25λ*20%, 0.25λ+0.25λ*20%], where λ is used to indicate a wavelength at which the resonant cavity antenna works.

It should be noted that a size of the resonant cavity antenna is set according to a resonance frequency of the resonant cavity antenna. For example, if the resonance frequency is 2.45 GHz, and the working mode is $TE_{0.5,0,1}$, two cross sections of the resonant cavity antenna are closed conductive walls, a value of the length axis of the resonant cavity antenna is 80 mm, a value of the width axis of the resonant cavity antenna is 15.5 mm, and a value of the height axis of the resonant cavity antenna is 6.5 mm. If the resonance frequency of the resonant cavity antenna is 2.45 GHz, and the working mode is $TE_{0.5,0,0.5}$, a value of the length axis of the resonant cavity antenna is 45 mm, a value of the width axis of the resonant cavity antenna is 15.5 mm, and a value of the height axis of the resonant cavity antenna is 6.5 mm.

In this example, that the resonant cavity antenna runs in the $TE_{0.5,0,1}$ mode is used as an example for description.

Figure 5:
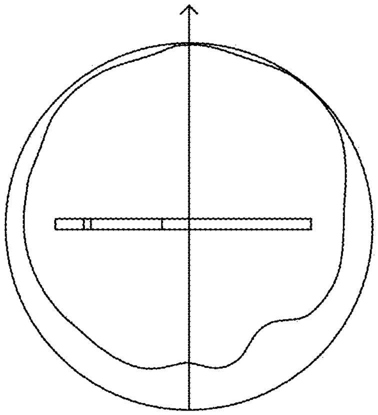
FIG. 5 is a far field view of a resonant cavity antenna.

A far field direction diagram of the resonant cavity antenna in this example is shown in FIG. 5. A rectangle in FIG. 5 is a schematic diagram of a side surface of the tablet computer (that is, a surface including an f-axis in the tablet computer and a height of the tablet computer). Because the first gap is disposed on the C1 surface, in FIG. 5, a strength proportion of field strength of an external electric field of the resonant cavity antenna on the C1 surface is greater than that on a surface opposite the C1 surface. Because of an edge effect, a power line is still around an axis of an intersection between the B1 surface and the C1 surface of the tablet computer, and an electric field of the metal rear housing of the tablet computer is excited by using an induced electromotive force difference, thereby implementing field coverage on the back of the tablet computer.

Figure 6:
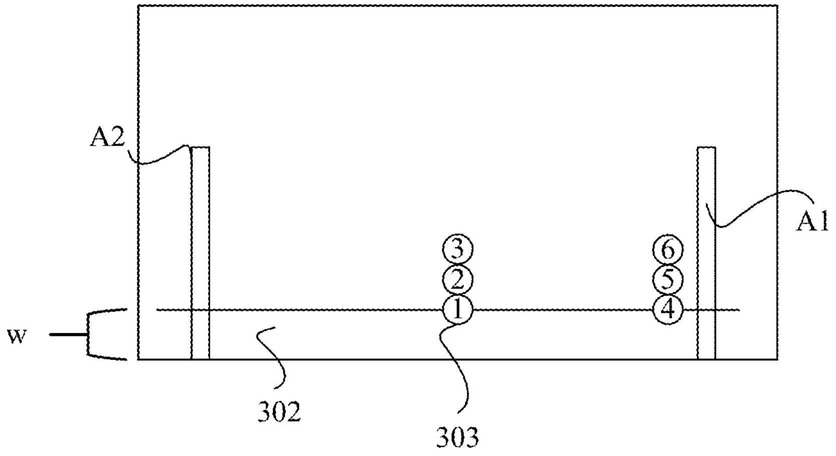
FIG. 6 is a schematic diagram of positions of different feeding parts in a resonant cavity antenna.
Figure 7:
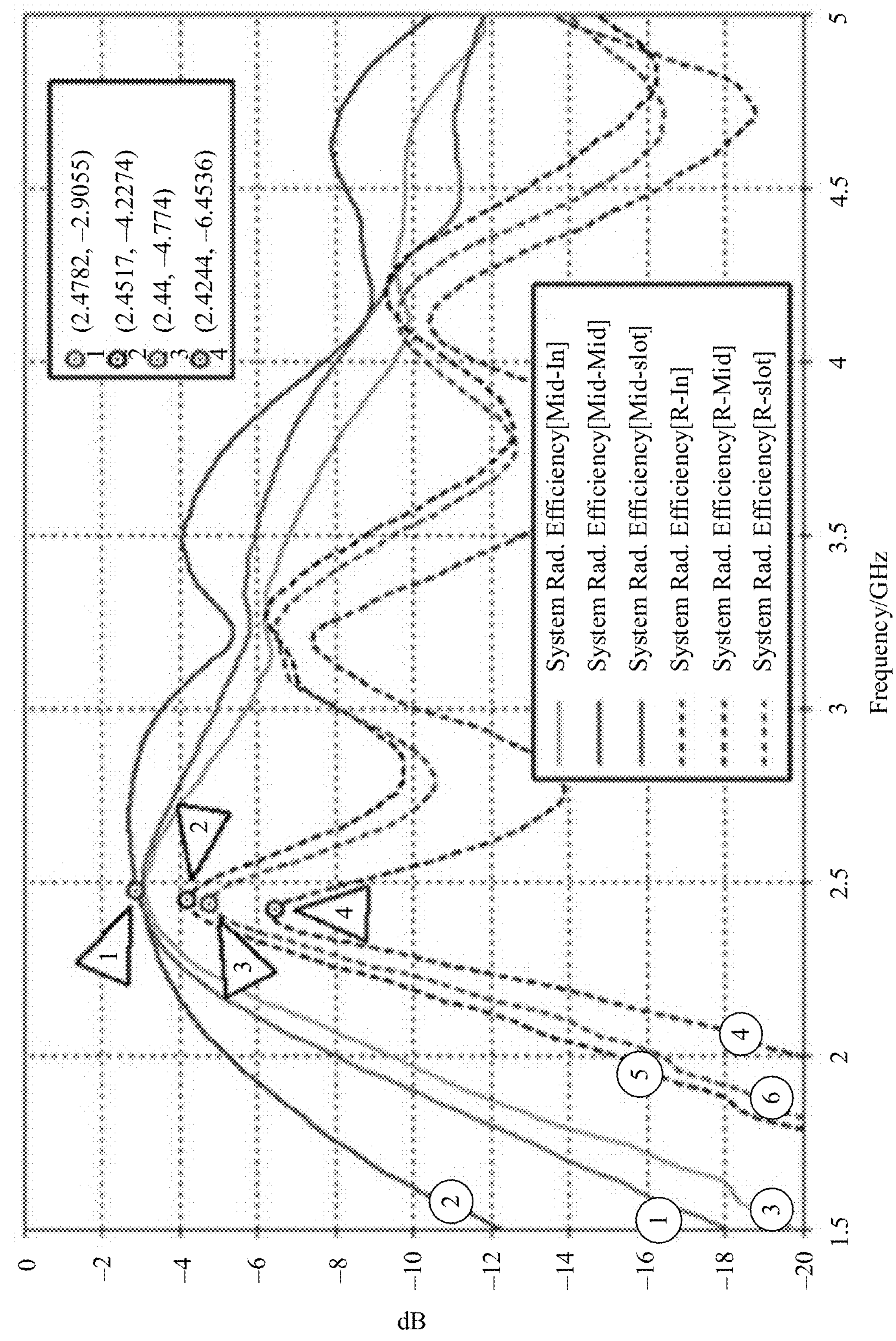
FIG. 7 is a diagram of radiation efficiency of a feeding part 303 at positions of reference signs ①~⑥.
Figure 8:
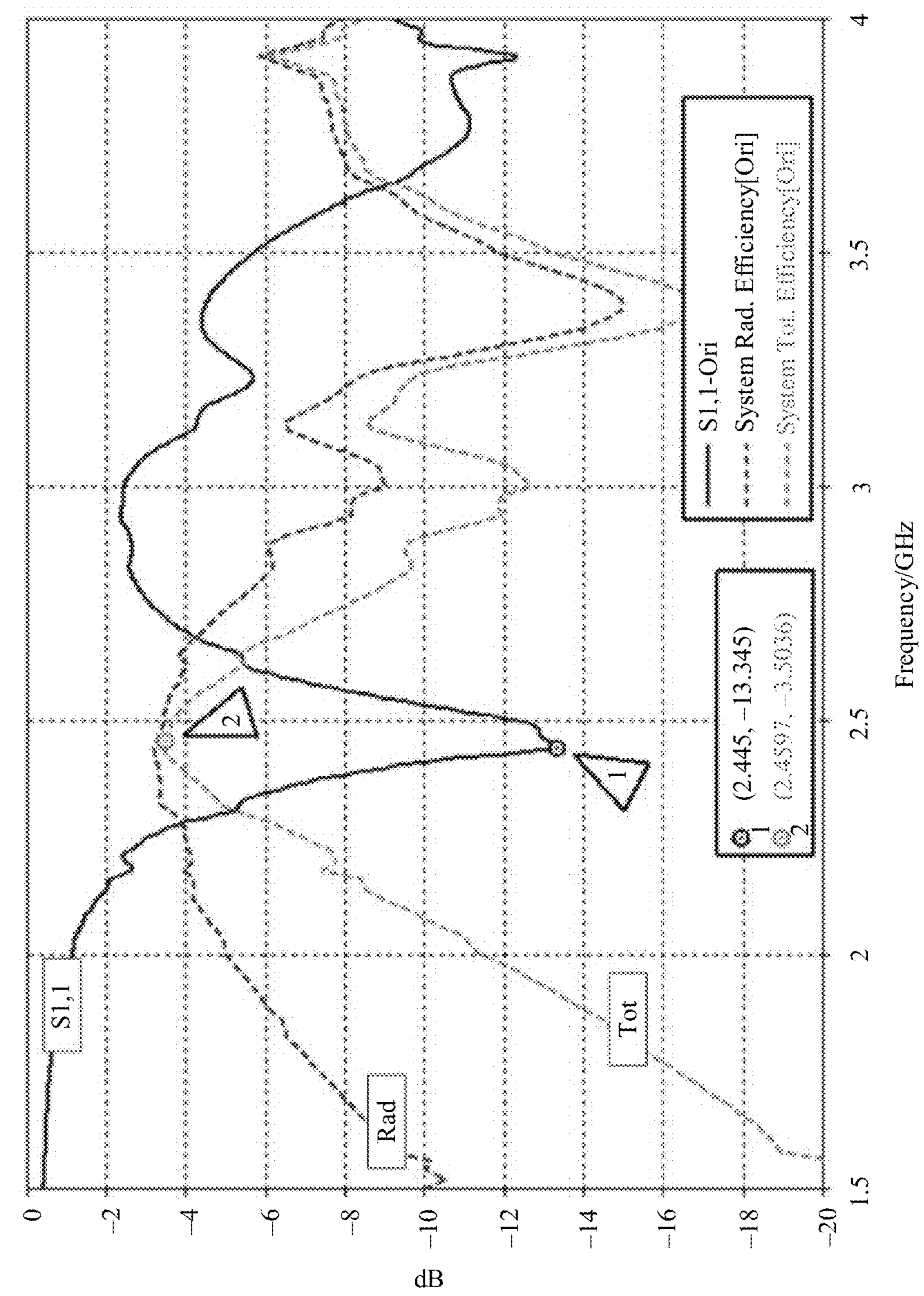
FIG. 8 is a schematic diagram of an S parameter and antenna radiation efficiency of a resonant cavity antenna using a distributed feeding structure.

The following describes, with reference to FIG. 6 to FIG. 8, impact of a feeding part position on antenna performance of a resonant cavity antenna.

FIG. 6 shows different feeding part positions in the resonant cavity antenna. FIG. 6 shows a top view of the tablet computer and a top view of the resonant cavity antenna. A1 and A2 in FIG. 6 are top views of two sections (that is, a plane including the width axis and the height axis) of the resonant cavity antenna, and the section may have a specific thickness in practice. As shown in FIGS. 6, A1 and A2 are rectangular. A width of the first gap 302 is w. The feeding part 303 is separately disposed at positions with the reference signs ①~⑥. As shown in FIG. 6, the reference signs ①~③ are all disposed in the middle of the length axis L of the resonant cavity antenna, and the reference signs ④~⑥ are all disposed in a position close to a cross section of the resonant cavity antenna.

The following separately describes positions of six reference signs with reference to FIG. 4 and FIG. 6. In this example, reference is made to the coordinate system in FIG. 4. A value of the reference sign ① in the Z direction is ½ L, a value in the Y direction is 0, and a value in the X direction is in a range greater than 0 and less than w. A value of the reference sign ② in the Z direction is ½ L, a value in the Y direction is 0, and a value in the X direction is greater than w and is close to the first gap in the X direction. A value of the reference sign ③ in the Z direction is ½ L, a value in the Y direction is 0, and a value in the X direction is far away from the first gap. A value of the reference sign ④ in the Z direction is greater than ½ L and less than or equal to L, a value in the Y direction is 0, and a value in the X direction is in a range greater than 0 and less than w. A value of the reference sign ⑤ in the Z direction is greater than ½ L and is less than or equal to L, a value in the Y direction is 0, and a value in the X direction is close to the first gap and is greater than w. A value of the reference sign in the Z direction is greater than ½ L and is less than or equal to L, a value in the Y direction is 0, and a value in the X direction is far away from the first gap.

FIG. 7 is a diagram of radiation efficiency of the feeding part 303 at positions with reference signs ①~⑥. In FIG. 7, for example, a size of the resonant cavity antenna is a=15.5 mm, b=6.5 mm, L=80 mm, and w=3 mm. As shown in FIG. 7, a horizontal coordinate of the radiation efficiency diagram is resonance frequency (a unit is GHz), and a vertical coordinate is antenna radiation efficiency (a unit is dB). When the feeding part 303 is located at the position with the reference sign ①, a radiation efficiency curve of the antenna is shown as the reference sign ① in FIG. 7. When the feeding part 303 is located at the position with the reference sign ①, a peak value of the radiation efficiency is at a position of the triangle 1 (that is, 2.4782 GHz). When the feeding part 303 is located at the position with the reference sign ②, a peak value of the radiation efficiency is at the position of the triangle 1 (that is, 2.4782 GHz). When the feeding part 303 is located at the position with the reference sign ③, a peak value of the radiation efficiency is at the position of the triangle 1 (that is, 2.4782 GHz). Bandwidth of the feeding part 303 at the position with the reference sign ② is greater than bandwidth of the feeding part 303 at the position with the reference sign ③ and bandwidth of the feeding part 303 at the position with the reference sign ①. When the feeding part is located at the position with the reference sign ④, a peak value of the radiation efficiency is at a position of a triangle 4 (that is, 2.4244 GHz). When the feeding part 303 is located at the position with the reference sign ⑤, a peak value of the radiation efficiency is at a position of a triangle 2 (that is, 2.4517 GHz). When the feeding part is located at the position with the reference sign ⑥, a peak value of the radiation efficiency is at a position of a triangle 3 (that is, 2.44 GHz). The radiation efficiency of the feeding part at the position with the reference sign ④, the position with the reference sign ⑤, and the position with the reference sign ⑥ is lower than that of the feeding part 303 at the position with the reference sign ①, the position with the reference sign ②, and the position with the reference sign ③. The bandwidths of the feeding part 303 at the position with the reference sign ① and the position with the reference sign ③ are low, that is, in the six positions, radiation efficiency at the position with the reference sign ② is high, a bandwidth is high, and the position with the reference sign ② is used as a maximum point of an electric field. Therefore, the feeding part 303 may be deployed at this position. Deploying the feeding part at the maximum point of the electric field helps the antenna transmit and receive signals. Optionally, in this example, when the resonant cavity antenna works in the $TE_{0.5,0,1}$ mode, the feeding part 303 may be disposed in the position with the reference sign ②.

Optionally, in this example, the feeding part may use a distributed feeding structure. In the distributed feeding structure, the antenna capacitance and inductance are adjusted by adjusting the shape of the feeding structure.

FIG. 8 is a schematic diagram of an S parameter and antenna radiation efficiency of a resonant cavity antenna using a distributed feeding structure. For example, S1,1 in FIG. 8 is used to indicate a resonance curve of the resonant cavity antenna in the position with the reference sign ② in FIG. 6. It can be learned from the curve S1,1 that a resonance frequency of the resonant cavity antenna is 2.445 GHz. A reference sign Rad in FIG. 8 is used to indicate a radiation efficiency curve of the antenna, and a reference sign Tot in FIG. 8 is used to indicate a system efficiency curve of the antenna. Peak values of system efficiency and radiation efficiency of the resonant cavity antenna are both at 2.4597 GHz. It can be learned from the diagram of the S parameter curve and the radiation efficiency of the antenna in FIG. 8 that the radiation efficiency of the distributed feeding structure is consistent with an efficiency effect of a conventional component adjustment manner (for example, capacitor and inductor adjustment).

In an embodiment, antenna performance of a resonant cavity antenna is related to size information and a shape of the resonant cavity antenna. The size information of the resonant cavity antenna includes information about a length axis (that is, L), information about a width axis (that is, a), and information about a height axis (that is, b) in the resonant cavity antenna.

Figure 9:
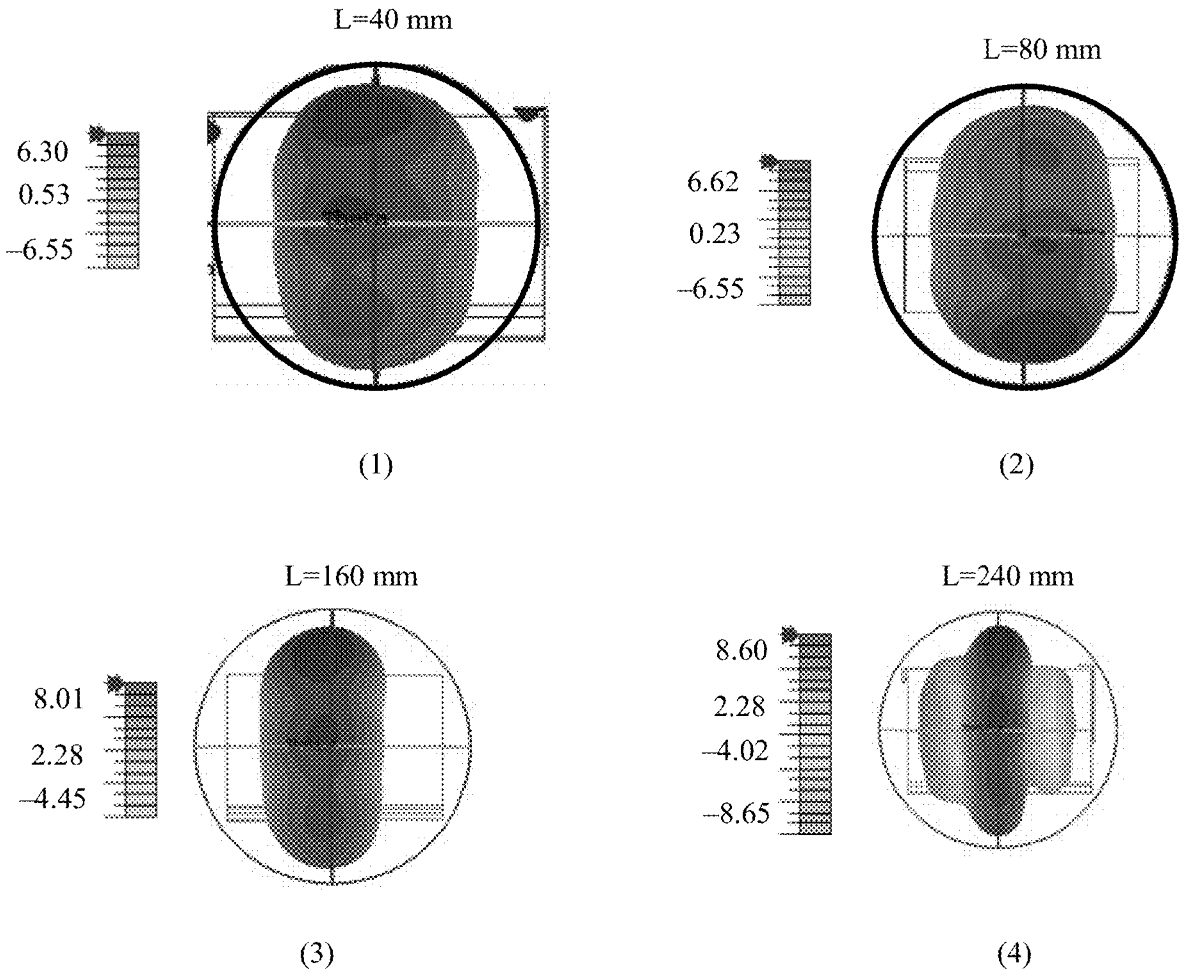
FIG. 9 is a schematic diagram of impact of a length of a length axis in an antenna cavity 301 on a TE mode.

FIG. 9 is a schematic diagram of impact of a length of a length axis (that is, L) in an antenna cavity 301 on a TE mode.

The tablet computer 1 in FIG. 9 is placed parallel to the horizontal plane (that is, the display of the tablet computer 1 is parallel to the horizontal plane), and FIG. 9 shows a top view of the tablet computer 1. A size of the tablet computer 1 is 276 (that is, the f-axis) mm*187 (the e-axis) mm. In this example, a=15.5 mm, b=6.5 mm, and w=3 mm are used as an example of the resonant cavity antenna to describe impact of L on antenna performance of the resonant cavity antenna.

In this example, with reference to a three-dimensional direction diagram of the resonant cavity antenna in a case of four different values of L shown in FIG. 9, impact of L on antenna performance is described.

FIG. 9(1) is a three-dimensional direction diagram of the resonant cavity antenna when L=40 mm in the antenna cavity 301. As shown in FIG. 9(1), a directional coefficient of the resonant cavity antenna is 6.30 dBi. In FIG. 9(1), the resonant cavity antenna covers 2.45 GHz in a mode lower than $TE_{0.5,0,1}$.

FIG. 9(2) is a three-dimensional direction diagram of the resonant cavity antenna when L=80 mm in the antenna cavity 301. As shown in FIG. 9(2), a directional coefficient of the resonant cavity antenna is 6.62 dBi. In FIG. 9(2), the resonant cavity antenna covers 2.45 GHz in the $TE_{0.5,0,1}$ mode. Directivity of the resonant cavity antenna in FIG. 9(2) is less than directivity of the resonant cavity antenna in FIG. 9(1).

FIG. 9(3) is a three-dimensional direction diagram of the resonant cavity antenna when L=160 mm in the antenna cavity 301. As shown in FIG. 9(3), a directional coefficient of the resonant cavity antenna is 8.01 dBi. In FIG. 9(3), the resonant cavity antenna covers 2.45 GHz in the $TE_{0.5,0,2}$ mode. Directivity of the resonant cavity antenna in FIG. 9(3) is less than directivity of the resonant cavity antenna in FIG. 9(2).

FIG. 9(4) is a three-dimensional direction diagram of the resonant cavity antenna when L=240 mm in the antenna cavity 301. As shown in FIG. 9(4), a directional coefficient of the resonant cavity antenna is 8.60 dBi. In FIG. 9(4), the resonant cavity antenna covers 2.45 GHz in the $TE_{0.5,0,3}$ mode. Directivity of the resonant cavity antenna in FIG. 9(4) is less than directivity of the resonant cavity antenna in FIG. 9(3).

It may be learned from FIG. 9(1) to FIG. 9(4) that when L=40 mm, directivity of the resonant cavity antenna is optimal. For different values of L, the resonant cavity antenna needs to cover 2.45 GHz in different TE modes. In addition, as the length of L increases, a working mode of the resonant cavity antenna gradually changes from a mode lower than $TE_{0.5,0,1}$ to the $TE_{0.5,0,3}$ mode, that is, changes from a fundamental mode to a second-order mode and a third-order mode, and directivity of the resonant cavity antenna gradually deteriorates. When the resonant cavity antenna covers 2.45 GHz, L is the largest and directivity is optimal when the fundamental mode is used for working. After the resonant cavity antenna works in a high-order mode, directivity deteriorates to different extents.

Figure 10:
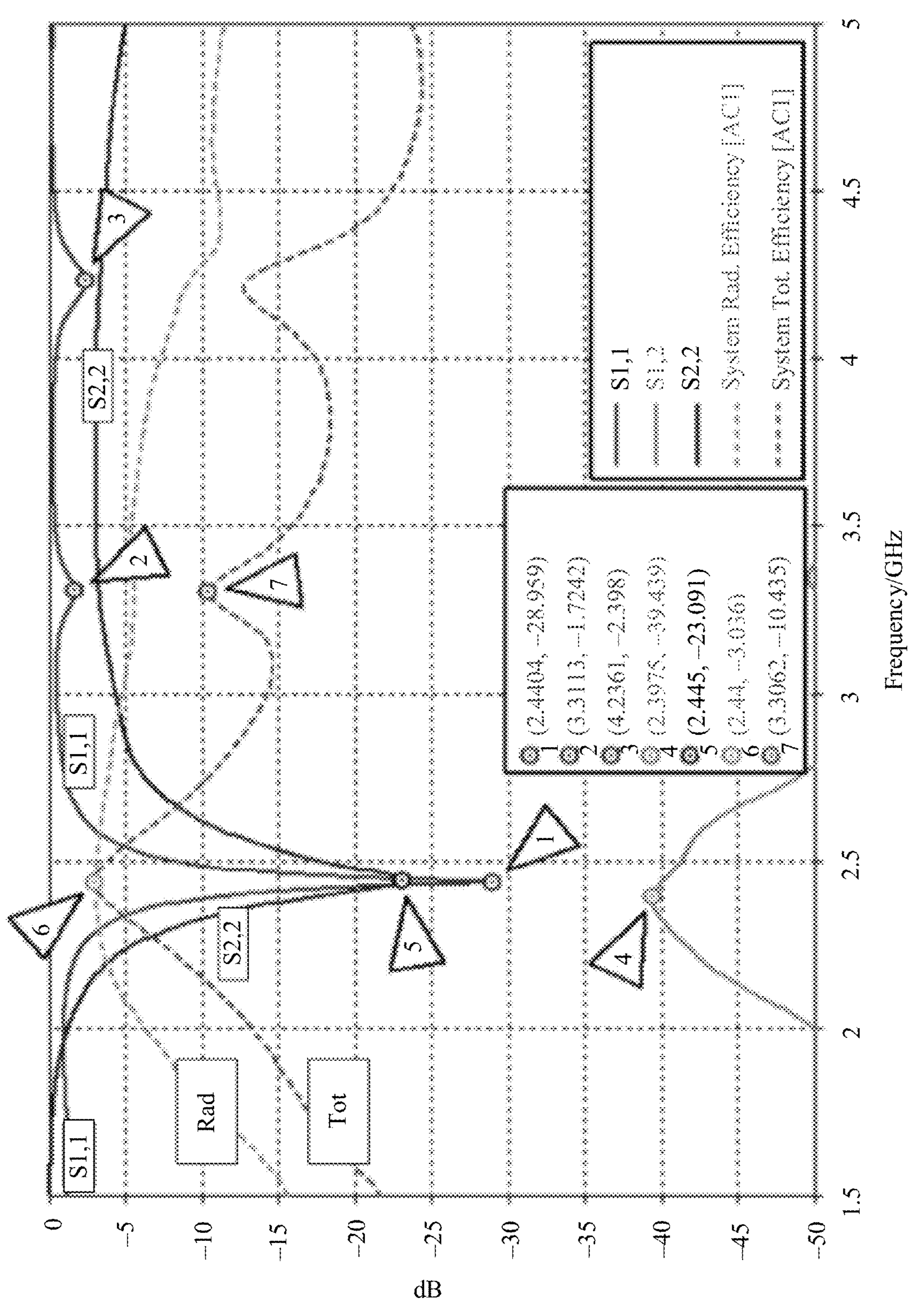
FIG. 10 is a schematic diagram of radiation efficiency of a resonant cavity antenna when a width of a first gap is reduced by 1 mm.

With reference to FIG. 7 and FIG. 10, this example describes impact of the width of the first gap in the resonant cavity antenna on antenna performance. In FIG. 7, for example, a size of the resonant cavity antenna is a=15.5 mm, b=6.5 mm, L=80 mm, and w=3 mm. FIG. 10 is a schematic diagram of radiation efficiency of a resonant cavity antenna when a width of a first gap is reduced by 1 mm (that is, w=2 mm). That is, in the resonant cavity antenna in FIG. 10, a=15.5 mm, b=6.5 mm, L=80 mm, and w=2 mm.

As shown in FIG. 10, when the size of the resonant cavity antenna is a=15.5 mm, b=6.5 mm, L=80 mm, and w=2 mm, a reference sign Rad is used to indicate a curve of radiation efficiency of the resonant cavity antenna. A peak value of the Rad curve is at a triangle reference sign 6, and the triangle reference sign 6 (that is, 2.44 GHz) in FIG. 10 is 30 MHz less than a triangle reference sign 1 (that is, 2.47 GHz) in FIG. 7 in terms of the peak value of the radiation efficiency of the resonant cavity antenna. The reference sign Tot in FIG. 10 is used to indicate system efficiency of the resonant cavity antenna. The reference sign S1,1 is used to indicate a resonance curve of the resonant cavity antenna at the position with the reference sign in FIG. 6. The reference sign S2,2 is used to indicate a resonance curve of a Bluetooth antenna in the tablet computer 1. The reference sign S1,2 is used to indicate a curve of isolation between the Bluetooth antenna in the tablet computer 1 and the resonant cavity antenna in this example.

Figure 11:
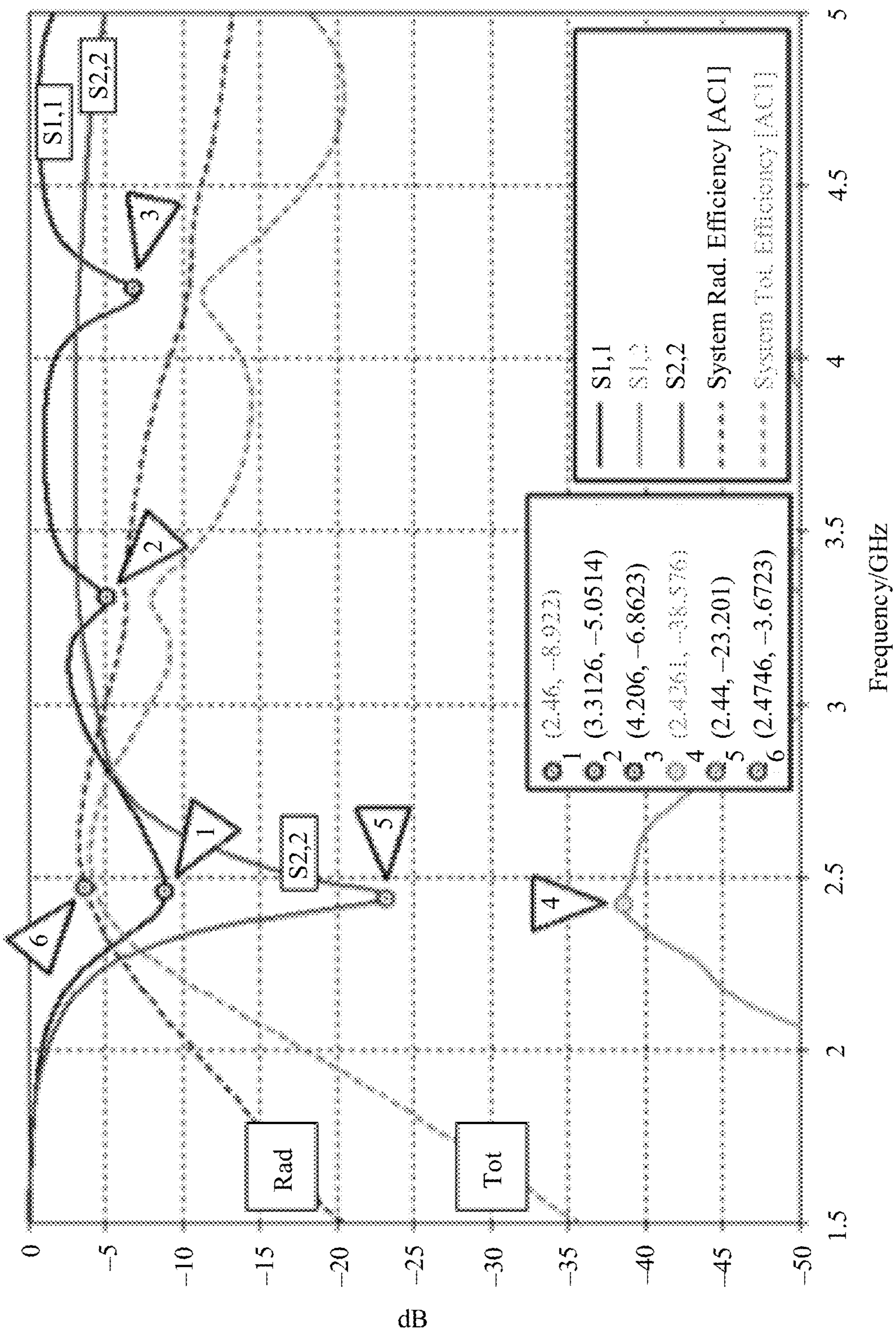
FIG. 11 is a schematic diagram of radiation efficiency of a resonant cavity antenna when a height of a height axis in an antenna cavity is reduced by 1 mm.

With reference to FIG. 7 and FIG. 11, this example describes impact on antenna performance when a height of the height axis (that is, b) in the resonant cavity antenna decreases. In FIG. 7, for example, a size of the resonant cavity antenna is a=15.5 mm, b=6.5 mm, L=80 mm, and w=3 mm. FIG. 11 is a schematic diagram of radiation efficiency of a resonant cavity antenna when a height of b is reduced by 1 mm (that is, b=5.5 mm). That is, in the resonant cavity antenna in FIG. 11, a=15.5 mm, b=5.5 mm, L=80 mm, and w=3 mm.

As shown in FIG. 11, a reference sign Rad is used to indicate a curve of radiation efficiency of the resonant cavity antenna. A peak value of the Rad curve is at a triangle reference sign 6, and the triangle reference sign 6 (that is, 2.4746 GHz) in FIG. 11 is about 50 MHz greater than a triangle reference sign 1 (that is, 2.47 GHz) in FIG. 7 in terms of the peak value of the radiation efficiency of the resonant cavity antenna. The reference sign Tot in FIG. 11 is used to indicate system efficiency of the resonant cavity antenna. The reference sign S1,1 is used to indicate a resonance curve of the resonant cavity antenna at the position with the reference sign ② in FIG. 6. The reference sign S2,2 is used to indicate a resonance curve of a Bluetooth antenna in the tablet computer 1. The reference sign S1,2 is used to indicate a curve of isolation between the Bluetooth antenna in the tablet computer 1 and the resonant cavity antenna in this example.

Figure 12:
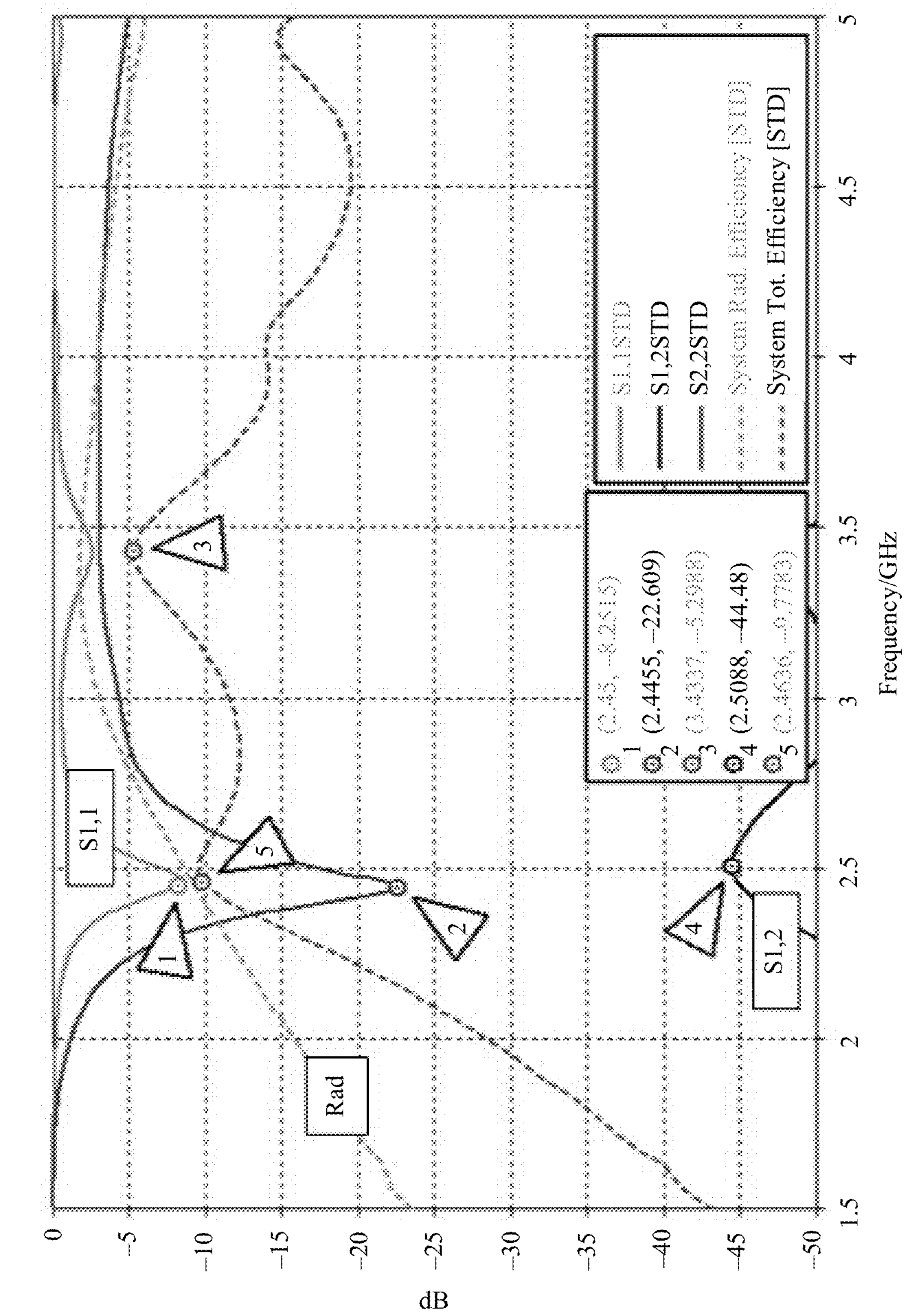
FIG. 12 is a schematic diagram of radiation efficiency of a resonant cavity antenna when a length of a width axis in an antenna cavity is reduced by 5.5 mm.

With reference to FIG. 7 and FIG. 12, this example describes impact on antenna performance when a length of the width axis (that is, a) in the resonant cavity antenna decreases. In the resonant cavity antenna in FIG. 7, a=15.5 mm, b=6.5 mm, L=80 mm, and w=3 mm. FIG. 12 is a schematic diagram of radiation efficiency of a resonant cavity antenna when a length of a is reduced by 5.5 mm (that is, a=10 mm). That is, in the resonant cavity antenna in FIG. 12, a=10 mm, b=6.5 mm, L=80 mm, and w=3 mm.

As shown in FIG. 12, a reference sign Rad is used to indicate a curve of radiation efficiency of the resonant cavity antenna. A peak value of the Rad curve is at 3.5 GHz. Compared with a triangle reference sign 1 (that is, 2.47 GHz) in FIG. 7, the peak value of the radiation efficiency of the resonant cavity antenna changes to 3.5 GHz. The reference sign Tot in FIG. 12 is used to indicate system efficiency of the resonant cavity antenna. The reference sign S1,1 STD is used to indicate a resonance curve of the resonant cavity antenna at the position with the reference sign ② in FIG. 6. The reference sign S2,2 STD is used to indicate a resonance curve of a Bluetooth antenna in the tablet computer 1. The reference sign S1,2 STD is used to indicate a curve of isolation between the Bluetooth antenna in the tablet computer 1 and the resonant cavity antenna in this example.

In this example, through analysis on antenna performance by using the width of the first gap and L, a, and b in the resonant cavity antenna, with reference to a resonant cavity mode calculation method, it may be learned that L, b, and a in the resonant cavity antenna determine working frequencies of the antenna in different modes. In a case in which sub-6G (that is, a 3 GHz~4 GHz band) and a current terminal limit a height axis (that is, b), a width change of w has low impact on resonance. The resonance frequency (that is, a peak value of radiation efficiency in a fundamental mode) of the resonant cavity antenna is mainly determined by L and a, which have great influence on antenna performance.

In this example, when the resonant cavity antenna covers 2.45 GHz in the fundamental mode (that is, $TE_{0.5,0,1}$), optionally, L of the resonant cavity antenna may be 80 mm, the width axis (that is, a) may be 15.5 mm, the height axis (that is, b) may be 6.5 mm, and the width (that is, w) of the first gap may be 3 mm. In this size, antenna performance of the resonant cavity antenna is optimal.

Figure 13:
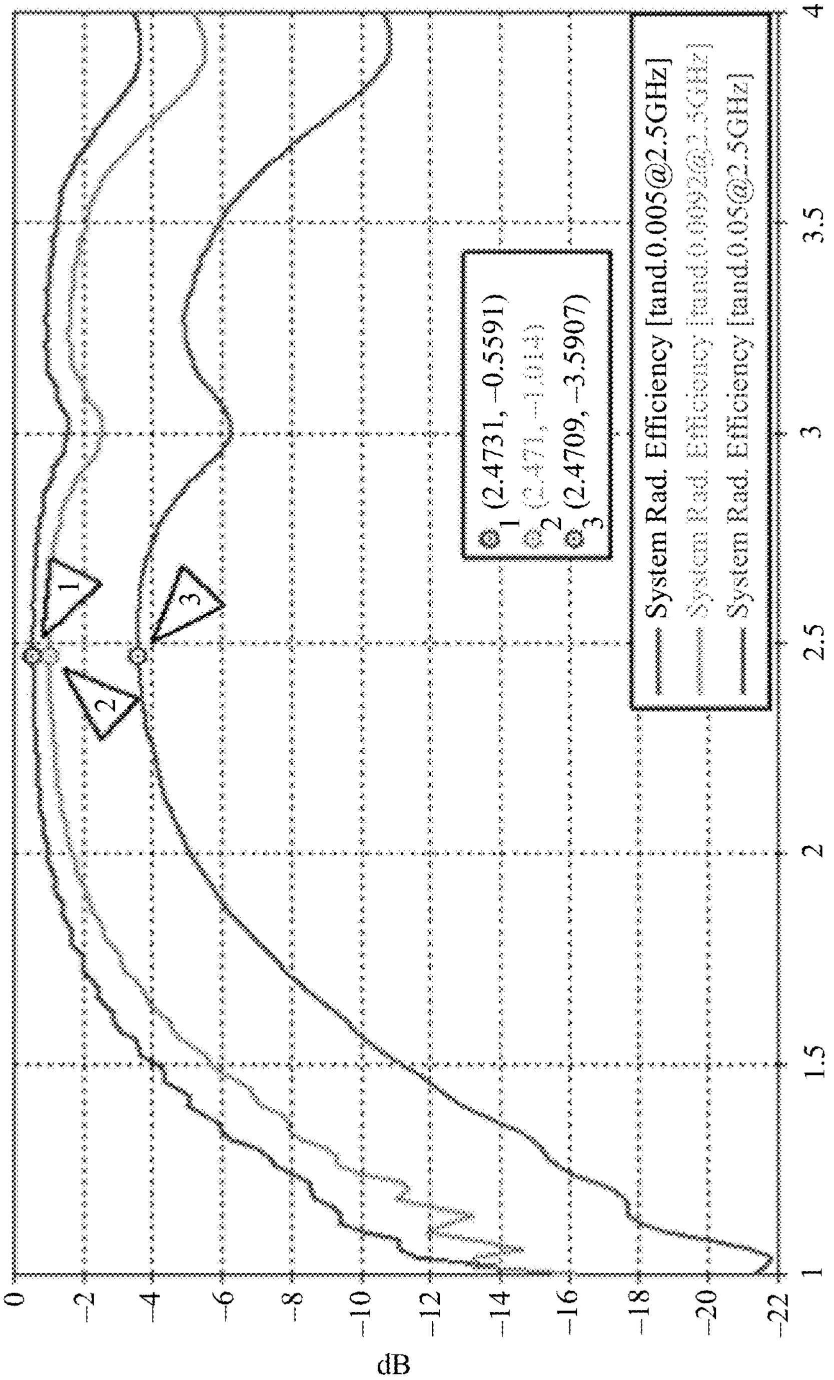
FIG. 13 is a schematic diagram of impact of different media in an antenna cavity on antenna performance of a resonant cavity antenna.

With reference to FIG. 13, this example describes impact of different media in the antenna cavity on antenna performance of the resonant cavity antenna. In FIG. 13, for example, a size of the resonant cavity antenna is a=15.5 mm, b=6.5 mm, L=80 mm, and w=3 mm. In FIG. 13, a curve in which a triangle reference sign 3 is located is a radiation efficiency curve in a case in which a lossy medium is FR-4 (that is, a loss angle tangent El. tand.=0.05). A curve in which a triangle reference sign 2 is located is a radiation efficiency curve in a case in which a lossy medium is PLA plastic (that is, El. tand.=0.0092). A curve in which a triangle reference sign 1 is located is a radiation efficiency curve in a case in which a loss angle tangent is 0.005 (that is, El. tand.=0.005). When the lossy medium changes from FR-4 to PLA plastic, radiation efficiency of the resonant cavity antenna increases by 2.5 dB. When the loss angle tangent is further reduced to 0.005, radiation efficiency of the resonant cavity antenna further increases by 0.5 dB.

In this example, a dielectric constant affects a quantity of wavelengths on a unit length. In a case in which a tangent range of a loss angle is 0.005 to 0.05, radiation efficiency and bandwidth of the resonant cavity antenna may meet a band requirement of a current terminal (such as the tablet computer). That is, in this example, a medium in the resonant cavity antenna may be FR-4, PLA plastic, and another medium whose loss angle tangent range is 0.005 to 0.05.

In this example, a size of the resonant cavity antenna may be w=3 mm, a=15.5 mm, b=6.5 mm, and L=80 mm. The constructed resonant cavity antenna is deployed in the cavity surrounded by the metal rear housing, the metal middle frame, and the display of the tablet computer. Optionally, to save space for deploying the resonant cavity antenna and save a material of the resonant cavity antenna, in embodiments of this application, a resonant cavity antenna structure shown in FIG. 14 is used.

Figure 14:
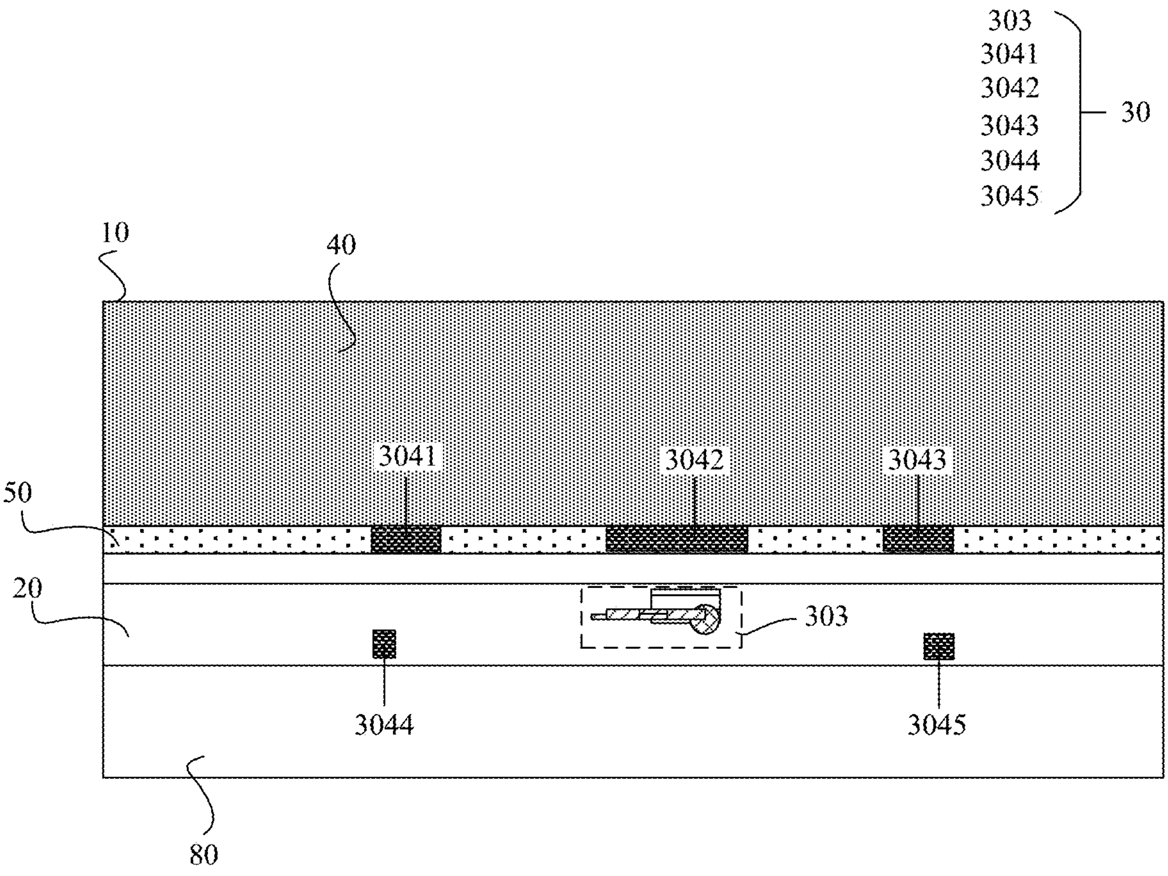
FIG. 14 is a top view of a tablet computer and a resonant cavity antenna according to an embodiment of this application.

FIG. 14 is a top view of a tablet computer and a resonant cavity antenna. The tablet computer is placed on the horizontal table surface in parallel. In FIG. 14, a reference sign 10 is used to indicate the tablet computer, and a reference sign 40 is used to indicate a battery in the tablet computer. A reference sign 50 is used to indicate a battery rib barrier wall in the tablet computer. A reference sign 20 is used to indicate a metal plate in the tablet computer. A reference sign 30 is used to indicate the resonant cavity antenna. A reference sign 80 is used to indicate free space. The resonant cavity antenna includes a feeding part 303, foams (for example, foam 3041~foam 3045 in FIG. 14), and a first gap 302 (a gap and a display are not shown in FIG. 14). The foams, the metal plate, and an LCD metal layer covering the foams form an antenna cavity 301 of the resonant cavity antenna (the LCD metal layer is not shown in FIG. 14). The foam 3041—foam 3045 are conductive foams, and are used to construct a boundary condition of the resonant cavity antenna. A length from the foam 3041 to the foam 3043 is used as a length axis L of the resonant cavity antenna. Similarly, a length from the foam 3044 (for example, a first foam) to the foam 3045 (for example, a second foam) is used as another length axis L of the resonant cavity antenna. It may be understood that FIG. 14 is a top view. A connection line between the foam 3044 and the foam 3045 is parallel to one side wall of the metal middle frame. For example, a side wall between the metal plate 20 and the free space 80 is a side wall of the metal middle frame. The side wall of the metal middle frame may be used as a side surface (that is, a side surface including the L-axis and the height axis) of the antenna cavity. The foam 3041 is combined with the foam 3044, the foam 3043, and the foam 3045 to form a short-circuit boundary (that is, a boundary formed by a combination of the width axis a and the height axis b) at two ends of the resonant cavity antenna. In this example, the width axis a formed by the foam 3043 and the foam 3045 is perpendicular to the length axis L formed by the foam 3041 and the foam 3043, to form a strict boundary condition. It may be understood that the width axis a formed by the foam 3041 and the foam 3044 is perpendicular to the length axis L formed by the foam 3041 and the foam 3043, to form a strict boundary condition.

The foam 3044 and the foam 3045 are key foams for constructing a radiation aperture in the fundamental mode, and cannot be missing. The position of the foam 3042 (such as a third foam) is parallel to the position of the feeding part. The feeding part is deployed at a position of a maximum point of an electric field, and the foam 3042 parallel to the feeding part 303 may be used to eliminate a clutter wave generated by the feeding part 303. Optionally, the foam 3041

(for example, a fourth foam), the foam 3042 (for example, a third foam), and the foam 3043 (for example, a fifth foam) cannot be all missing.

Figure 15:
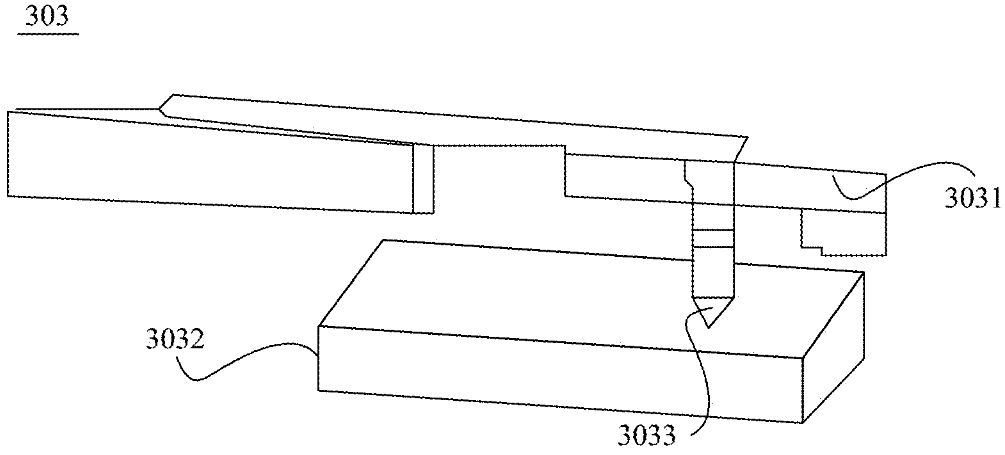
FIG. 15 is a schematic diagram of a structure of a feeding part according to an embodiment of this application.

A specific structure of the feeding part 303 is shown in FIG. 15. For example, the feeding part 303 includes a feeding structure 3031, a PCB board 3032, and a feeding point 3033. The feeding structure 3031 uses distributed feeding of a forming bracket, and is connected to the main board by using the cable. For example, the forming bracket may use a plastic structure, and is used to fasten a metal sheet. The metal sheet is attached to the forming bracket to form the feeding structure 3031 in FIG. 15. The engineer may adjust the shape of the metal sheet according to values of the inductance and the capacitance of the antenna that are pre-calculated, so that the resonance frequency of the resonant cavity antenna meets a preset frequency value (for example, the resonance frequency is 2.45 GHz). By using the forming distributed feeding structure, a quantity of components in the resonant cavity antenna can be reduced. It may be understood that the feeding structure may be another structure. In this example, the feeding structure 3031 is not limited.

In an embodiment, an inductor and a capacitor may further be disposed on the PCB board 3032 of the feeding part 303, so that the resonance frequency of the resonant cavity antenna meets the preset frequency value by adjusting the inductor and the capacitor. In this example, the feeding part 303 forms a distributed feeding structure by using a shape of the metal structure 3031, to adjust the resonance frequency of the antenna, thereby reducing components and cables in the antenna. In addition, in this example, the resonant cavity antenna cooperates with the metal middle frame, and is less affected by an environment and a ground plate position in the tablet computer.

Figure 16:
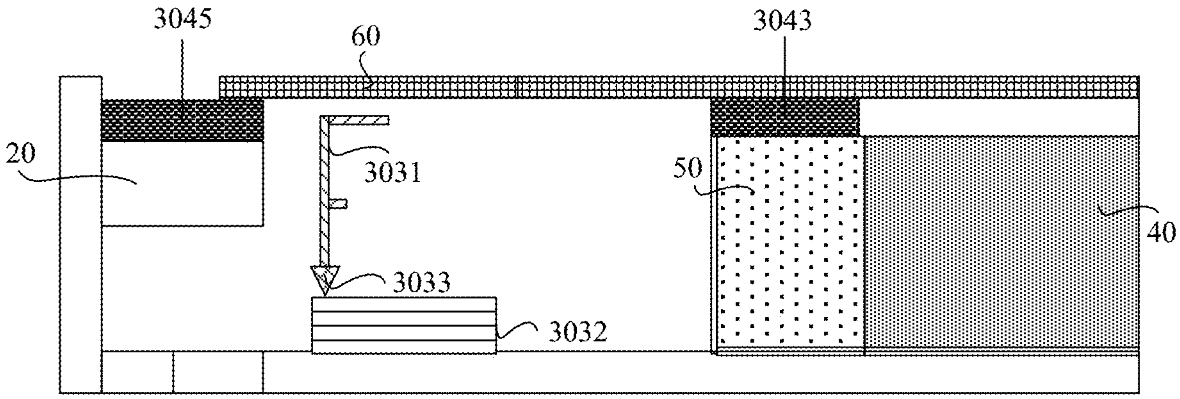
FIG. 16 is a side view of the tablet computer and the resonant cavity antenna in FIG. 14.

FIG. 16 is a side view of a tablet computer and a resonant cavity antenna. A reference sign 20 is used to indicate a metal plate in a metal rear housing of the tablet computer. A reference sign 40 is used to indicate a battery in the tablet computer. A reference sign 50 is used to indicate a battery rib retaining wall in the tablet computer, and a reference sign 60 is used to indicate an LCD metal layer. A reference sign 3031 is used to indicate a feeding structure, a reference sign 3032 is used to indicate a PCB board, and a reference sign 3033 is used to indicate a feeding point. A foam 3045 is placed on the pillar formed by the metal plate 20, and a foam 3043 is placed on the battery rib retaining wall. The LCD layer covers the foam 3045 and the foam 3043. Because the foam 3045 and the foam 3043 are connected to the LCD metal layer, the LCD metal layer is connected, to form a boundary condition.

With reference to FIG. 17 to FIG. 20, this example describes an S parameter and efficiency of the resonant cavity antenna in terms of different quantities of foams.

Figure 17:
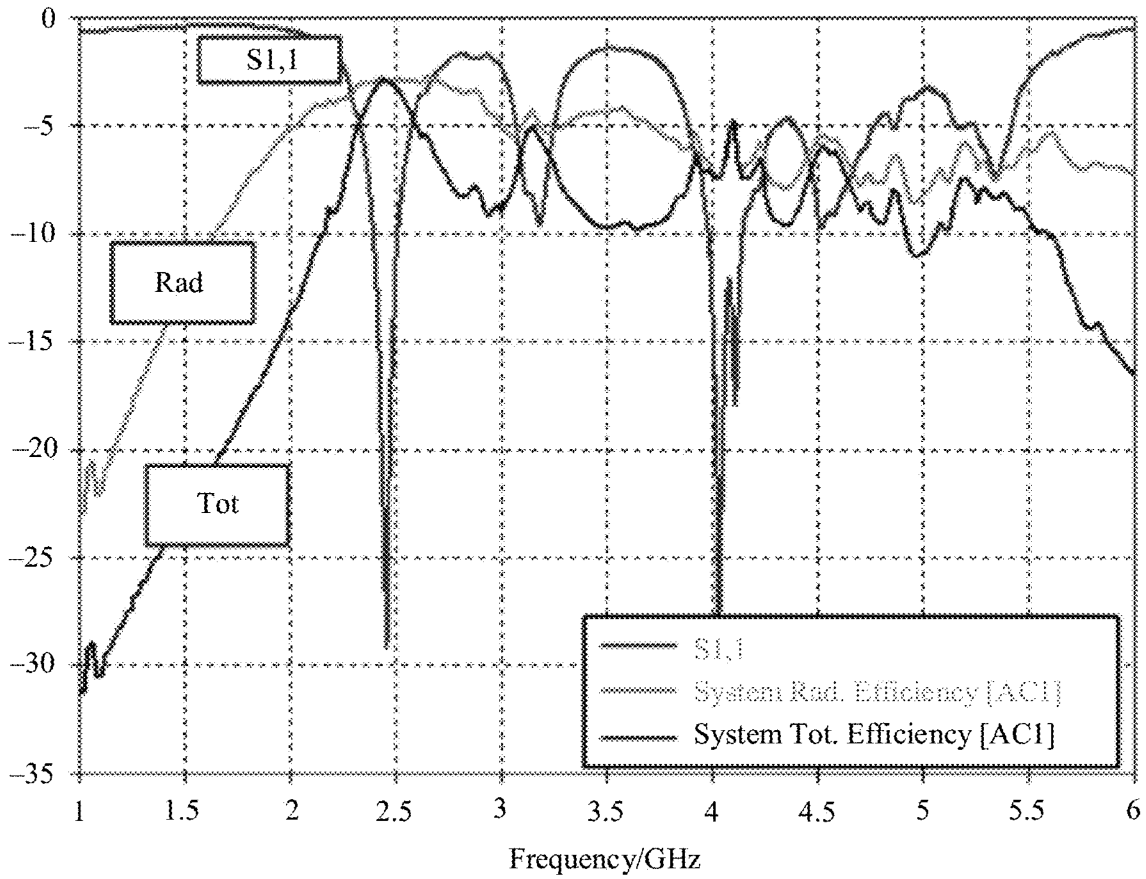
FIG. 17 is a schematic diagram of an S parameter and efficiency when a resonant cavity antenna includes five foams.

FIG. 17 is a schematic diagram of an S parameter and efficiency when a resonant cavity antenna includes five foams. S1,1 is a resonance curve (that is, an S parameter curve) of the resonant cavity antenna at the position with the reference sign in FIG. 6. A reference sign Rad in FIG. 17 is used to indicate radiation efficiency of the antenna, and a reference sign Tot in FIG. 17 is used to indicate system efficiency of the antenna. In FIG. 17, three curves are smooth, and have fewer spines.

Figure 18:
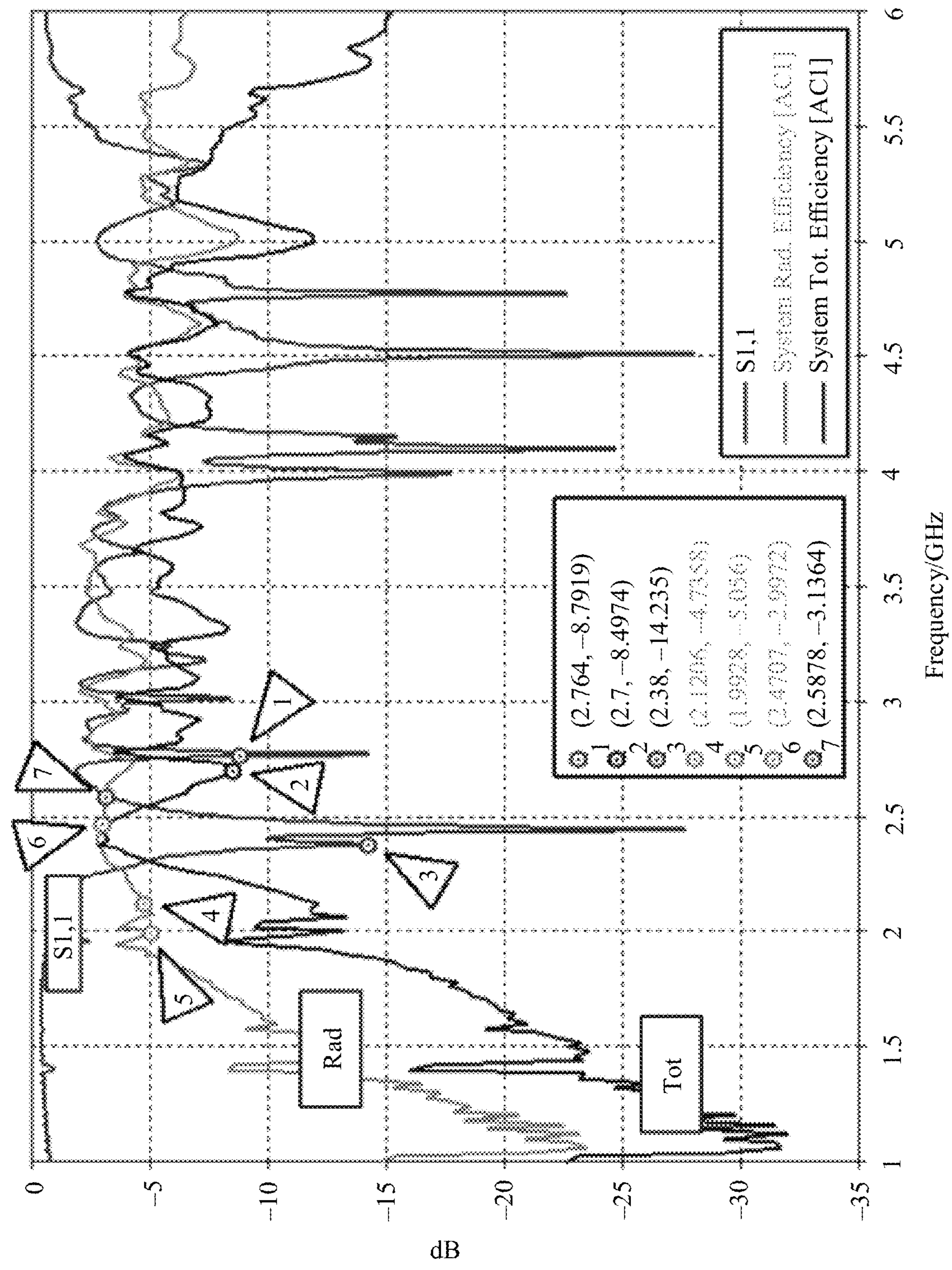
FIG. 18 is a schematic diagram of an S parameter and efficiency when a resonant cavity antenna includes four foams.

FIG. 18 is a schematic diagram of an S parameter and efficiency when a resonant cavity antenna includes four foams. S1,1 is a resonance curve (that is, an S parameter curve) of the resonant cavity antenna at the position with the reference sign in FIG. 6. A reference sign Rad in FIG. 18 is used to indicate radiation efficiency of the antenna, and a reference sign Tot in FIG. 18 is used to indicate system efficiency of the antenna. In FIG. 18, the foam 3041 or the foam 3043 is deleted from the resonant cavity antenna. In FIG. 18, five spines are included, that is, five clutter waves are generated, reducing antenna performance of the resonant cavity antenna.

Figure 19:
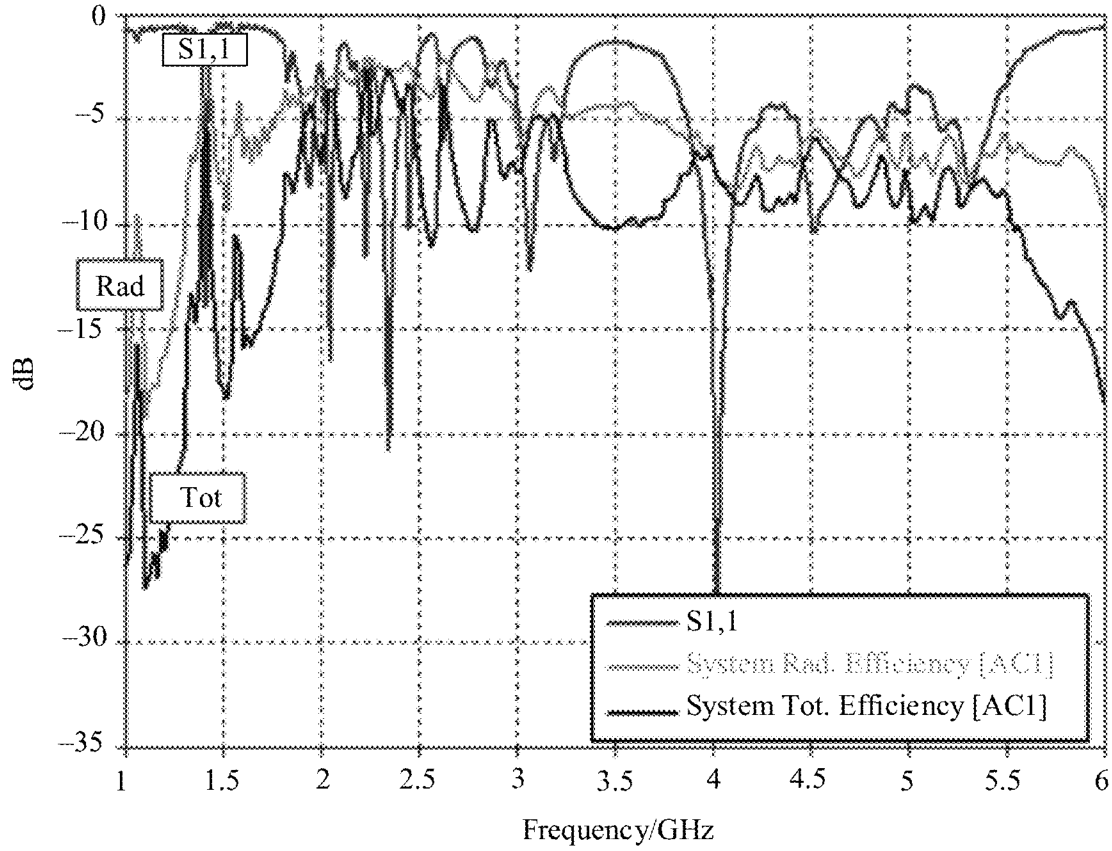
FIG. 19 is a schematic diagram of an S parameter and efficiency of a resonant cavity antenna without a foam 3042.

FIG. 19 is a schematic diagram of an S parameter and efficiency of a resonant cavity antenna without a foam 3042. S1,1 is a resonance curve (that is, an S parameter curve) of the resonant cavity antenna at the position with the reference sign in FIG. 6. A reference sign Rad in FIG. 19 is used to indicate radiation efficiency of the antenna, and a reference sign Tot in FIG. 19 is used to indicate system efficiency of the antenna. In FIG. 19, the foam 3042 is deleted from the resonant cavity antenna. In FIG. 19, seven spines are included, that is, seven clutter waves are generated, reducing antenna performance of the resonant cavity antenna. Generally, a clutter wave is easily generated at a maximum point of an electric field. The foam 3042 is disposed at a position parallel to the maximum point of the electric field, so that generation of the clutter wave can be greatly reduced.

Figure 20:
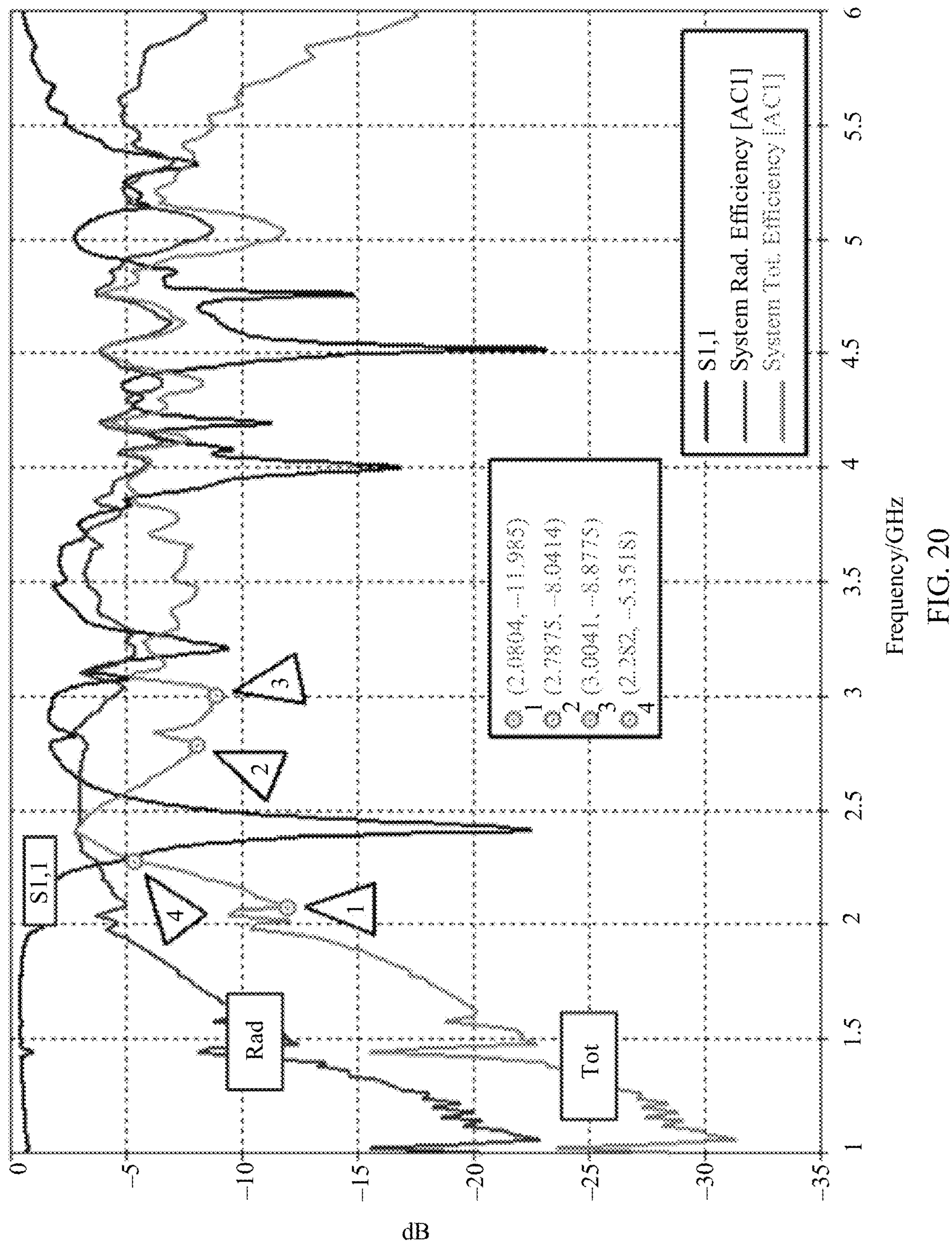
FIG. 20 is another schematic diagram of an S parameter and efficiency when a resonant cavity antenna includes five foams.

FIG. 20 is another schematic diagram of an S parameter and efficiency when a resonant cavity antenna includes five foams. S1,1 is a resonance curve (that is, an S parameter curve) of the resonant cavity antenna at the position with the reference sign ② in FIG. 6. A reference sign Rad in FIG. 20 is used to indicate radiation efficiency of the antenna, and a reference sign Tot in FIG. 20 is used to indicate system efficiency of the antenna. A connection line between the foam 3043 and the foam 3045 in FIG. 20 is not perpendicular to a connection line between the foam 3041 and the foam 3043, so that the foam 3043 and the foam 3045 form a non-strict boundary condition. For example, a connection line between the foam 3041 and the foam 3044 may not be perpendicular to a connection line between the foam 3041 and the foam 3043, so that the foam 3041 and the foam 3044 form a non-strict boundary condition. In FIG. the resonant cavity antenna generates four clutter waves, reducing antenna performance of the resonant cavity antenna.

In this example, the foam 3044 and the foam 3045 are key foams for constructing a radiation aperture in the fundamental mode, and cannot be missing. A longer foam and more sufficient grounding lead to lower clutter wave impact. An excitation amplitude of a parallel board clutter wave is determined by the foam 3042 at the maximum point of the electric field. Therefore, the foam at the maximum point of the electric field cannot be missing. If the resonant cavity antenna has no foam 3041 or foam 3043, a clutter wave still exists. In this example, the structure including five foams in FIG. 14 is used. A curve generated by the resonant cavity antenna is relatively smooth, and a clutter wave amplitude is small.

Figure 21:
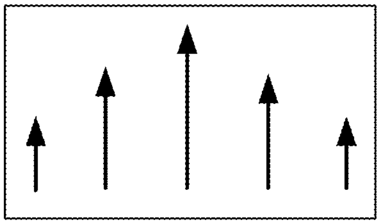
FIG. 21(1) is a schematic diagram of electric field distribution in a standard resonant cavity.
Figure 21:
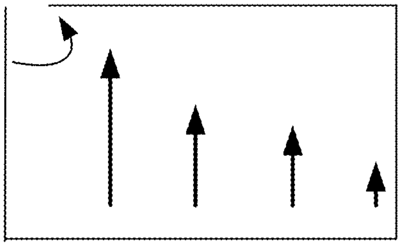

FIG. 21(1) is a schematic diagram of electric field distribution in a standard resonant cavity. FIG. 21(1) shows a cross section including a and b in the resonant cavity antenna. In FIG. 21(1), a signal with half wavelength is generated in the standard resonant cavity. FIG. 21(2) shows a cross section including a and b in the resonant cavity antenna. In FIG. 21(2), a signal with ¼ wavelength is generated in the resonant cavity. In addition, in FIG. 21(2), the first gap of the resonant cavity antenna is disposed on a front surface (that is, a surface close to the display) including a and L. In FIG. 21(2), the resonant cavity antenna equivalently outputs a magnetic current in a b-axis direction.

Therefore, there is an omni-directional diagram perpendicular to the b-axis direction, and there is a low profile vertical polarization characteristic.

In this example, the resonant cavity antenna uses a front slotting manner shown in FIG. 21(2). In application, a black edge between the metal middle frame and the display of the tablet computer may be used as the first gap, so that slotting does not need to be separately performed for the metal middle frame, and industrial design of the tablet computer is not damaged.

Figure 22:
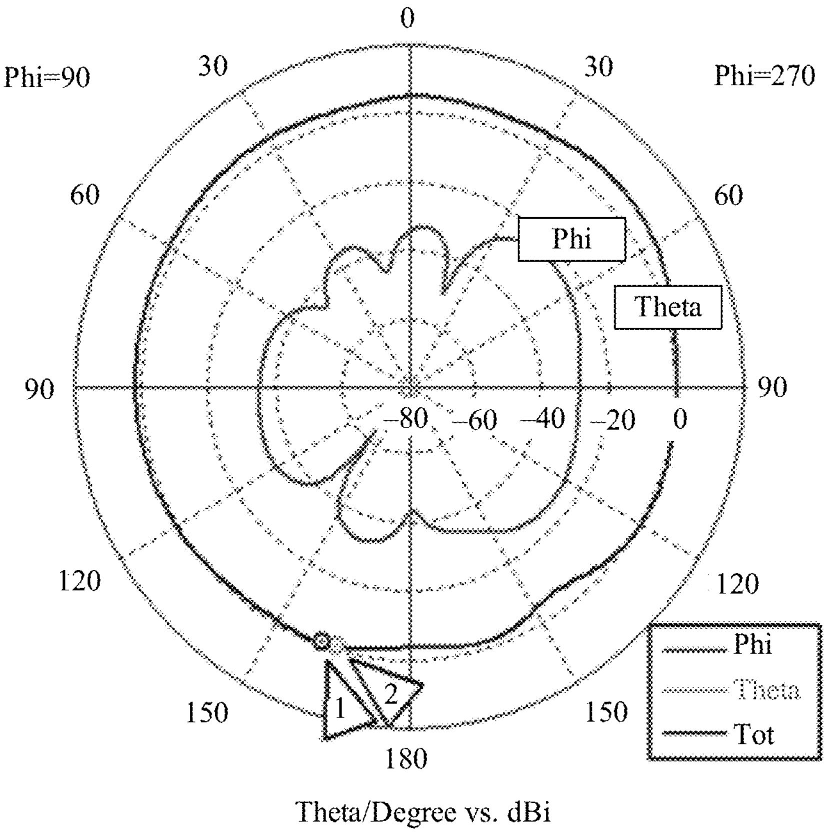
FIG. 22 is a two-dimensional direction diagram of a resonant cavity antenna.

FIG. 22 is a two-dimensional direction diagram of a resonant cavity antenna. In FIG. 22, the resonant cavity antenna works in a $TE_{0.5,0,1}$ mode. A 2D direction diagram indicates that a vertical polarization component Theta and a Tot polarization curve almost overlap, that is, primary polarization is vertical polarization, and a horizontal polarization component is weak. In this embodiment of this application, polarization orthogonality may be formed between the resonant cavity antenna and another frame antenna, to implement dual polarization equalization of the antennas in the tablet computer, and improve a capability of receiving a signal by the tablet computer.

In this example, the resonant cavity antenna uses the $TE_{0.5,0,1}$ mode, the resonant cavity antenna is relatively independent, and a generated standing wave and radiation efficiency are less affected by a position and an environment. The resonant cavity antenna may be disposed in a position far away from a position in which the user holds the tablet computer or in a keyboard magnetic absorption area. A polarization direction of the resonant cavity antenna is a vertical polarization direction, and a polarization direction of another antenna (such as a Wi-Fi antenna or a Bluetooth antenna) in the tablet computer is a horizontal polarization direction, so that the resonant cavity antenna and another antenna in the tablet computer form a multiple-in multiple-out (multiple-in multiple-out, MIMO) orthogonal polarization antenna. This compensates for a problem of a single polarization direction of the antenna in the tablet computer, and improves a capability of the tablet computer for receiving and sending electromagnetic signals. In this application, the resonant cavity antenna may alternatively be separately used as a Bluetooth antenna or a Wi-Fi antenna.

In an embodiment, size information of the resonant cavity may be w=3 mm, a=15.5 mm, b=6.5 mm, and L=80 mm. The resonant cavity antenna works in the $TE_{0.5,0,1}$ mode. The position of the first gap may be adjusted, for example, positions (1)~(4) in FIG. 23(1) to FIG. 23(4) may be used.

Figure 23:
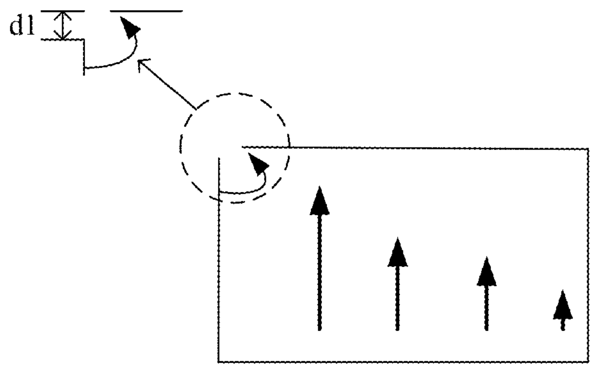
FIG. 23(1) is a schematic diagram of a cross section in an antenna cavity when a height of a side surface close to a first gap is reduced by d1.
Figure 23:
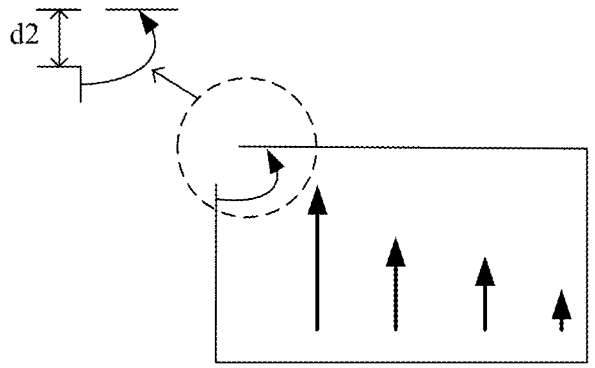
Figure 23:
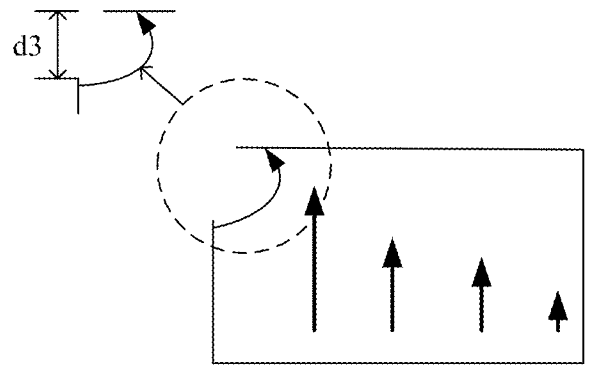
Figure 23:
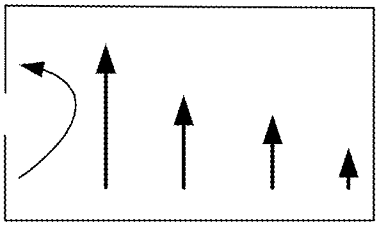
Figure 24:
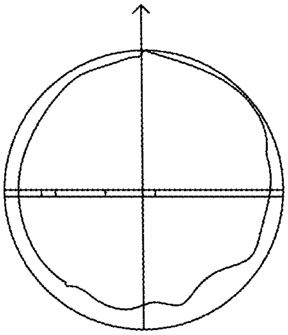
FIG. 24(1) is a schematic diagram of a coverage area in a three-dimensional direction diagram of a resonant cavity antenna when bi is reduced by 0.5 mm.
Figure 24:
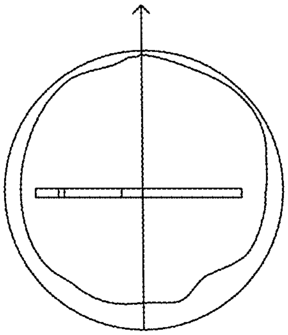
Figure 24:
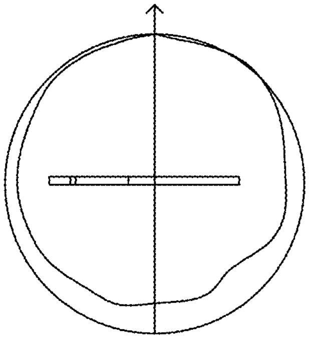
Figure 24:
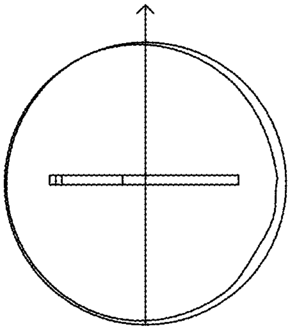

FIG. 23(1) is a schematic diagram of a cross section in an antenna cavity 301 when a height axis (that is, b) of a side surface close to a first gap is reduced by d1. As shown in FIG. 23(1), d1 is used to indicate a reduced height value of the height axis (that is, b) close to the first gap. In this example, d1 may be 0.5 mm. FIG. 24(1) is a schematic diagram of a coverage area in a three-dimensional direction diagram of a resonant cavity antenna when bi is reduced by 0.5 mm. As shown in FIG. 24(1), an electric field direction of the resonant cavity antenna covers the tablet computer. A rectangle in FIG. 24(1) is the tablet computer. FIG. 23(2) is a schematic diagram of a cross section in an resonant cavity antenna when a height axis (that is, b) of a side surface close to a first gap is reduced by d2. As shown in FIG. 23(2), d2 is used to indicate a reduced height value of the height axis (that is, b) of the side surface close to the first gap. In this example, d2 may be 1 mm. FIG. 24(2) is a schematic diagram of a coverage area in a three-dimensional direction diagram of a resonant cavity antenna when b is reduced by 1 mm. As shown in FIG. 24(2), an electric field direction of the resonant cavity antenna covers the tablet computer. A rectangle in FIG. 24(2) is the tablet computer.

FIG. 23(3) is a schematic diagram of a cross section in an resonant cavity antenna when a height axis (that is, b) of a side surface close to a first gap is reduced by d3. As shown in FIG. 23(3), d3 is used to indicate a reduced height value of the height axis (that is, b) of the side surface close to the first gap. In this example, d3 may be 2 mm. FIG. 24(3) is a schematic diagram of a coverage area in a three-dimensional direction diagram of a resonant cavity antenna when b is reduced by 2 mm. As shown in FIG. 24(3), an electric field direction of the resonant cavity antenna covers the tablet computer. A rectangle in FIG. 24(3) is the tablet computer.

FIG. 23(4) is a schematic diagram in which a first gap is disposed in the middle of a B1 surface. As shown in FIG. 23(4), when a gap is in the middle of the B1 surface, the gap is equivalent to a magnetic current in a direction along the height axis, has an omni-directional diagram perpendicular to the height axis direction, and has a low profile vertical polarization characteristic. As shown in FIG. 24(4), an electric field direction of the resonant cavity antenna covers the tablet computer. A rectangle in FIG. 24(1) is the tablet computer.

Figure 25:
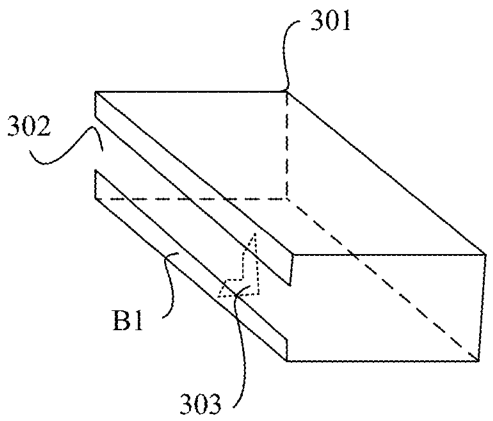
FIG. 25 is a schematic diagram of a structure of a resonant cavity antenna.

FIG. 25 is a schematic diagram of a structure of a resonant cavity antenna. A coordinate system in FIG. 25 is consistent with the coordinate system in FIG. 3, and details are not described herein again. The first gap 302 is disposed in the middle of the B1 surface, and a direction of the first gap 301 extends along the Z-axis. A resonant cavity antenna shown in FIG. 25 is used, and a structure of the resonant cavity antenna and the entire device is shown in FIG. 14. The first gap may be disposed on the metal middle frame.

Figure 26:
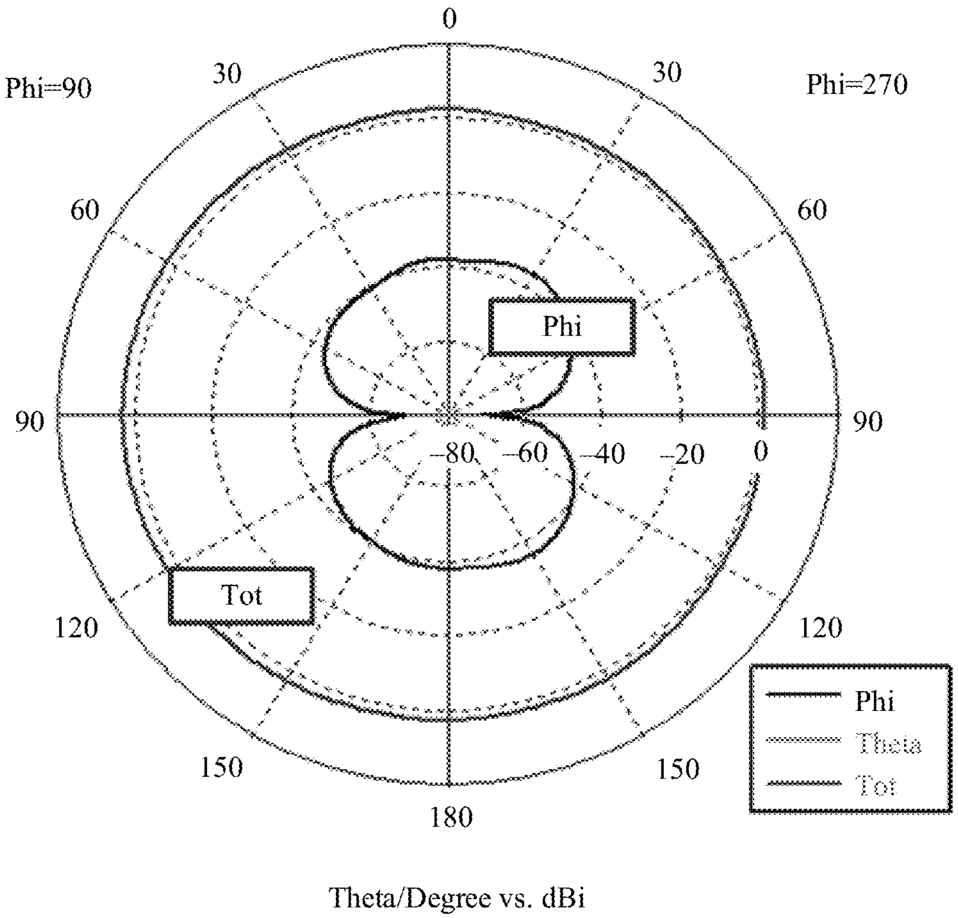
FIG. 26 is a two-dimensional direction diagram of a resonant cavity antenna when a first gap is disposed in the middle of a B1 surface.

FIG. 26 is a two-dimensional (that is, 2D) direction diagram of a resonant cavity antenna when a first gap is disposed in the middle of a B1 surface. The resonant cavity antenna works in $TE_{0.5,0,1}$, and a 2D direction diagram indicates that a vertical polarization component Theta and a Tot polarization curve almost overlap (a Theta curve cannot be seen in FIG. 26), that is, primary polarization is vertical polarization, and a horizontal polarization component is weak. Therefore, polarization orthogonality is formed between the resonant cavity antenna and the frame antenna, and dual polarization equalization can be implemented.

In this example, with reference to FIG. 23(1) to FIG. 23(4) and FIG. 24(1) to FIG. 24(4), when the first gap is located in the middle of the side surface, directivity of the resonant cavity antenna is optimal. With continuous movement of the gap to the front surface of the screen, external electric field distribution of the resonant cavity antenna is no longer symmetrical, and a front field strength proportion gradually increases. However, because of an edge effect, a relatively strong power line is still around an edge, and an electric field of the metal rear housing of the tablet computer is excited by using an induced electromotive force difference, thereby implementing field coverage on the metal rear housing of the tablet computer. In addition, relative to a front slotted resonant cavity antenna, directivity of the resonant cavity antenna can be improved with a decrease in a height of the side surface. When the height of the side surface of the resonant cavity antenna decreases by 2 mm, directivity can be reduced to 5 dBi. A directional range of the first gap at the side top or a front position is 4.4~6.4 dBi. When the width of the first gap remains unchanged, the height of the side surface close to the first gap is slightly reduced, so that directivity can be reduced.

Figure 27:
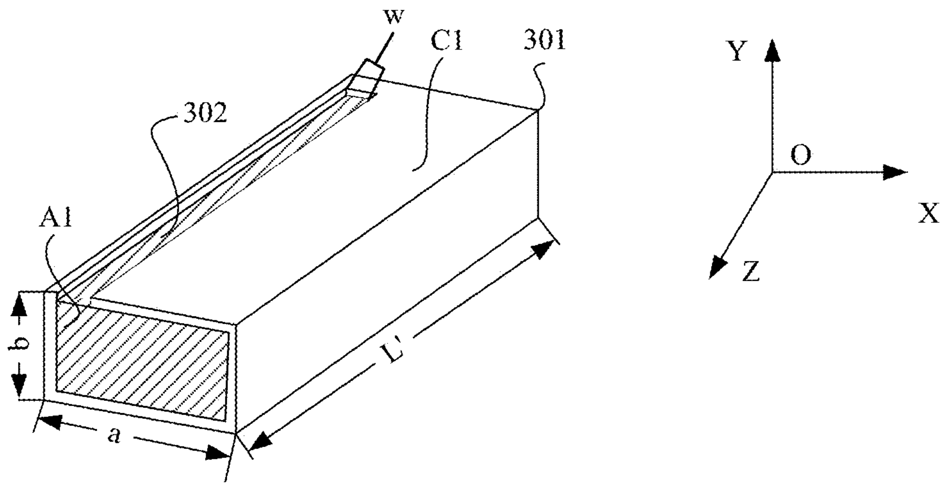
FIG. 27 is a three-dimensional schematic diagram of a resonant cavity antenna.

In an embodiment, the resonant cavity antenna may alternatively work in a $TE_{0.5,0,0.5}$ mode. FIG. 9 is a schematic diagram 1 of impact of a length on antenna performance of the resonant cavity antenna. It may be learned that when the length L of the resonant cavity antenna is 40 mm, the resonant cavity covers 2.45 GHz in a mode lower than $TE_{0.5,0,1}$. FIG. 27 is a three-dimensional schematic diagram of a resonant cavity antenna. As shown in FIG. 27, an axis extending in the Z direction in the resonant cavity antenna is used as a length axis, denoted as L'. An axis extending in the X direction in FIG. 27 in the resonant cavity antenna is used as a width axis, denoted as a. An axis extending in the Y direction in FIG. 4 in the resonant cavity antenna is used as a height axis, denoted as b. The first gap is disposed on a C1 surface, the width of the first gap 302 is denoted as w, and the direction of the first gap 302 extends along the Z-axis. Slashes in the figure indicate a medium in the resonant cavity antenna. Optionally, in this example, a size of the resonant cavity antenna is w=3 mm, a=15.5 mm, b=6.5 mm, and L'=45 mm. As shown in FIG. 27, one cross section of the resonant cavity antenna is an open end face (that is, the A1 surface in FIG. 27).

In this example, when the resonant cavity antenna uses the $TE_{0.5,0,0.5}$ mode, the length axis L' is shortened. A volume of the resonant cavity antenna in the $TE_{0.5,0,0.5}$ mode is much smaller than a volume of the resonant cavity antenna in the $TE_{0.5,0,1}$ mode. This reduces difficulty of deploying the resonant cavity antenna and improves flexibility of deploying the resonant cavity antenna. The resonant cavity antenna includes an open end face. This saves a material of the resonant cavity antenna.

Figure 28:
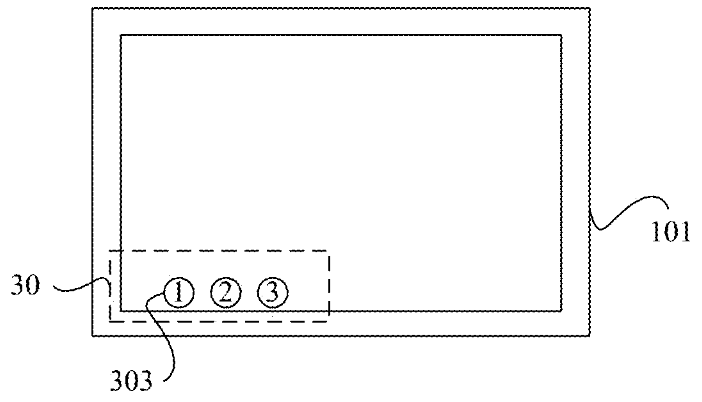
FIG. 28 is a schematic diagram of different feeding part positions when a resonant cavity antenna uses a $TE_{0.5,0,0.5}$ mode.

FIG. 28 is a schematic diagram of different feeding part positions when a resonant cavity antenna uses a $TE_{0.5,0,0.5}$ mode. FIG. 28 is a top view of a tablet computer. In FIG. 28, a reference sign 30 is used to indicate the resonant cavity antenna, a reference sign 303 is used to indicate a feeding part, and a reference sign 101 is a metal middle frame. A reference sign ① is in a position close to the A1 surface, a value in the Y direction is 0, and a value in the X direction is in a range close to the first gap and greater than w. A value of a reference sign ② in the Z direction is ½ L', a value in the Y direction is 0, and a value in the X direction is in a range close to the first gap and greater than w. A value of the reference sign ③ in the Z direction is in a range greater than ½ L' and less than or equal to L', a value in the Y direction is 0, and a value in the X direction is in a range close to the first gap and greater than w.

Figure 29:
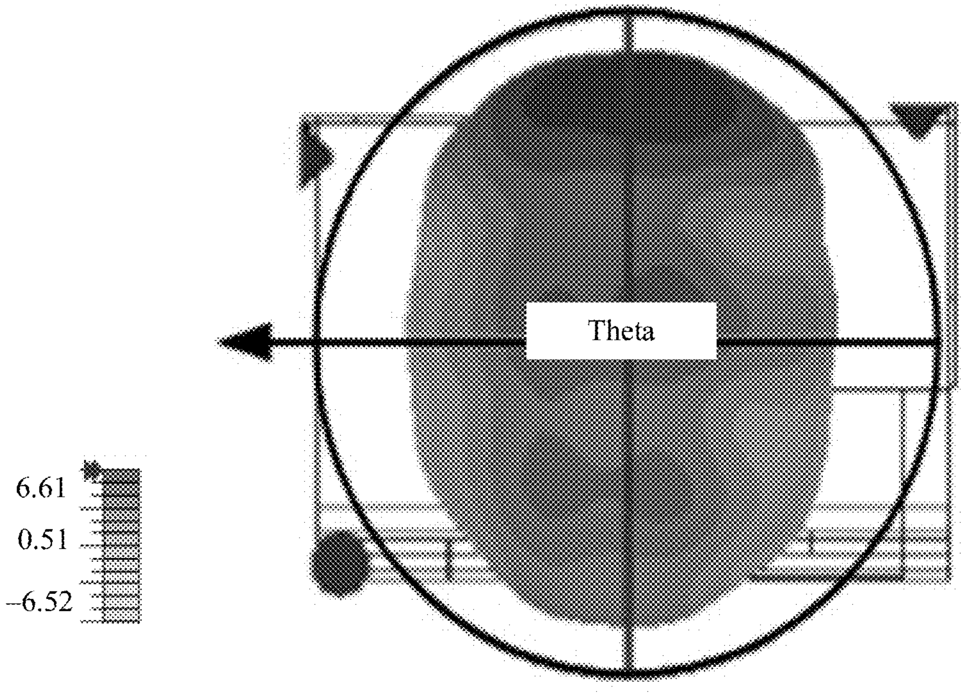
FIG. 29(1) is a three-dimensional direction diagram of a resonant cavity antenna when a feeding part is in a position of a reference sign ①.
Figure 29:
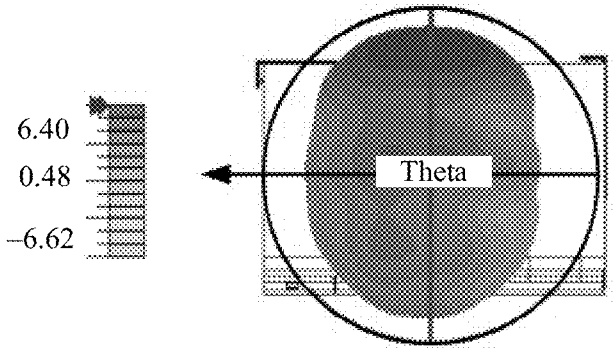
Figure 29:
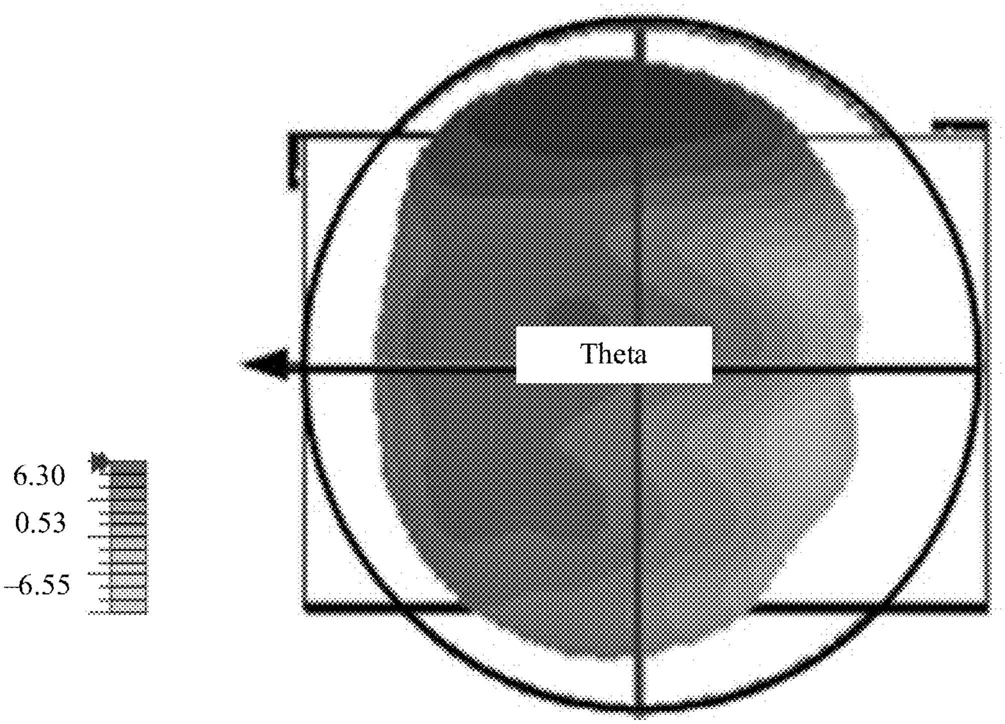

In this example, three-dimensional direction diagrams of the feeding part 303 at three different positions are shown in FIG. 29(1) to FIG. 29(3).

FIG. 29(1) is a three-dimensional direction diagram of a resonant cavity antenna when a feeding part 303 is in a position with a reference sign ①. As shown in FIG. 29(1), a directional coefficient of the resonant cavity antenna is 6.61 dBi. In FIG. 29(1), the resonant cavity antenna covers 2.45 GHz in a $TE_{0.5,0,0.5}$ mode.

FIG. 29(2) is a three-dimensional direction diagram of a resonant cavity antenna when a feeding part 303 is in a position with a reference sign ②. As shown in FIG. 29(2), a directional coefficient of the resonant cavity antenna is 6.40 dBi. In FIG. 29(2), the resonant cavity antenna covers 2.45 GHz in a $TE_{0.5,0,0.5}$ mode.

FIG. 29(3) is a three-dimensional direction diagram of a resonant cavity antenna when a feeding part 303 is in a position with a reference sign ③. As shown in FIG. 29(3), a directional coefficient of the resonant cavity antenna is 6.30 dBi. In FIG. 29(2), the resonant cavity antenna covers 2.45 GHz in a $TE_{0.5,0,0.5}$ mode.

In this example, it may be learned from FIG. 29(1) to FIG. 29(3) that the feeding part is close to an open-circuit boundary (that is, the A1 surface), and directivity of in the fundamental mode becomes higher, but an increment is only 0.3 dBi. It can be learned that the feeding part position has little influence on external radiation field distribution of the resonant cavity antenna in this example.

Figure 30:
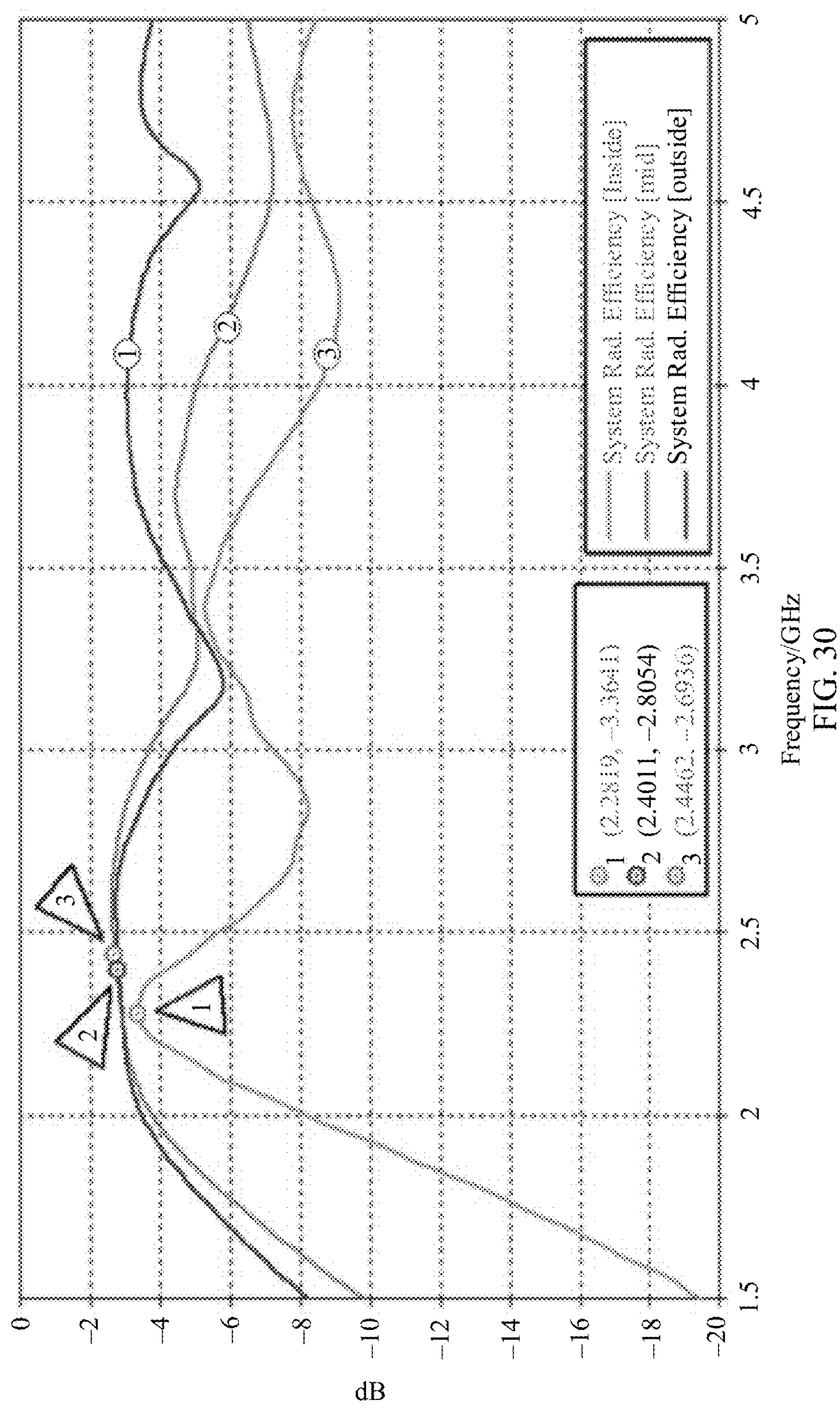
FIG. 30 is a schematic diagram of radiation efficiency of a resonant cavity antenna when a feeding part is in different positions.

FIG. 30 is a schematic diagram of radiation efficiency of a resonant cavity antenna when a feeding part 303 is in different positions. A reference sign ① in FIG. 30 is a radiation efficiency curve of the resonant cavity antenna at the position with the reference sign ① in FIG. 29(1) to FIG. 29(3). A reference sign ② in FIG. 30 is a radiation efficiency curve of the resonant cavity antenna at the position with the reference sign ② in FIG. 29(1) to FIG. 29(3). A reference sign ③ in FIG. 30 is a radiation efficiency curve of the resonant cavity antenna at the position with the reference sign ③ in FIG. 29(1) to FIG. 29(3). A peak value of the radiation efficiency curve at the position with the reference sign ① is a value of a triangle reference sign 2. A peak value of the radiation efficiency curve at the position with the reference sign ② is a triangle reference sign 3. A peak value of the radiation efficiency curve at the position with the reference sign ② is a triangle reference sign 1. It can be learned from the radiation efficiency diagram that, when the feeding part 303 is close to an open-circuit boundary, bandwidth and radiation efficiency are improved.

In this example, because a maximum point of an electric field in the fundamental mode is excited more fully by a capacitive feed, the feeding part 303 is close to an open-circuit boundary, and bandwidth and radiation efficiency are improved.

In this example, a size of the resonant cavity antenna may be w=3 mm, a=15.5 mm, b=6.5 mm, and L'=45 mm. The constructed resonant cavity antenna is deployed in the cavity surrounded by the metal rear housing, the metal middle frame, and the display of the tablet computer. Optionally, to save space for deploying the resonant cavity antenna and save a material of the resonant cavity antenna, in embodiments of this application, a resonant cavity antenna structure shown in FIG. 31 is used.

Figure 31:
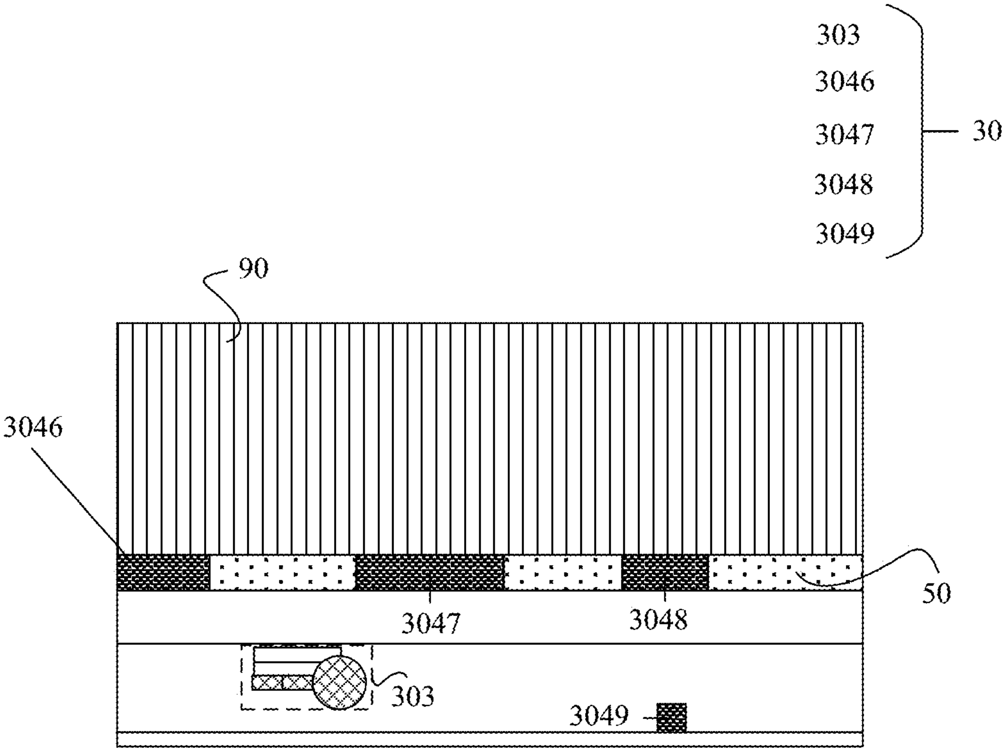
FIG. 31 is a top view of a tablet computer and a resonant cavity antenna.

FIG. 31 is a top view of a tablet computer and a resonant cavity antenna. The tablet computer is placed in parallel on a horizontal table surface, and a size of the tablet computer is 276 (that is, the f-axis) mm*187 (the e-axis) mm. In FIG. 31, a reference sign 90 is used to indicate a main board in the tablet computer. A reference sign 50 is used to indicate a battery rib barrier wall in the tablet computer. A reference sign 20 is used to indicate a metal plate in the tablet computer. A reference sign 30 is used to indicate the resonant cavity antenna. The resonant cavity antenna includes a feeding part 303, foams (for example, foam 3046—foam 3049 in FIG. 31), and a first gap (a gap and a display are not shown in FIG. 31). The foams, the metal plate, and an LCD metal layer covering the foams form an antenna cavity 301 of the resonant cavity antenna (the LCD metal layer is not shown in FIG. 31).

The foam 3046~foam 3049 are conductive foams, and are used to construct a boundary condition of the resonant cavity antenna. A length from the foam 3046 to the foam 3048 is used as a length axis L' of the resonant cavity antenna. The foam 3048 (for example, a third foam) is combined with the foam 3049 (for example, a first foam) to form a short-circuit boundary (that is, a closed cross section formed by a combination of the width axis a and the height axis b) of a closed cross section in the resonant cavity antenna. In this example, the width axis a formed by the foam 3048 and the foam 3049 is perpendicular to the length axis L' formed by the foam 3046 (for example, a second foam) and the foam 3048, to form a strict boundary condition. The position of the foam 3047 (such as a fourth foam) is parallel to the position of the feeding part 303. The foam 3049 is a key foam for constructing a radiation aperture in the fundamental mode, and cannot be missing. Because the feeding part 303 is deployed at a maximum point of an electric field, the foam 3046 that is used to eliminate a clutter wave generated by the feeding part cannot be missing. Optionally, the foam 3046, the foam 3047, and the foam 3048 cannot be all missing. A specific structure of the feeding part 303 may be shown in FIG. 15, and details are not described herein again.

With reference to FIG. 32A to FIG. 32F, this example describes an S parameter and efficiency of the resonant cavity antenna when different quantities of foams are disposed.

Figure 32A:
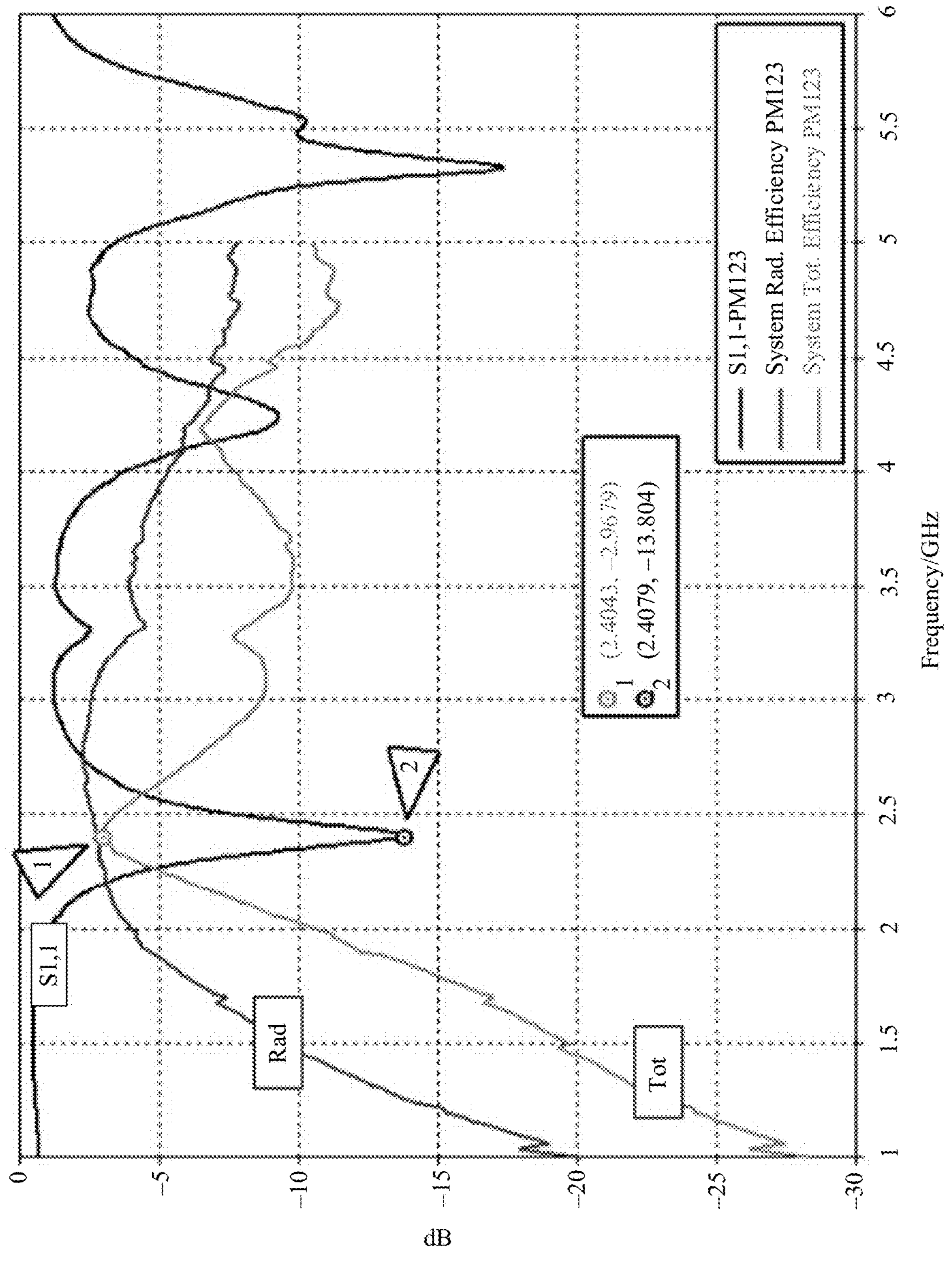
FIG. 32A is a schematic diagram of an S parameter and efficiency when a resonant cavity antenna includes four foams.

FIG. 32A is a schematic diagram of an S parameter and efficiency when a resonant cavity antenna includes four foams. S1,1 is a resonance curve (that is, an S parameter curve) of the resonant cavity antenna. A reference sign Rad in FIG. 32A is used to indicate radiation efficiency of the antenna, and a reference sign Tot in FIG. 32A is used to indicate system efficiency of the antenna. In FIG. 32A, three curves are smooth, and have fewer spines, and there is no clutter wave in the band.

Figure 32B:
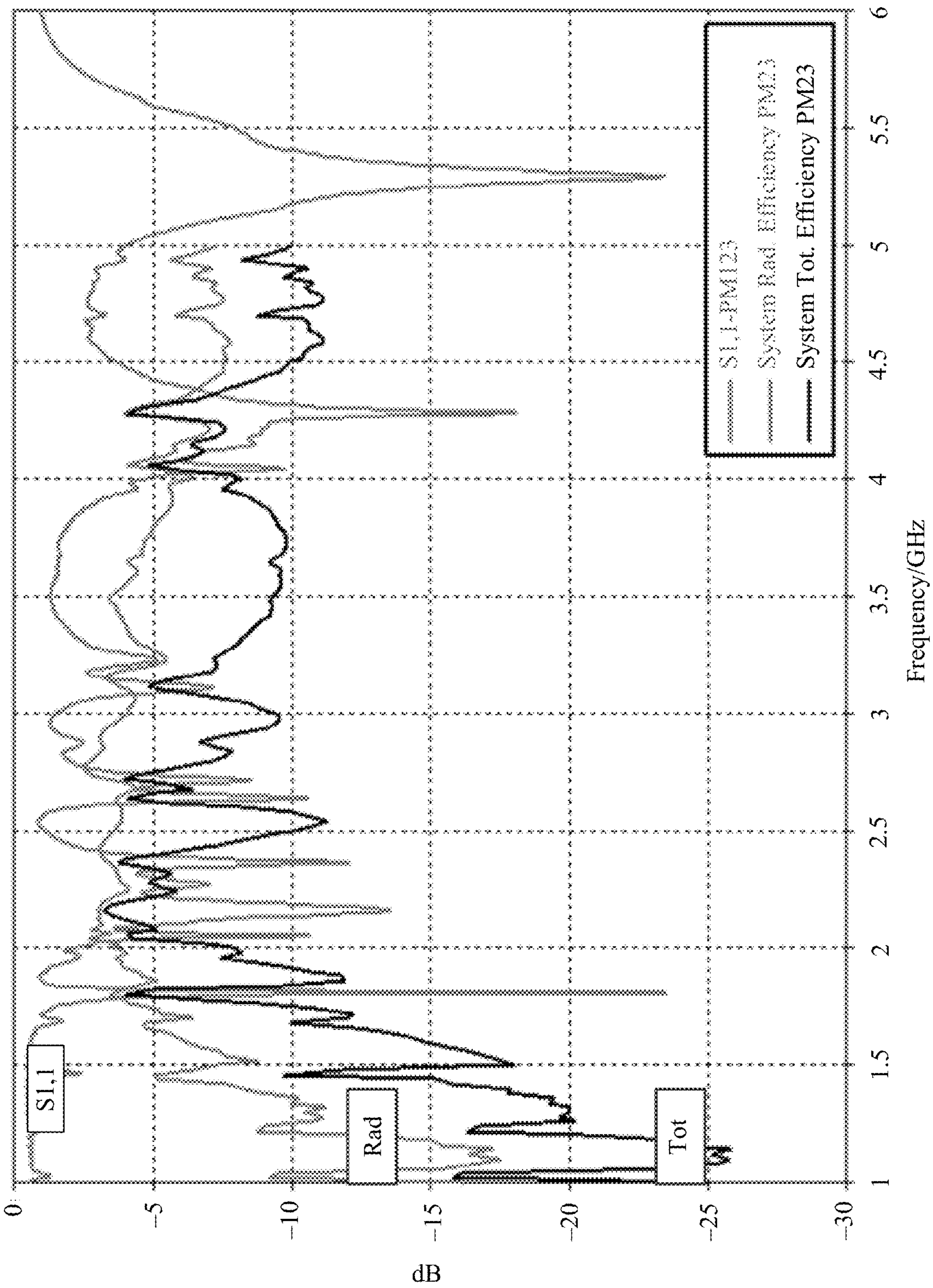
FIG. 32B is a schematic diagram of an S parameter and radiation efficiency of a resonant cavity antenna without a foam 3046.

FIG. 32B is a schematic diagram of an S parameter and radiation efficiency of a resonant cavity antenna without a foam 3046. S1,1 is a resonance curve (that is, an S parameter curve) of the resonant cavity antenna. A reference sign Rad in FIG. 32B is used to indicate radiation efficiency of the antenna, and a reference sign Tot in FIG. 32B is used to indicate system efficiency of the antenna. In FIG. 32B, the foam 3046 is deleted from the resonant cavity antenna. It may be learned from the radiation efficiency curve and the system efficiency curve in FIG. 32B that, the resonance frequency of the resonant cavity antenna is offset, and there are many clutter waves. The foam 3046 is used to eliminate a clutter wave generated at a maximum point of an electric field. When the foam 3046 is deleted, many clutter waves are generated. It can be learned that the foam 3046 cannot be missing.

Figure 32C:
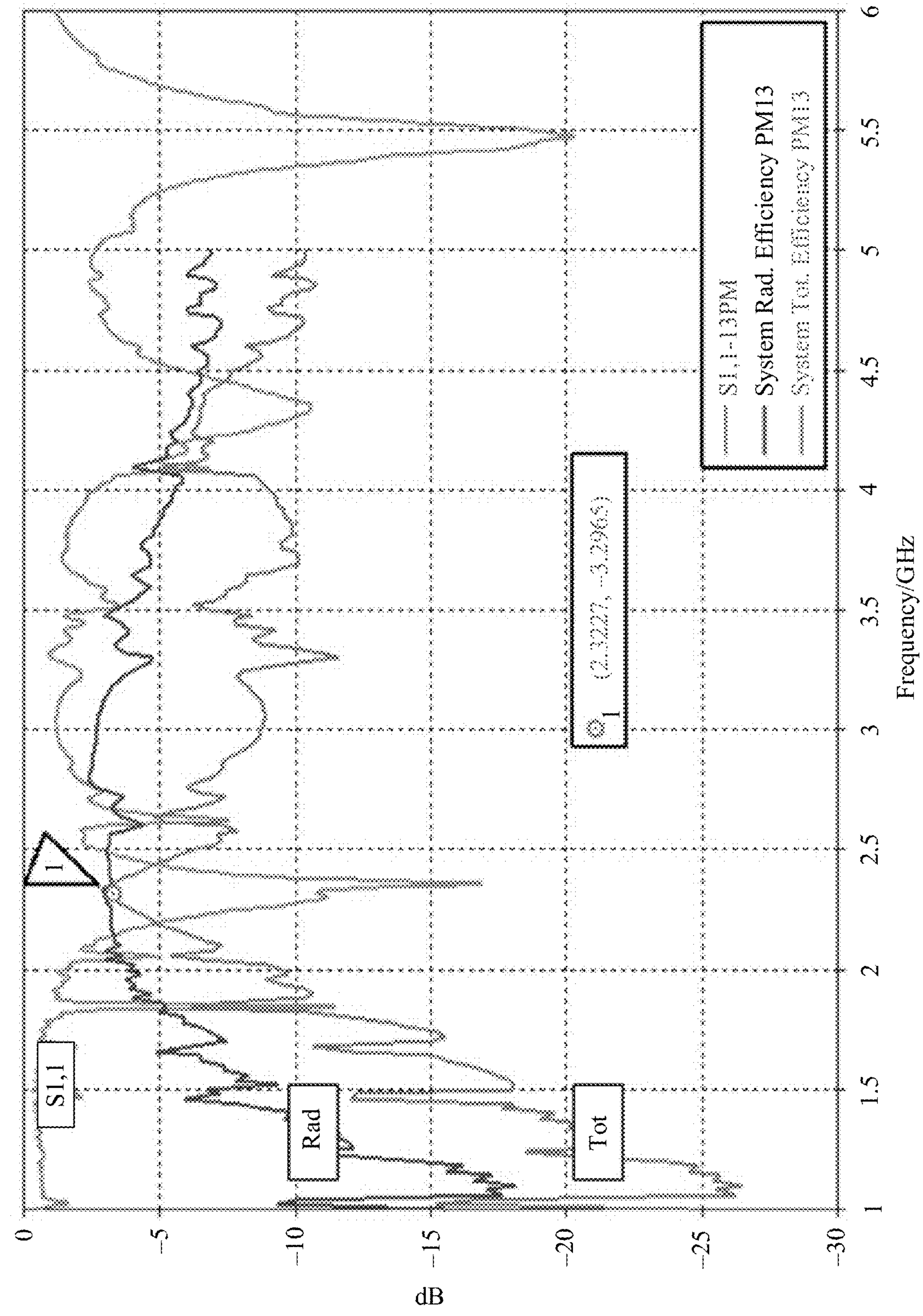
FIG. 32E is a schematic diagram of an S parameter and efficiency of a resonant cavity antenna without a foam 3047.
FIG. 32D is a schematic diagram of an S parameter and efficiency of a resonant cavity antenna without a foam 3048.
FIG. 32F is another schematic diagram of an S parameter and efficiency when a resonant cavity antenna includes four foams.

FIG. 32C is a schematic diagram of an S parameter and efficiency of a resonant cavity antenna without a foam 3047. S1,1 is a resonance curve (that is, an S parameter curve) of the resonant cavity antenna. A reference sign Rad in FIG. 32C is used to indicate radiation efficiency of the antenna, and a reference sign Tot in FIG. 32C is used to indicate system efficiency of the antenna. In FIG. 32C, the foam 3047 is deleted from the resonant cavity antenna. In FIG. 32C, four clutter waves are generated, reducing antenna performance of the resonant cavity antenna.

Figure 32D:
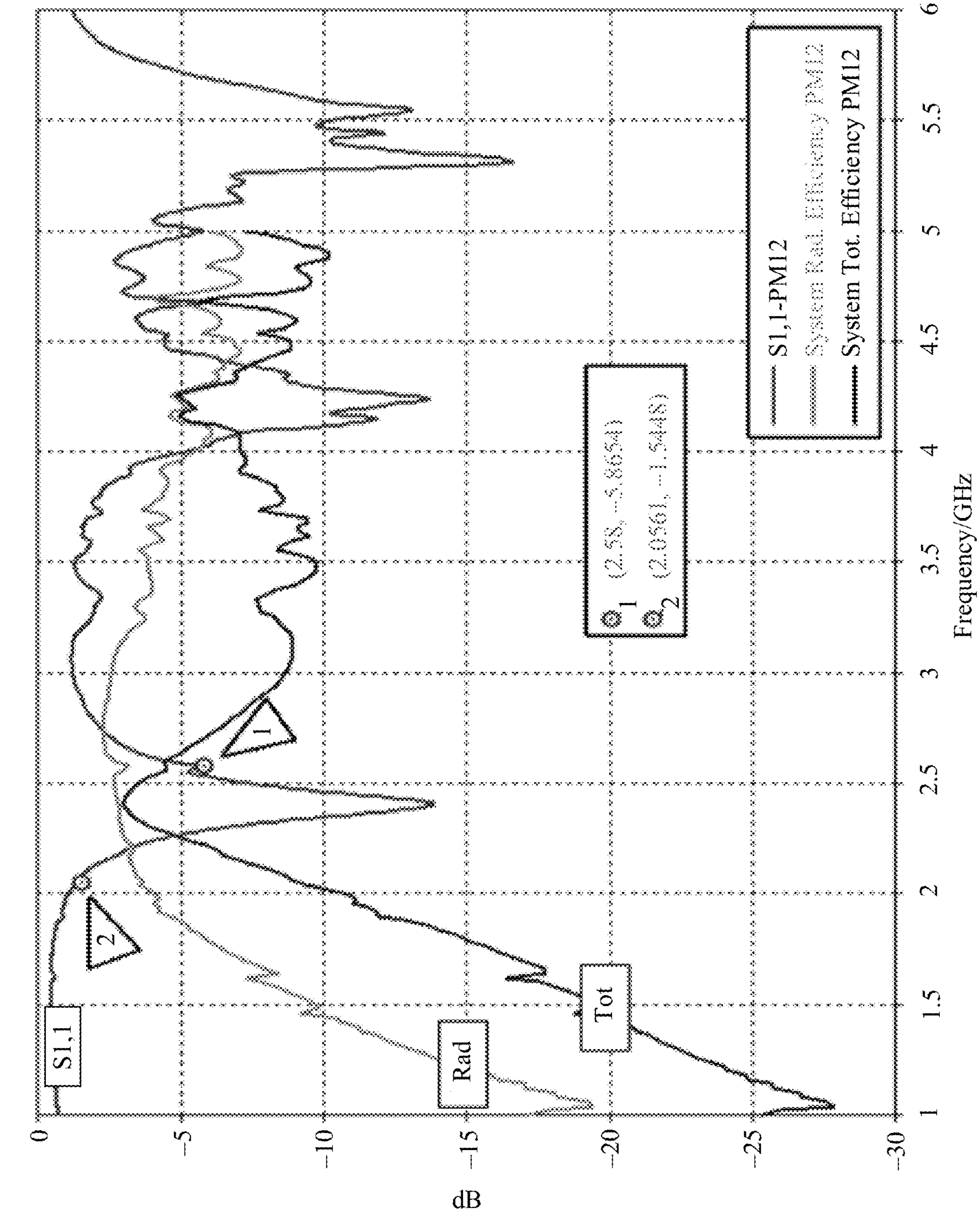

FIG. 32D is a schematic diagram of an S parameter and efficiency of a resonant cavity antenna without a foam 3048. S1,1 is a resonance curve (that is, an S parameter curve) of the resonant cavity antenna. A reference sign Rad in FIG. 32D is used to indicate radiation efficiency of the antenna, and a reference sign Tot in FIG. 32D is used to indicate system efficiency of the antenna. For example, in FIG. 32C, one clutter wave is generated, reducing antenna performance of the resonant cavity antenna.

Figure 32E:
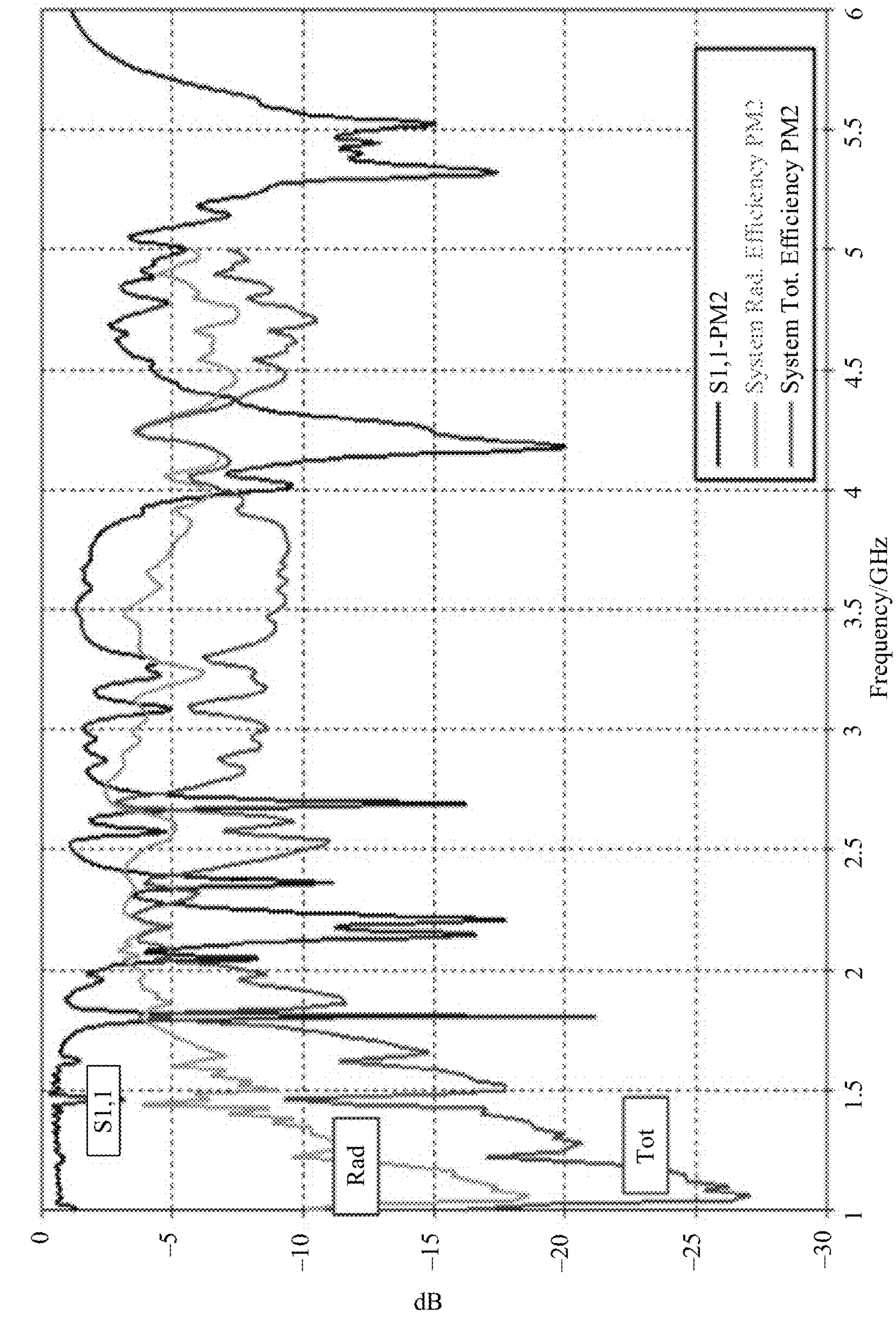

FIG. 32E is a schematic diagram of an S parameter and efficiency of a resonant cavity antenna without a foam 3046 and a foam 3048. S1,1 is a resonance curve (that is, an S parameter curve) of the resonant cavity antenna. A reference sign Rad in FIG. 32E is used to indicate radiation efficiency of the antenna, and a reference sign Tot in FIG. 32E is used to indicate system efficiency of the antenna. According to FIG. 32E, the resonance frequency of the resonant cavity antenna is offset, and there are many clutter waves.

Figure 32F:
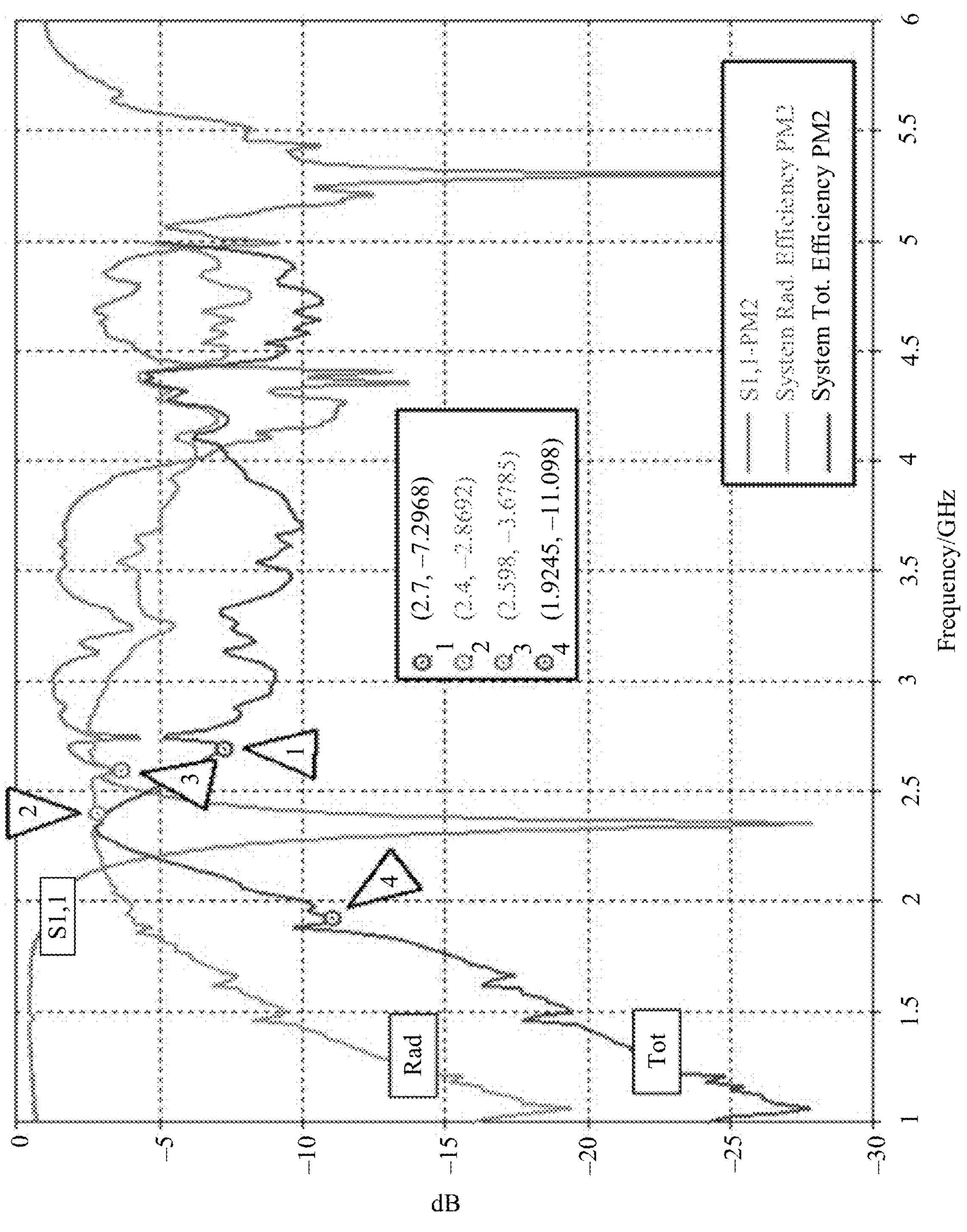

FIG. 32F is another schematic diagram of an S parameter and efficiency when a resonant cavity antenna includes four foams. S1,1 is a resonance curve (that is, an S parameter curve) of the resonant cavity antenna. A reference sign Rad in FIG. 32F is used to indicate radiation efficiency of the antenna, and a reference sign Tot in FIG. 32F is used to indicate system efficiency of the antenna. A connection line between the foam 3048 and the foam 3049 is not perpendicular to a connection line between the foam 3046 and the foam 3048, so that the foam 3048 and the foam 3049 form a non-strict boundary condition. In FIG. 32F, the resonant cavity antenna generates three clutter waves, reducing antenna performance of the resonant cavity antenna.

In this example, a longer foam and more sufficient grounding lead to lower clutter wave impact on the resonant cavity antenna. An excitation amplitude of a parallel board clutter wave is determined by the foam 3046 at the maximum point of the electric field. Therefore, the foam 3046 corresponding to the maximum point of the electric field cannot be missing. The resonant cavity antenna uses the $TE_{0.5,0,0.5}$ mode, and a volume of the resonant cavity antenna is reduced by nearly half, so that the resonant cavity antenna is flexibly deployed. Because the resonant cavity antenna needs to meet a boundary condition to excite a fundamental mode at a specified frequency, a clutter wave still exists when the resonant cavity antenna includes three foams. When the structure including four foams in FIG. 31 is used, a curve generated by the resonant cavity antenna is relatively smooth, and a clutter wave amplitude is very small.

Figure 33:
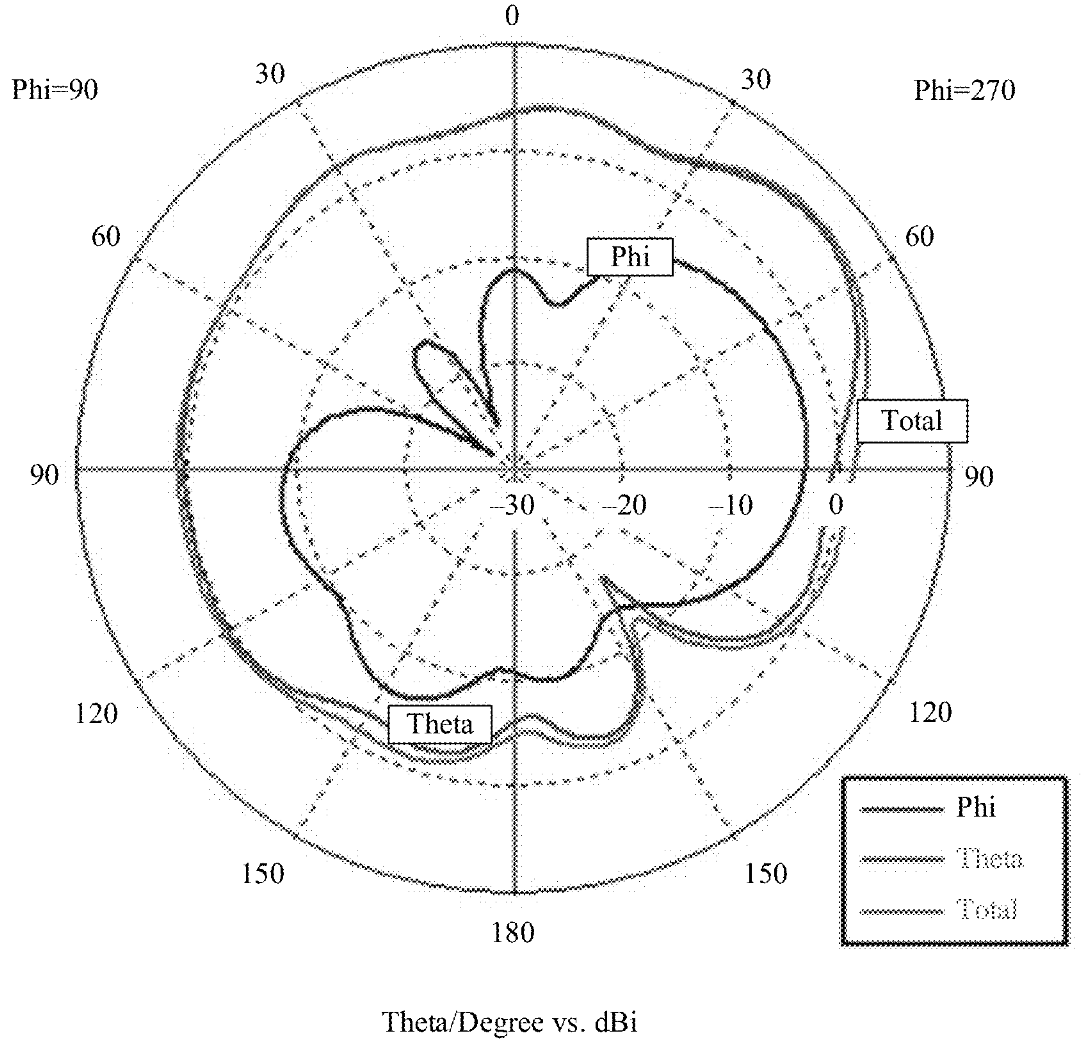
FIG. 33 is a two-dimensional direction diagram of a resonant cavity antenna.

FIG. 33 is a two-dimensional direction diagram of a resonant cavity antenna. In FIG. 33, the resonant cavity antenna works in a $TE_{0.5,0,0.5}$ mode. A 2D direction diagram indicates that a vertical polarization component Theta and a Tot polarization curve almost overlap, that is, primary polarization is vertical polarization, and a horizontal polarization component is weak. In this embodiment of this application, polarization orthogonality may be formed between the resonant cavity antenna and a frame antenna, to implement dual polarization equalization of the antennas in the tablet computer.

In this example, when the resonant cavity antenna uses the $TE_{0.5,0,0.5}$ mode, power line distribution is consistent with that in the $TE_{0.5,0,1}$ mode. A boundary condition in the L' direction changes, the fundamental mode changes from ½ wavelength to ¼ wavelength, primary polarization is still vertical polarization, and the volume is reduced by 50% compared with that in the $TE_{0.5,0,1}$ mode.

Figure 34:
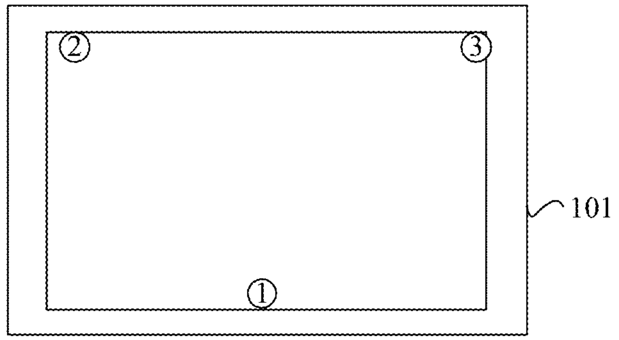
FIG. 34 is a schematic diagram of a deployment position of a resonant cavity antenna.

FIG. 34 is a schematic diagram of a deployment position of a resonant cavity antenna. A reference sign ① in FIG. 34 is used to indicate the deployment position of the resonant cavity antenna in this application. In FIG. 34, 101 is used to indicate a metal middle frame in a tablet computer, and a size of the tablet computer is 276 (that is, the f-axis) mm*187 (the e-axis) mm. In FIG. 34, a reference sign ② and a reference sign ③ are used to indicate deployment positions of other antennas in the tablet computer, such as a Bluetooth antenna and a Wi-Fi antenna.

Figure 35:
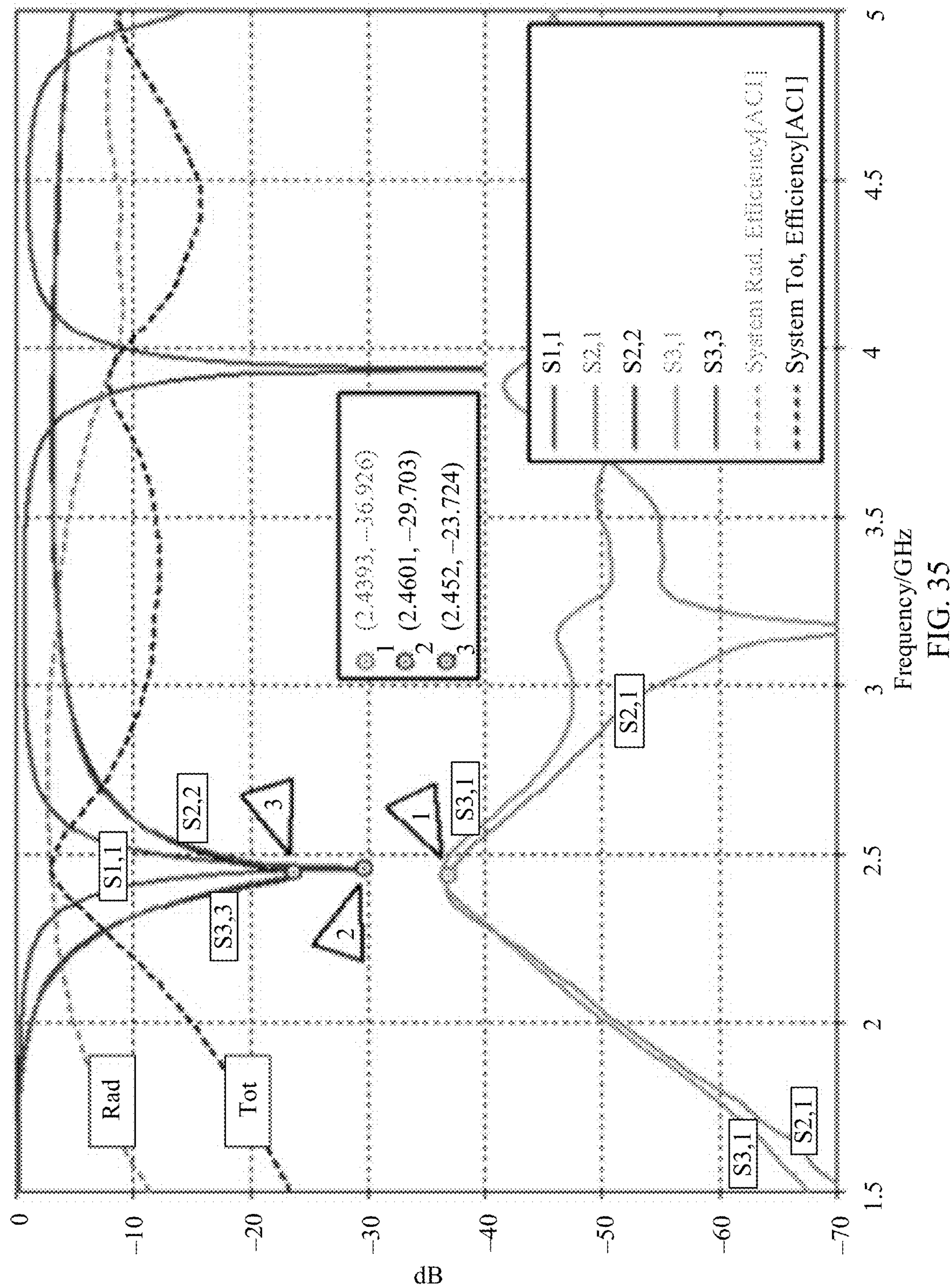
FIG. 35 is a schematic diagram of isolation between a resonant cavity antenna and another antenna when the resonant cavity antenna works in a $TE_{0.5,0,1}$ mode.

FIG. 35 is a schematic diagram of isolation between a resonant cavity antenna and another antenna when the resonant cavity antenna works in a $TE_{0.5,0,1}$ mode. In this example, a first gap in the resonant cavity antenna is disposed on a front surface (such as a first gap shown in FIG. 4). S3,1 in FIG. 35 is used to indicate a curve of isolation between the resonant cavity antenna and an antenna at the position with the reference sign ③, and S2,1 in FIG. 35 is used to indicate a curve of isolation between the resonant cavity antenna and an antenna at the position with the reference sign ②. It may be learned from the values of the triangle reference signs 1 in the curves S3,1 and S2,1 that the isolation between the resonant cavity antenna and the antenna at the position with the reference sign ② is 37 dB, and the isolation between the resonant cavity antenna and the antenna at the position with the reference sign ③ is 37 dB.

Figure 36:
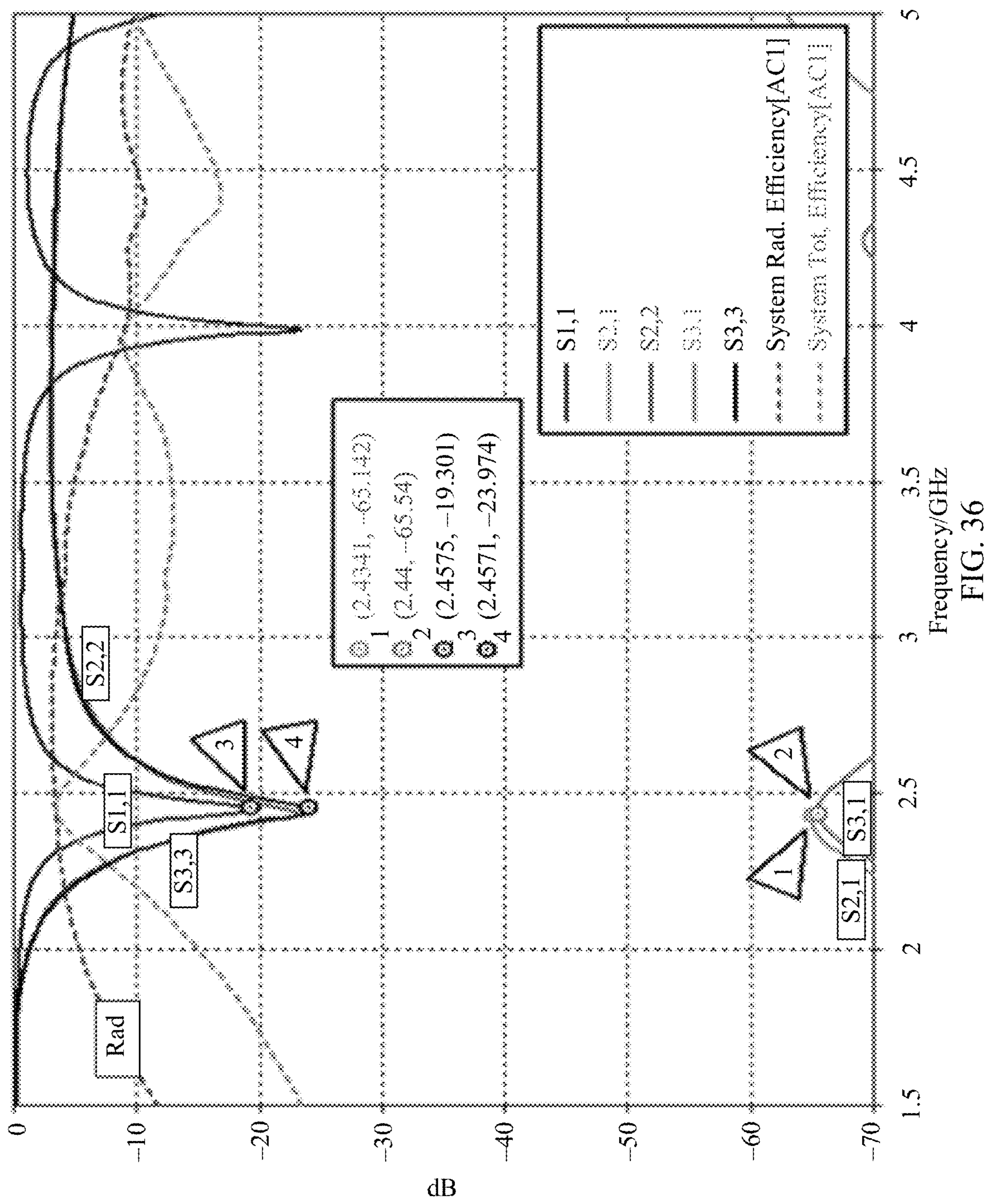
FIG. 36 is another schematic diagram of isolation between a resonant cavity antenna and another antenna when the resonant cavity antenna works in a $TE_{0.5,0,1}$ mode.

FIG. 36 is another schematic diagram of isolation between a resonant cavity antenna and another antenna when the resonant cavity antenna works in a $TE_{0.5,0,1}$ mode. In this example, a first gap in the resonant cavity antenna is disposed on a side surface (such as a first gap shown in FIG. 26). S3,1 in FIG. 35 is used to indicate a curve of isolation between the resonant cavity antenna and an antenna at the position with the reference sign ③, and S2,1 in FIG. 35 is used to indicate a curve of isolation between the resonant cavity antenna and an antenna at the position with the reference sign ②. It may be learned from the values of the triangle reference signs 1 in the curves S3,1 and S2,1 that the isolation between the resonant cavity antenna and the antenna at the position with the reference sign ② is 65 dB (correct to the ones place), and the isolation between the resonant cavity antenna and the antenna at the position with the reference sign ③ is 65 dB (correct to the ones place).

Figure 37:
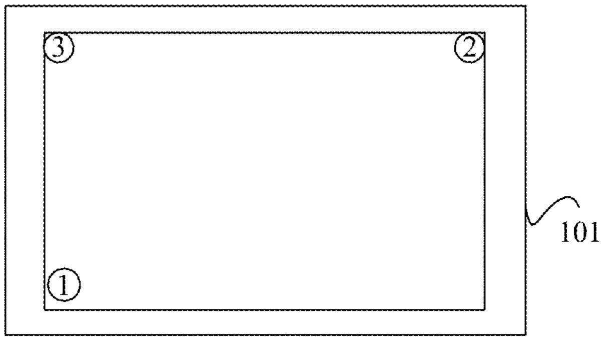
FIG. 37 is a schematic diagram of a deployment position of a resonant cavity antenna.

FIG. 37 is a schematic diagram of a deployment position of a resonant cavity antenna. A reference sign ① in FIG. 37 is used to indicate the deployment position of the resonant cavity antenna in this application. In FIG. 37,101 is used to indicate a metal middle frame in a tablet computer, and a size of the tablet computer is 276 (that is, the f-axis) mm*187 (the e-axis) mm. In FIG. 37, a reference sign ② and a reference sign ③ are used to indicate deployment positions of other antennas in the tablet computer, such as a Bluetooth antenna and a Wi-Fi antenna.

Figure 38:
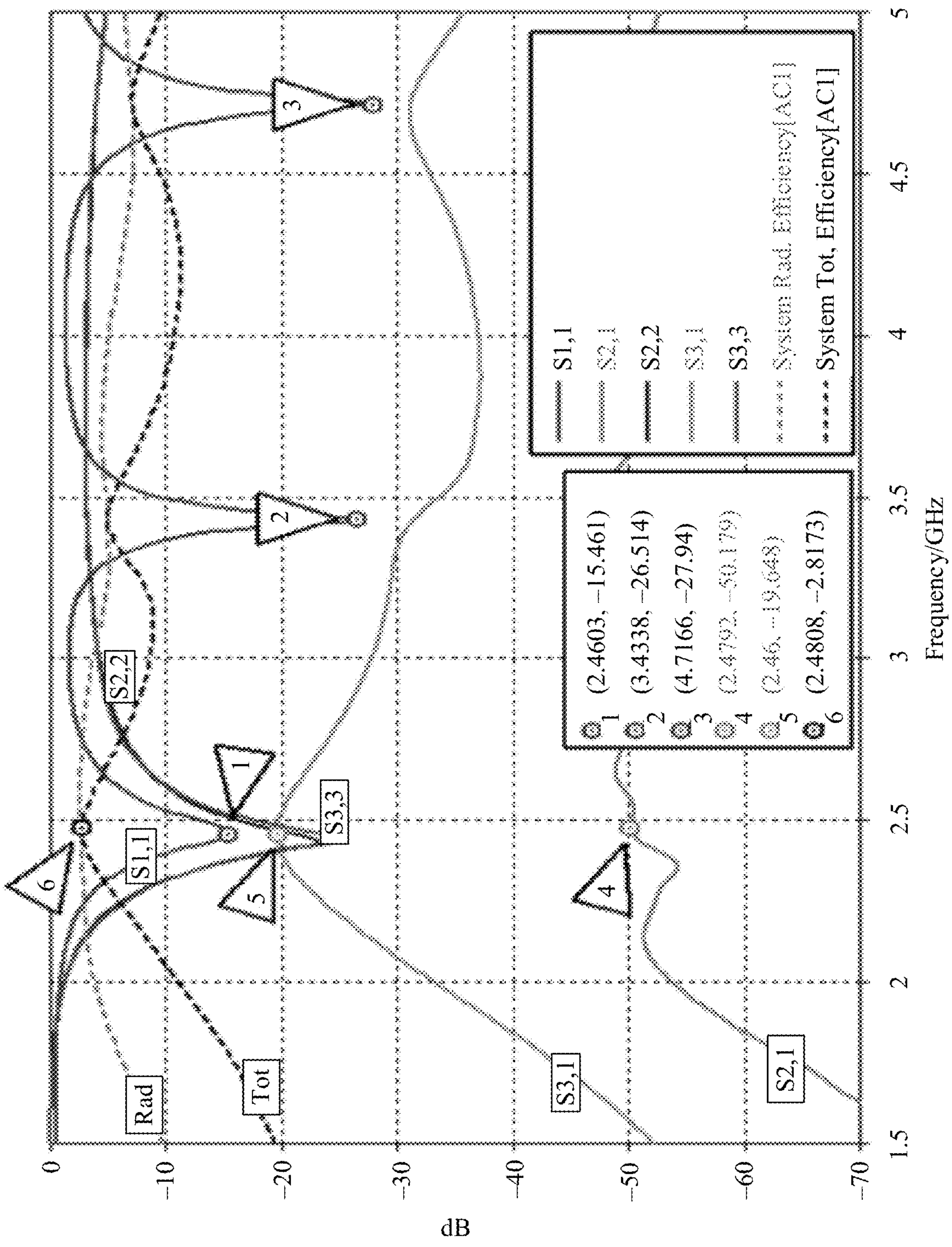
FIG. 38 is a schematic diagram of isolation between a resonant cavity antenna and another antenna when the resonant cavity antenna works in a $TE_{0.5,0,0.5}$ mode.

FIG. 38 is a schematic diagram of isolation between a resonant cavity antenna and another antenna when the resonant cavity antenna works in a $TE_{0.5,0,0.5}$ mode. In this example, a first gap in the resonant cavity antenna is disposed on a front surface (such as a first gap shown in FIG. 4). S3,1 in FIG. 38 is used to indicate a curve of isolation between the resonant cavity antenna and an antenna at the position with the reference sign ③ in FIGS. 37, and S2,1 in FIG. 38 is used to indicate a curve of isolation between the resonant cavity antenna and an antenna at the position with the reference sign ② in FIG. 37. It may be learned from the values of the triangle reference signs 1 in the curves S3,1 and S2,1 that the isolation between the resonant cavity antenna and the antenna at the position with the reference sign ② is 50 dB, and the isolation between the resonant cavity antenna and the antenna at the position with the reference sign ③ is 19 dB.

In this example, the resonant cavity antenna is disposed away from another antenna, and isolation from another antenna is high, thereby reducing mutual interference between different antennas.

Any content in embodiments of this application and any content in a same embodiment may be freely combined. Any combination of the foregoing content falls within the scope of this application.

Embodiments of this application are described above with reference to the accompanying drawings. However, this application is not limited to the foregoing specific implementations. The foregoing specific implementations are merely an example but not a limitation. Many forms that can be made by a person of ordinary skill in the art without departing from the principle of this application and the protection scope of the claims fall within the protection scope of this application.

What is claimed is:

1. A resonant cavity antenna, applied to an electronic device, the resonant cavity antenna comprising:

an antenna body defining an antenna cavity, wherein the antenna cavity is filled with an insulating medium, wherein at least one edge of a first surface of the antenna body is parallel to a long edge of a display of the electronic device, at least one edge of a second surface of the antenna body is parallel to the long edge of the display, a plane on which the first surface is located intersects a plane on which the second surface is located, the plane on which the first surface is located is parallel to a plane on which the display is located, and the plane on which the display is located is a plane formed by a long axis of the electronic device and a short axis of the electronic device; and a feeding part;

wherein a first gap extends in the first surface or the second surface, and at least a part of the first gap extends in a direction of the long edge of the display; and wherein the feeding part is located inside the antenna cavity, and the feeding part does not contact any surface of the antenna body and does not extend into the first gap.

2. The resonant cavity antenna according to claim 1, wherein the first gap is disposed in an area in which the plane on which the first surface is located intersects the plane on which the second surface is located.

3. The resonant cavity antenna according to claim 2, wherein a third gap extends in a metal middle frame of the electronic device; and wherein the third gap at least partially overlaps an orthogonal projection of the first gap on a plane on which the metal middle frame is located, and the plane on which the metal middle frame is located is perpendicular to the plane on which the display is located.

4. The resonant cavity antenna according to claim 1, wherein the first gap extends in the second surface, the second surface is divided into a first part and a second part by the first gap, a first edge of the first part is perpendicular to an edge that is of the second surface and that is parallel to the long edge of the display, and a second edge of the second part is perpendicular to an edge that is of the second surface and that is parallel to the long edge of the display; and a length of the first edge is equal to a length of the second edge.

5. The resonant cavity antenna according to claim 1, wherein the feeding part is located at a position of a maximum point of an electric field of the antenna cavity, and the maximum point of the electric field is a position at which a maximum electric field is generated in the resonant cavity antenna.

6. The resonant cavity antenna according to claim 5, wherein when a mode of the resonant cavity antenna is $TE_{0.5,0,1}$, a position of an orthogonal projection of the maximum point of the electric field on the first surface is a position whose value in a first direction is ½ of a length of a third edge and that is closest to the first gap in a second direction, wherein the first direction is an extension direction of the long axis of the electronic device, the second direction is an extension direction of the short axis of the electronic device, and the third edge is an edge that is of the first surface and that is parallel to the long edge of the display.

7. The resonant cavity antenna according to claim 6, wherein the antenna body comprises a third surface and a fourth surface, a plane on which the third surface is located intersects the plane on which the first surface is located, the plane on which the third surface is located intersects the plane on which the second surface is located, and a plane on which the fourth surface is located is parallel to the plane on which the third surface is located; and when a resonance frequency of the resonant cavity antenna is 2.45 GHz, and a working mode is $TE_{0.5,0,1}$, the third surface and the fourth surface are closed conductive walls.

8. The resonant cavity antenna according to claim 7, wherein a plane on which a fifth surface of the antenna body is located is parallel to the plane on which the display is located, the first surface is parallel to the plane on which the display is located, and the plane on which the display is located is the plane formed by the long axis of the electronic device and the short axis of the electronic device;

wherein a height of the antenna cavity is a distance between the plane on which the first surface is located and the plane on which the fifth surface is located;

wherein the third edge is an edge that is of the first surface and that is parallel to the long edge of the display; and wherein the resonant cavity antenna works in a $TE_{0.5,0,1}$ mode, a value range of the length of the third edge is [0.5λ−0.5λ*20%, 0.5λ+0.5λ*20%], the plane on which the first surface is located and the plane on which the third surface is located intersect a fourth edge, a value range of a length of the fourth edge is [0.25λ−0.25λ*10%, 0.25λ+0.25λ*10%], and the height is less than 0.25λ, wherein λ indicates a wavelength at which the resonant cavity antenna works.

9. The resonant cavity antenna according to claim 5, wherein the antenna body further comprises a third surface and a fourth surface, a plane on which the third surface is located intersects the plane on which the first surface is located, the plane on which the third surface is located intersects the plane on which the second surface is located, and a plane on which the fourth surface is located is parallel to the plane on which the third surface is located;

wherein when a mode of the resonant cavity antenna is $TE_{0.5,0,0.5}$, the third surface is a closed conductive wall, and the fourth surface does not cover a conductive wall and forms an open surface; and wherein a position of an orthogonal projection of the maximum point of the electric field on the first surface is a position that is close to a position of the fourth surface in a first direction, whose value is greater than a width of the first gap in a second direction, and that is close to the first gap in the second direction, wherein the first direction is an extension direction of the long axis of the electronic device, and the second direction is an extension direction of the short axis of the electronic device.

10. The resonant cavity antenna according to claim 9, wherein the plane on which the third surface of the antenna cavity is located intersects the plane on which the first surface is located, the plane on which the third surface is located intersects the plane on which the second surface is located, and the plane on which the fourth surface of the antenna cavity is located intersects the plane on which the third surface is located; and wherein when a resonance frequency of the resonant cavity antenna is 2.45 GHz, and a working mode is $TE_{0.5,0,0.5}$, the third surface is a closed conductive wall, and the fourth surface is an uncovered conductive wall and forms an open surface.

11. The resonant cavity antenna according to claim 10, wherein a plane on which a fifth surface of the antenna cavity is located is parallel to the plane on which the display is located, the first surface is parallel to the plane on which the display is located, and the plane on which the display is located is the plane formed by the long axis of the electronic device and the short axis of the electronic device;

wherein a height of the antenna cavity is a distance between the plane on which the first surface is located and the plane on which the fifth surface is located, and a third edge is an edge that is of the first surface and that is parallel to the long edge of the display; and wherein a value range of a length of the third edge is [0.25λ−0.25λ*20%, 0.25λ+0.25λ*20%], the plane on which the first surface is located and the plane on which the third surface is located intersect a fourth edge, a value range of a length of the fourth edge is [0.25λ−0.25λ*10%, 0.25λ+0.25λ*10%], and the height is less than 0.25λ, wherein λ is used to indicate a wavelength at which the resonant cavity antenna works.

12. The resonant cavity antenna according to claim 1, wherein the feeding part comprises a feeding structure and a feeding point; and wherein the feeding structure comprises a forming bracket of a plastic material and a metal sheet attached to the forming bracket, and the forming bracket is fastened to a printed circuit board (PCB) board at a position of the feeding point.

13. The resonant cavity antenna according to claim 12, wherein the metal sheet is attached to the forming bracket based on a preset shape, in a manner that the feeding structure is configured to generate preset resistance and inductance to meet an operating frequency of the resonant cavity antenna.

14. The resonant cavity antenna according to claim 1, wherein from bottom to top, the resonant cavity antenna successively comprises a metal plate of the electronic device, at least two foams for conducting electricity, and a liquid crystal display (LCD) metal layer covering the two foams, and the LCD metal layer is covered by the display;

a first foam is located on the metal plate; and a battery rib retaining wall of the electronic device is located on the metal plate, a second foam is located on the battery rib retaining wall, the second foam is close to a position of the feeding part, and an included angle between the battery rib retaining wall and a connection line between the first foam and the second foam is greater than 0 degrees and less than or equal to 45 degrees.

15. The resonant cavity antenna according to claim 14, wherein the resonant cavity antenna further comprises a third foam, and the third foam is located on the battery rib retaining wall.

16. The resonant cavity antenna according to claim 15, wherein the resonant cavity antenna further comprises a fourth foam, and the fourth foam is located on the battery rib retaining wall; and when the third foam is aligned with the first foam, the fourth foam is located between the second foam and the third foam; or when the third foam is located between the first foam and the second foam, the fourth foam is aligned with the first foam.

17. The resonant cavity antenna according to claim 1, wherein a plane on which a metal middle frame of the electronic device is located is perpendicular to the plane on which the display is located; and wherein the plane on which the second surface is located overlaps the plane on which the metal middle frame is located.

18. An electronic device, comprising at least one frame antenna and a resonant cavity antenna;

wherein the frame antenna is located in a first corner or a second corner of the electronic device, and the first corner is adjacent to the second corner;

wherein:

when the resonant cavity antenna works in a $TE_{0.5,0,1}$ mode, the resonant cavity antenna is located at a middle position between a third corner and a fourth corner, and a connection line between the third corner and the fourth corner is parallel to a connection line between the first corner and the second corner; or when the resonant cavity antenna works in a $TE_{0.5,0,0.5}$ mode, the resonant cavity antenna is located at a position of the third corner or the fourth corner;

wherein the resonant cavity antenna comprises:

an antenna body defining an antenna cavity, wherein the antenna cavity is filled with an insulating medium, wherein at least one edge of a first surface of the antenna body is parallel to a long edge of a display of the electronic device, at least one edge of a second surface of the antenna body is parallel to the long edge of the display, a plane on which the first surface is located intersects a plane on which the second surface is located, the plane on which the first surface is located is parallel to a plane on which the display is located, and the plane on which the display is located is a plane formed by a long axis of the electronic device and a short axis of the electronic device; and a feeding part;

wherein a first gap extends in the first surface or the second surface, and at least a part of the first gap extends in a direction of the long edge of the display; and wherein the feeding part is located inside the antenna cavity, and the feeding part does not contact any surface of the antenna body.

19. The electronic device according to claim 18, wherein the electronic device does not extend into the first gap.

20. The electronic device according to claim 18, wherein the first gap is disposed in an area in which the plane on which the first surface is located intersects the plane on which the second surface is located.

* * * * *